United States Patent
Kozuka et al.

(10) Patent No.: US 12,452,481 B2
(45) Date of Patent: Oct. 21, 2025

(54) VIDEO DISPLAY SYSTEM, INFORMATION PROCESSING DEVICE, INFORMATION PROCESSING METHOD, AND RECORDING MEDIUM

(71) Applicant: Panasonic Intellectual Property Management Co., Ltd., Osaka (JP)

(72) Inventors: Masayuki Kozuka, Tokyo (JP); Yoshihiro Mori, Osaka (JP); Junya Suzuki, Kyoto (JP); Yoshiichiro Kashiwagi, Kyoto (JP); Yasutoshi Yamamoto, Osaka (JP); Toshiro Nishio, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 78 days.

(21) Appl. No.: 18/286,354

(22) PCT Filed: Apr. 18, 2022

(86) PCT No.: PCT/JP2022/018087
§ 371 (c)(1),
(2) Date: Oct. 10, 2023

(87) PCT Pub. No.: WO2022/220306
PCT Pub. Date: Oct. 20, 2022

(65) Prior Publication Data
US 2024/0205513 A1    Jun. 20, 2024

Related U.S. Application Data

(60) Provisional application No. 63/176,004, filed on Apr. 16, 2021.

(51) Int. Cl.
*H04N 21/21*    (2011.01)
*G02B 27/01*    (2006.01)
(Continued)

(52) U.S. Cl.
CPC ..... *H04N 21/4316* (2013.01); *G02B 27/0172* (2013.01); *G06F 3/011* (2013.01);
(Continued)

(58) Field of Classification Search
CPC ......... H04N 21/4316; H04N 21/21805; H04N 21/2353; H04N 21/439; H04N 21/472;
(Continued)

(56) References Cited

U.S. PATENT DOCUMENTS 9,794,514 B1    10/2017 Yoakum
9,911,238 B2    3/2018 Doronichev et al.
(Continued)

FOREIGN PATENT DOCUMENTS

CA    3032295 A1    2/2018
EP    3793259 A1    3/2021
(Continued)

OTHER PUBLICATIONS

International Search Report issued on Jul. 5, 2022 in International Patent Application No. PCT/JP2022/018087, with English translation.
(Continued)

*Primary Examiner* — Alazar Tilahun
(74) *Attorney, Agent, or Firm* — Rimon P.C.

(57) ABSTRACT

A video display system includes: an observation device including a capturing unit that generates a wide-angle video, and a data obtainment unit that obtains data related to a position and/or direction of a target in the wide-angle video to be gazed at by a user of a display device and cue information for informing of a change in the state of the observation system; and a VR device including a reception unit that receives the data and the cue information, and a differential calculation that calculates a relative position and/or direction of the gazing target relative to the position
(Continued)

(L)

(R)

and/or direction of the display device in the wide-angle video, based on a difference between the position and/or direction of the display device in the wide-angle video and the position and/or direction of the gazing target in metadata.

19 Claims, 44 Drawing Sheets

(51) Int. Cl.
*G06F 3/01* (2006.01)
*G06F 40/58* (2020.01)
*G06T 5/50* (2006.01)
*G06T 7/20* (2017.01)
*G06T 15/00* (2011.01)
*G06T 17/00* (2006.01)
*G09G 5/36* (2006.01)
*H04N 21/218* (2011.01)
*H04N 21/235* (2011.01)
*H04N 21/431* (2011.01)
*H04N 21/439* (2011.01)
*H04N 21/472* (2011.01)
*H04N 21/4788* (2011.01)
*H04N 21/81* (2011.01)

(52) U.S. Cl.
CPC ............. *G06F 3/013* (2013.01); *G06F 40/58* (2020.01); *G06T 5/50* (2013.01); *G06T 7/20* (2013.01); *G06T 15/00* (2013.01); *G06T 17/00* (2013.01); *G09G 5/36* (2013.01); *H04N 21/21805* (2013.01); *H04N 21/2353* (2013.01); *H04N 21/439* (2013.01); *H04N 21/472* (2013.01); *H04N 21/4788* (2013.01); *H04N 21/8106* (2013.01); *H04N 21/816* (2013.01); *G06T 2207/20221* (2013.01)

(58) Field of Classification Search
CPC ........... H04N 21/4788; H04N 21/8106; H04N 21/816; H04N 7/183; H04N 21/4312; H04N 21/4728; G06F 3/013; G06F 40/58; G06T 5/50; G06T 7/20; G06T 15/00; G06T 17/00; G06T 2207/20221; G06Q 30/0643; G06Q 50/01; G06Q 50/10; G06Q 90/20; G09G 5/377
See application file for complete search history.

(56) References Cited

U.S. PATENT DOCUMENTS

| | | | |
|---|---|---|---|
| 2013/0038692 A1 | 2/2013 | Ohtomo et al. | |
| 2016/0117853 A1 | 4/2016 | Zhong et al. | |
| 2016/0300392 A1 | 10/2016 | Jonczyk et al. | |
| 2017/0061231 A1 | 3/2017 | Higa | |
| 2017/0061813 A1 | 3/2017 | Tao et al. | |
| 2017/0142486 A1 | 5/2017 | Masuda | |
| 2017/0329144 A1 | 11/2017 | Usami | |
| 2018/0196425 A1 | 7/2018 | Kobayashi | |
| 2018/0249148 A1 | 8/2018 | Roulet et al. | |
| 2019/0052838 A1 | 2/2019 | Ashkenazi et al. | |
| 2019/0139430 A1 | 5/2019 | Ghatage et al. | |
| 2019/0250601 A1 | 8/2019 | Donahoe et al. | |
| 2019/0266424 A1 | 8/2019 | Nishimura et al. | |
| 2020/0160740 A1 | 5/2020 | Nedivi | |
| 2020/0218072 A1* | 7/2020 | Inatani | H04N 7/183 |
| 2020/0341714 A1 | 10/2020 | Yuasa et al. | |
| 2020/0363866 A1* | 11/2020 | Gerard | G06F 3/012 |
| 2021/0225017 A1* | 7/2021 | Holzer | G06T 7/75 |

FOREIGN PATENT DOCUMENTS

| | | |
|---|---|---|
| JP | 2002-169901 A | 6/2002 |
| JP | 2007-207260 A | 8/2007 |
| JP | 2012-010418 A | 1/2012 |
| JP | 2013-038622 A | 2/2013 |
| JP | 2015-005967 A | 1/2015 |
| JP | 2016-090773 A | 5/2016 |
| JP | 2018-112809 A | 7/2018 |
| JP | 2019-503612 A | 2/2019 |
| JP | 2019-036025 A | 3/2019 |
| JP | 2019-075075 A | 5/2019 |
| JP | 2019-149016 A | 9/2019 |
| JP | 2019-164216 A | 9/2019 |
| JP | 2019-195169 A | 11/2019 |
| JP | 2019-197939 A | 11/2019 |
| JP | 6727388 B2 | 7/2020 |
| JP | 2020-120388 A | 8/2020 |
| JP | 2020-176995 A | 10/2020 |
| JP | 2021-043599 A | 3/2021 |
| WO | 2015/170461 A1 | 11/2015 |
| WO | 2016/009864 A1 | 1/2016 |
| WO | 2017/108668 A1 | 6/2017 |
| WO | 2019/150675 A1 | 8/2019 |
| WO | 2020/116493 A1 | 6/2020 |

OTHER PUBLICATIONS

International Search Report issued on Jun. 28, 2022 in International Patent Application No. PCT/JP2022/018086, with English translation.
International Search Report issued on Jul. 5, 2022 in International Patent Application No. PCT/JP2022/018088, with English translation.
International Search Report issued on Jun. 28, 2022 in International Patent Application No. PCT/JP2022/018089, with English translation.
Extended European Search Report dated Aug. 27, 2024 issued in the corresponding European Patent Application No. 22788231.3.
Extended European Search Report dated Sep. 10, 2024 issued in the corresponding European Patent Application No. 22788228.9.
Extended European Search Report dated Sep. 12, 2024 issued in the corresponding European Patent Application No. 22788230.5.
Extended European Search Report dated Sep. 18, 2024 issued in the corresponding European Patent Application No. 22788229.7.
Office Action dated Dec. 24, 2024 issued in the corresponding Japanese Patent Application No. 2023-514694, w/English Translation.
Office Action dated Jan. 3, 2025 issued in the corresponding U.S. Appl. No. 18/286,357.
Non-Final Office Action dated Apr. 2, 2025 issued in the related U.S. Appl. No. 18/286,353.
Non-Final Office Action dated Feb. 26, 2025 issued in U.S. Appl. No. 18/286,346.

* cited by examiner (L)  (R)

FIG. 21
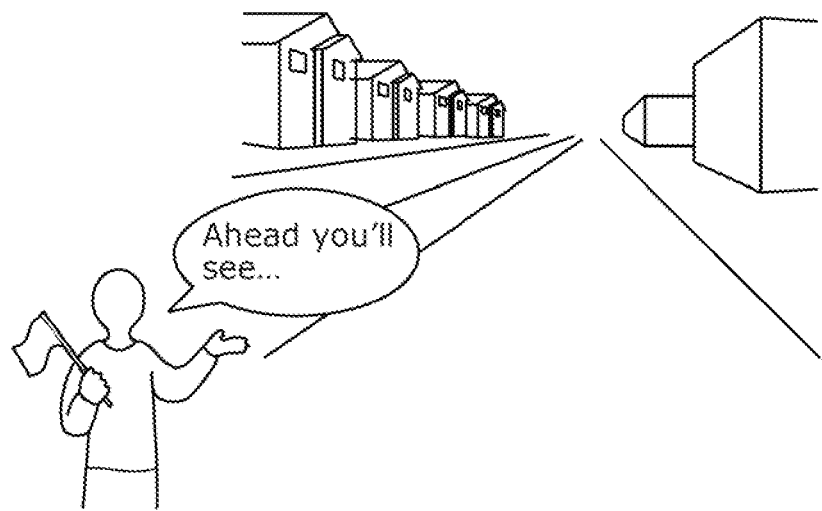
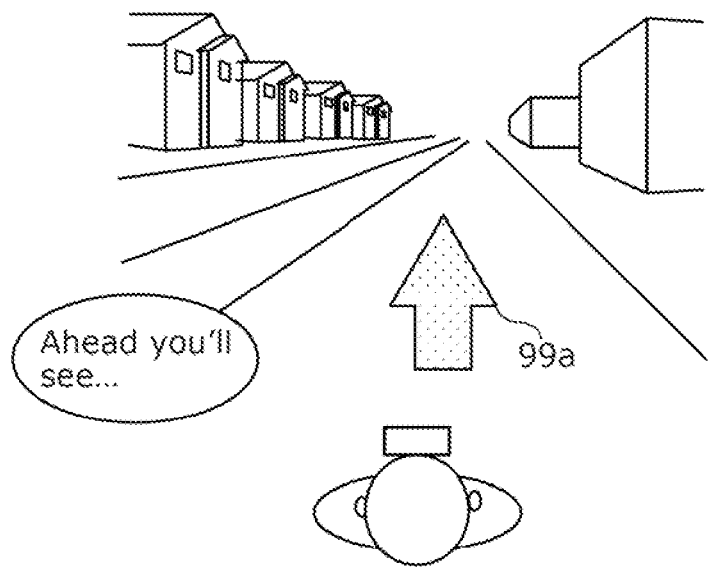

FIG. 22
(a)
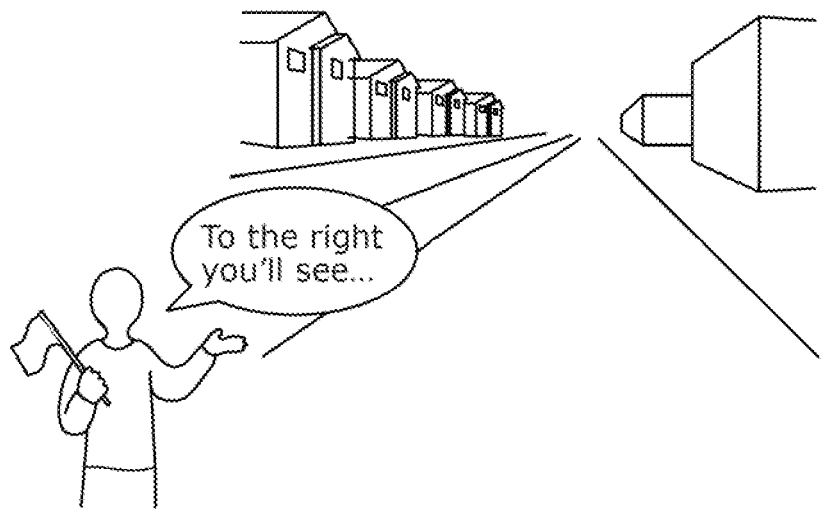
(b)
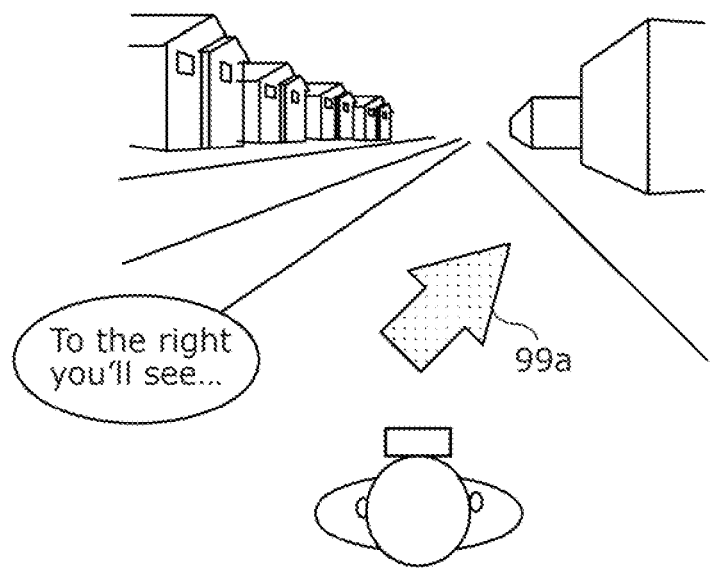

FIG. 23
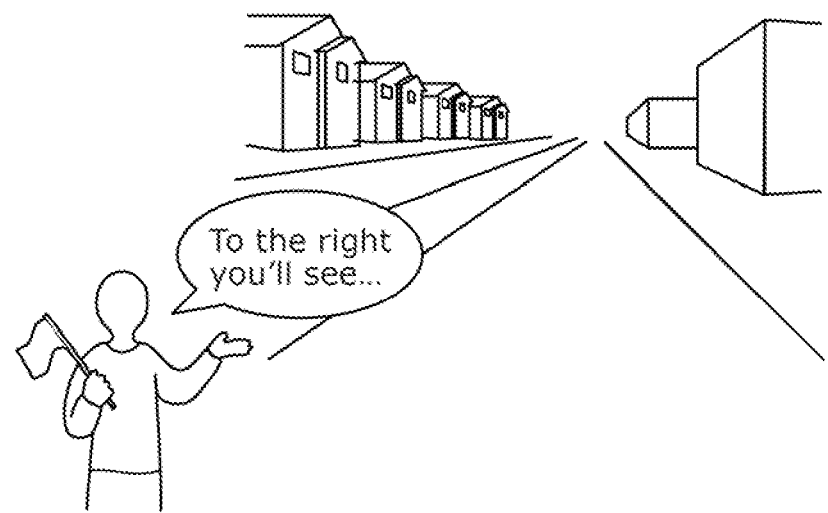
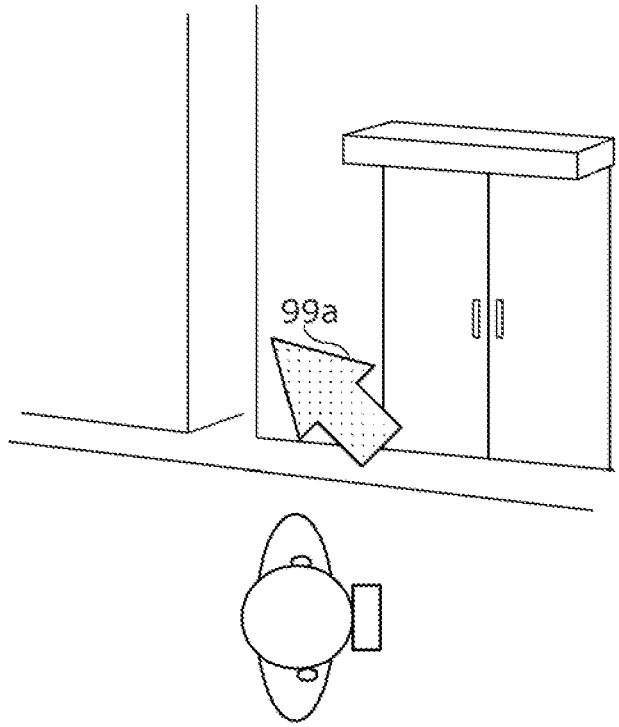

FIG. 24
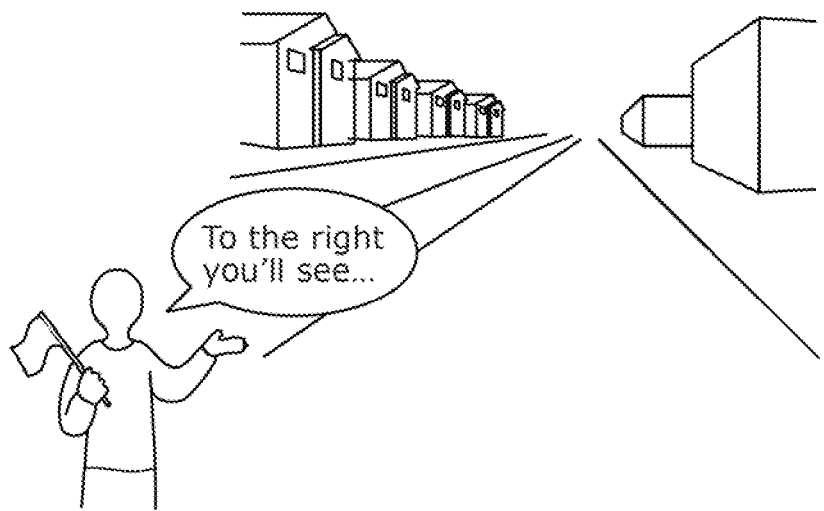
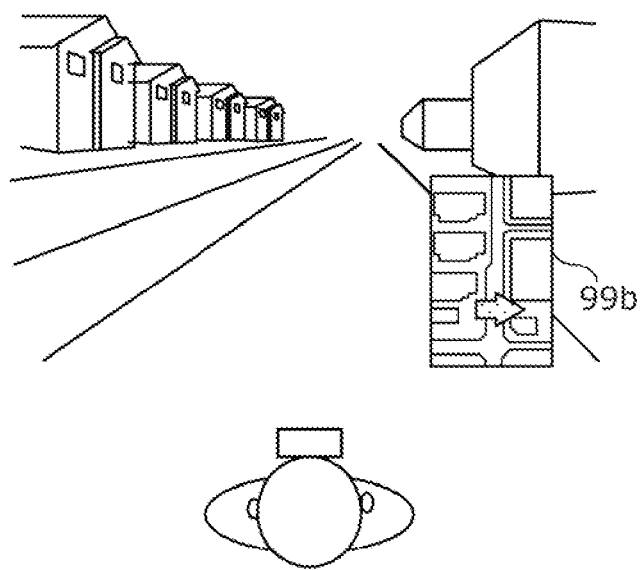

FIG. 25
(a)
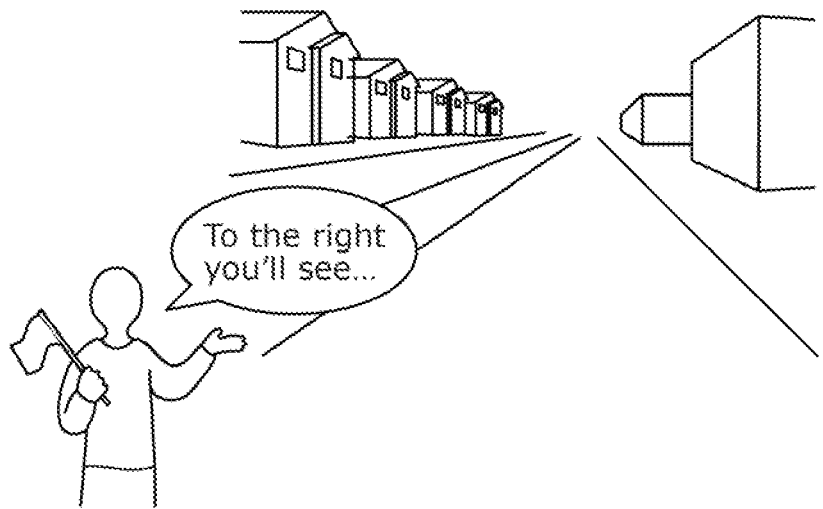
(b)
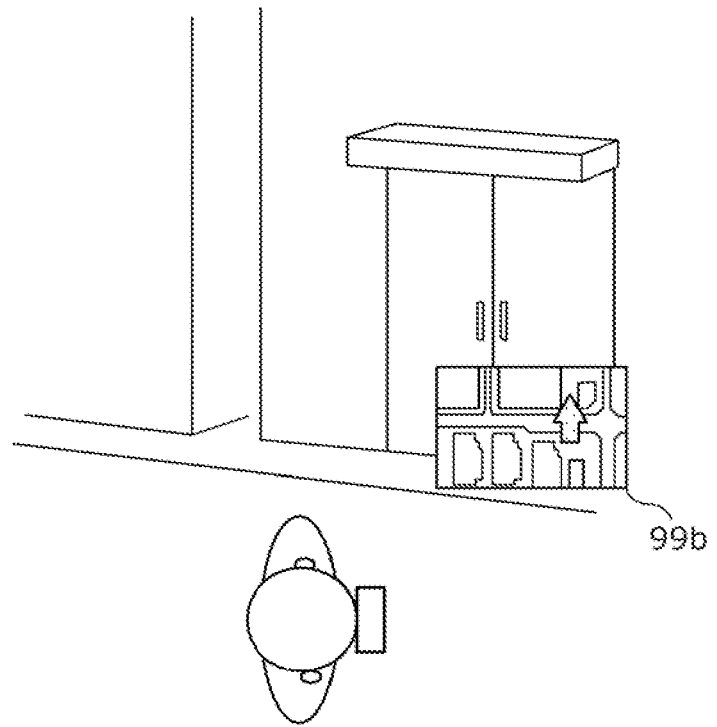

FIG. 26
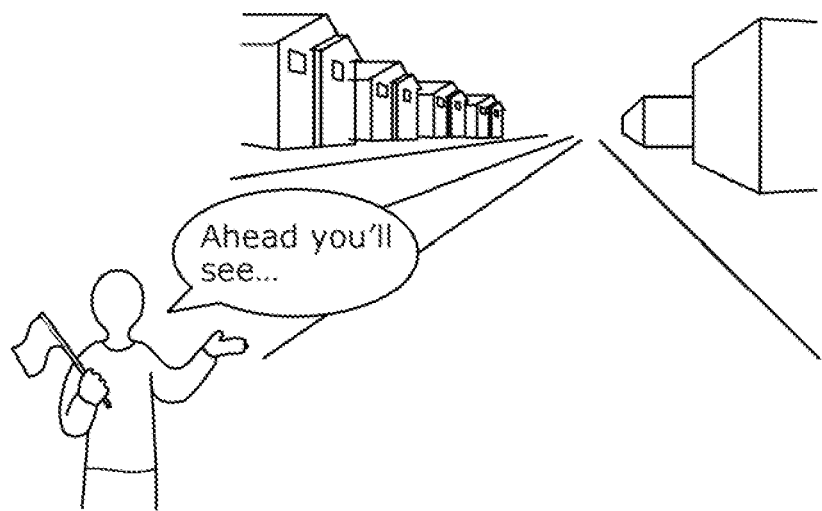
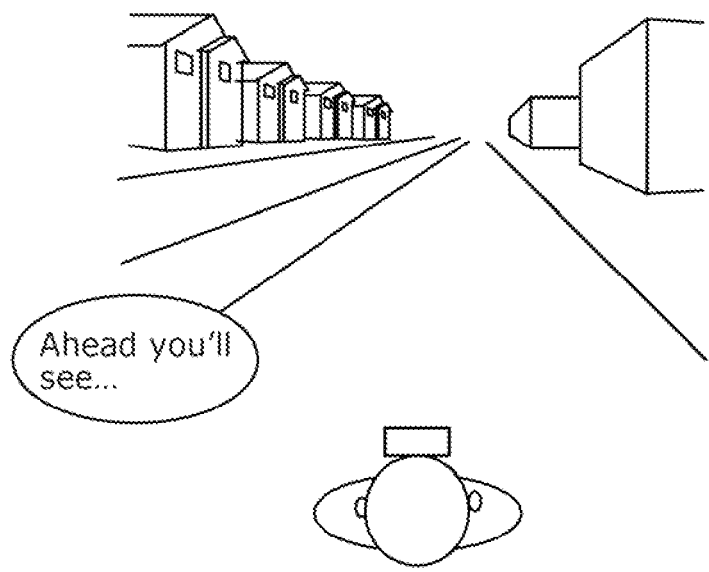

FIG. 27
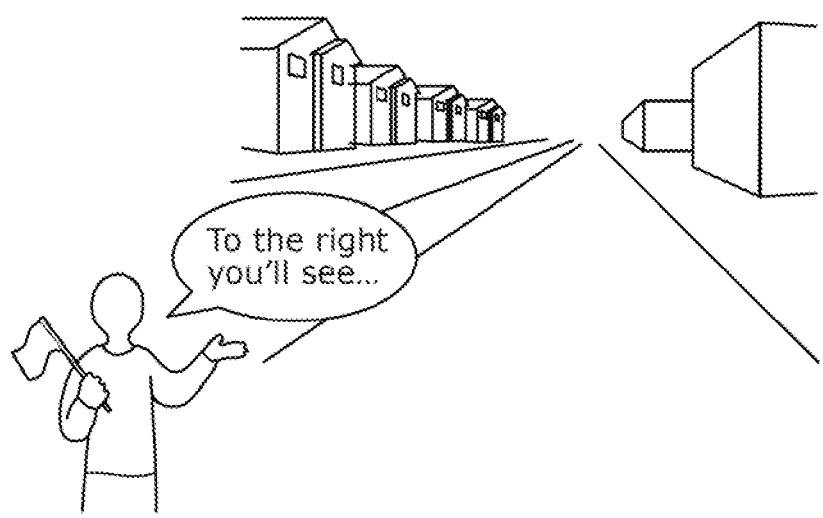
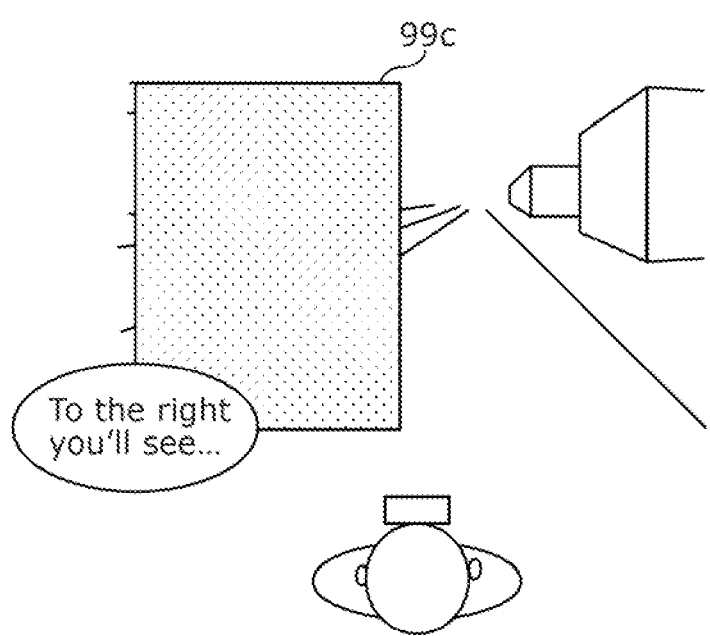

FIG. 29
(a)
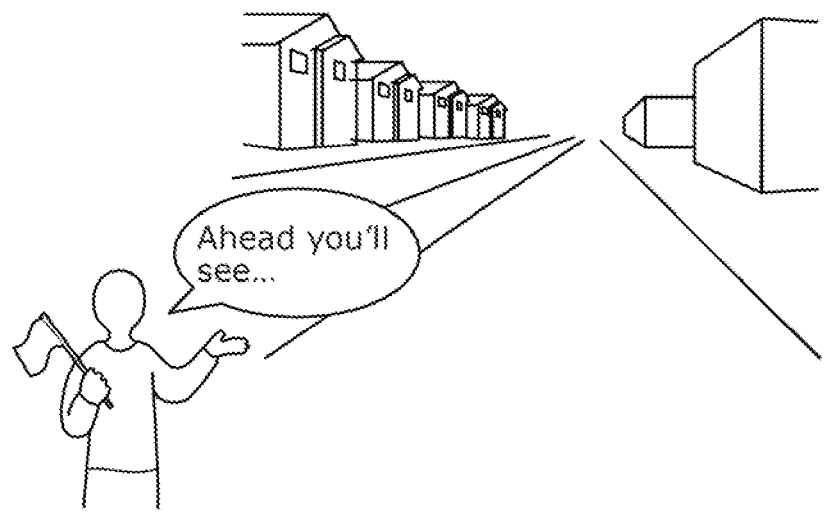
(b)
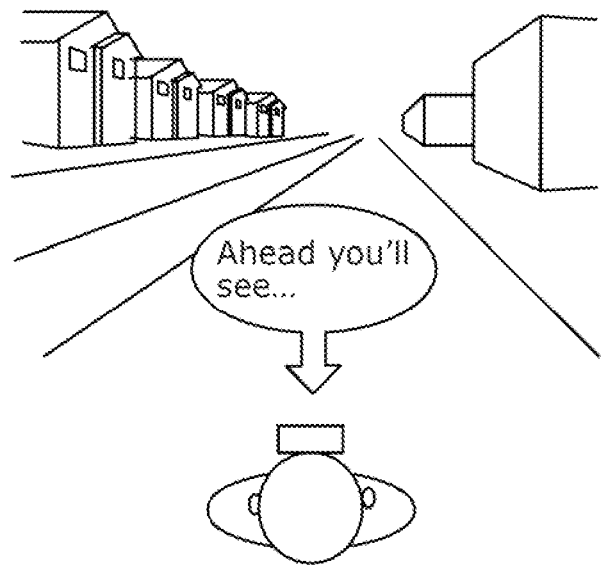

FIG. 30
(a)
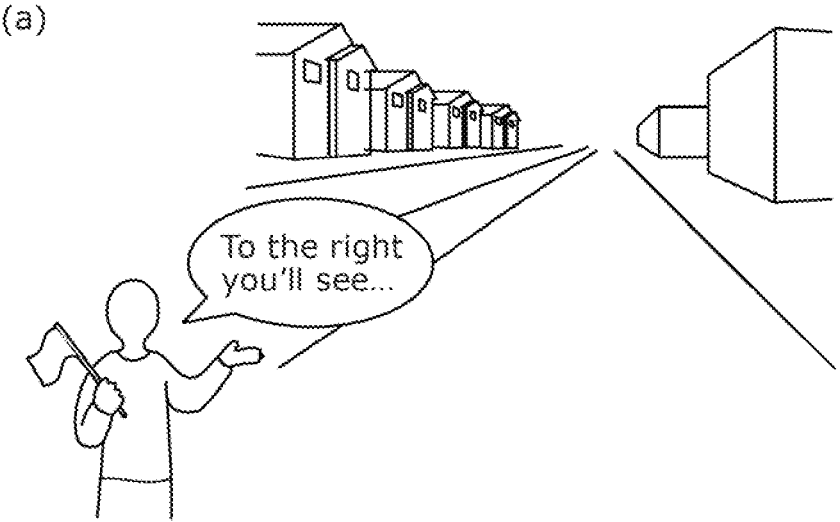
(b)
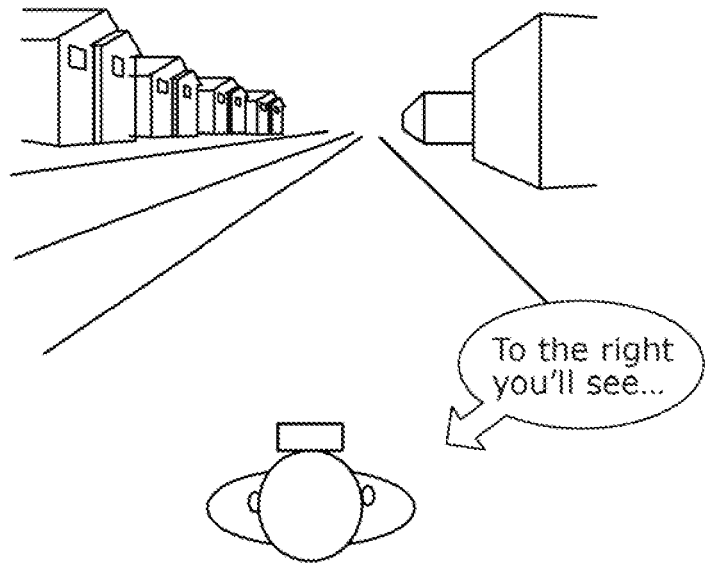

FIG. 31
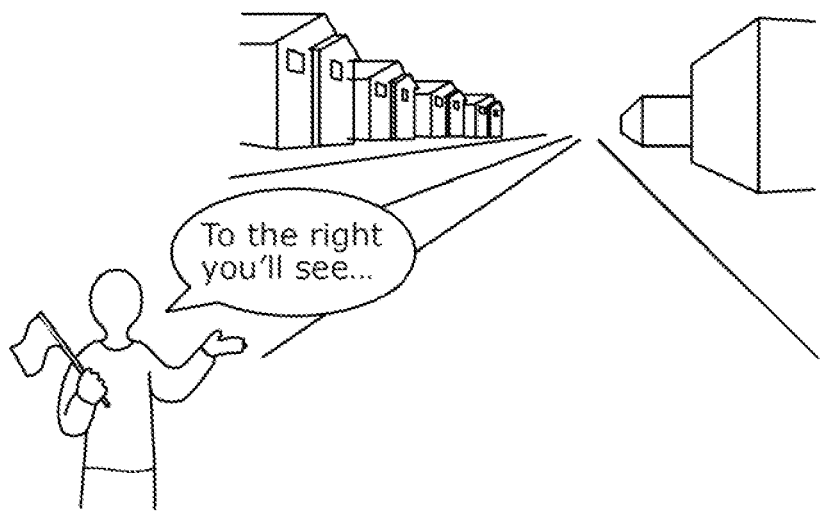
(a)
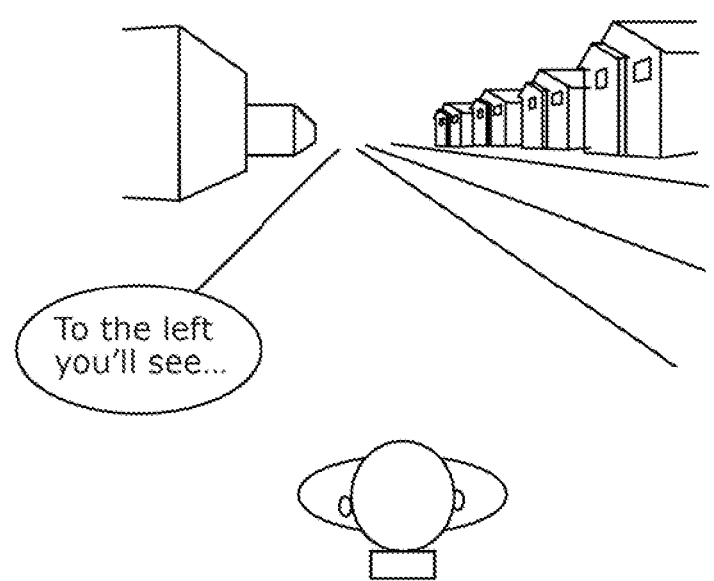
(b)

FIG. 36

| Type | Data configuration | Comments |
|---|---|---|
| Metadata type | | Code indicating for VR use |
| Version number | | Version of metadata in question |
| Function code | 0 or 0011 | Reset, indicate invalid, or indicate cue data structure (0011) |
| Cue data type | Code indicating that metadata indicates plural targets | If 0, no size or cue data; indicates cue code type via predetermined code |
| Cue data size | Bytes | 0 indicates no cue data |
| Cue data | | |
| Reference position | X, Y, Z or latitude, longitude, altitude | If 0 or particular pattern, position at time of reset is used as reference value |
| Camera position | X, Y, Z or latitude, longitude, altitude | Absolute coordinates or relative coordinates from reference-based coordinates |
| Guide position | Horizontal rotation angle, elevation angle, horizontal distance, or X, Y, Z | Relative position from position in front of camera |
| Movement direction, speed | Direction (orientation) of movement, speed | Direction from front of camera or orientation with north as front, speed is absolute value of speed or speed in X, Y and orientation or direction from front of camera |
| Target count | n | No target when 0 |
| Position of target (1) | Horizontal rotation angle, elevation angle, horizontal distance, or X, Y, Z | Relative position from position in front of camera |
| Position of target (2) | Horizontal rotation angle, elevation angle, horizontal distance, or X, Y, Z | Relative position from position in front of camera |
| : | : | |
| Position of target (n) | Horizontal rotation angle, elevation angle, horizontal distance, or X, Y, Z | Relative position from position in front of camera |
| Verification code | | Code such as CRC for checking metadata consistency |

FIG. 37

| | Meaning | Definition |
|---|---|---|
| 1st byte | Cue data type | 0: idle (do nothing); 1: Prepare (next operation specification incoming); 2: start changing direction; 3: changing direction; 4: stop changing direction; 5: start changing position; 6: changing position; 7: stop changing position |
| 2nd byte | Target specification | 0: undefined; other: target number |
| 3rd & 4th bytes | Direction specification | Take forward direction of 360° camera as 0°, specify clockwise direction changes in 1° units (if signed, -90° is left; if unsigned, 270° is left) |

FIG. 38

| Type | Data configuration | Comments |
|---|---|---|
| Metadata type | | Code indicating for VR use |
| Version number | | Version of metadata in question |
| Function code | 0 or 0021 | Reset, indicate invalid, or indicate movement target with cue data structure (0021) |
| Cue data type | Code indicating that metadata indicates plural targets | If 0, no size or cue data; indicates cue code type via predetermined code |
| Cue data size | Bytes | 0 indicates no cue data |
| Cue data | | 2nd byte always 0 |
| Reference position | X, Y, Z or latitude, longitude, altitude | If 0 or particular pattern, position at time of reset is used as reference value |
| Camera position | X, Y, Z or latitude, longitude, altitude | Absolute coordinates or relative coordinates from reference-based coordinates |
| Guide position | Horizontal rotation angle, elevation angle, horizontal distance, or X, Y, Z | Relative position from position in front of camera |
| Movement target | Specify destination to move to from target or guide position | In one example, 0 indicates guide position is movement target; other values indicate target(i) is movement target |
| Target count | n | If 0, use information for target that has already been defined |
| Position of target (1) | Horizontal rotation angle, elevation angle, horizontal distance, or X, Y, Z | Relative position from position in front of camera |
| Position of target (2) | Horizontal rotation angle, elevation angle, horizontal distance, or X, Y, Z | Relative position from position in front of camera |
| ⋮ | ⋮ | |
| Position of target (n) | Horizontal rotation angle, elevation angle, horizontal distance, or X, Y, Z | Relative position from position in front of camera |
| Verification code | | Code such as CRC for checking metadata consistency |

VR exhibition example

VR mall example

Moving method in VR system

VIDEO DISPLAY SYSTEM, INFORMATION PROCESSING DEVICE, INFORMATION PROCESSING METHOD, AND RECORDING MEDIUM

CROSS-REFERENCE OF RELATED APPLICATIONS

This application is the U.S. National Phase under 35 U.S.C. § 371 of International Patent Application No. PCT/JP2022/018087, filed on Apr. 18, 2022, which in turn claims the benefit of U.S. Provisional Patent Application No. 63/176,004, filed on Apr. 16, 2021, the entire disclosures of which applications are incorporated by reference herein.

TECHNICAL FIELD

The present disclosure relates to a video display system, an observation device, an information processing device, an information processing method, and a recording medium.

BACKGROUND ART

In recent years, there has been much development of display devices that are worn on the head, commonly known as head-mounted displays. For example, Patent Literature (PTL) 1 discloses a head-mounted display that can present (i.e., display) video of content and video of the outside world. In the head-mounted display disclosed in PTL 1, the luminance of at least one of the video of content or the video of the outside world is adjusted to reduce the discomfort of the user when switching between the video of content and the video of the outside world.

CITATION LIST

Patent Literature

[PTL 1] Japanese Unexamined Patent Application Publication No. 2016-090773

SUMMARY OF INVENTION

Technical Problem

There are applications for display devices such as head-mounted displays that take advantage of their highly immersive nature, such as simulating an experience at a certain location by viewing video from a remote location. In such cases, the display device is required to provide appropriate video.

The present disclosure has been conceived in view of the above, and has an object to provide a video display system and the like that are capable of displaying appropriate video.

Solution to Problem

In order to achieve the above object, a video display system according to one aspect of the present disclosure is for displaying a display video via a display device, and includes: an observation device including: a capturing unit configured to generate a wide-angle video; a data obtainment unit configured to obtain (i) data related to at least one of a position or a direction of a gazing target in the wide-angle video to be gazed at by a user of the display device and (ii) cue information for informing the user of a change in a state of an observation system; a metadata composition unit configured to compose metadata from the data from the data obtainment unit and other information; and a transmission unit configured to transmit the wide-angle video together with the metadata; and a VR device including: a reception unit configured to receive the wide-angle video, the data, and the cue information; a display state estimation unit configured to estimate at least one of a position or a direction of the display device in the wide-angle video; a differential calculation unit configured to calculate, based on a difference between (i) at least one of the position or the direction of the display device in the wide-angle video as estimated and (ii) at least one of the position or the direction of the gazing target in the metadata, at least one of a relative position or a relative direction of the gazing target, the relative position being relative to the position of the display device in the wide-angle video, the relative direction being relative to the direction of the display device in the wide-angle video; a presentation unit configured to present, to the user of the display device, (i) information on at least one of the relative position calculated or the relative direction calculated, (ii) an instruction in accordance with the cue information, and (iii) a state of the observation system; a video generation unit configured to generate, from the wide-angle video received, the display video including a portion corresponding to a viewing area corresponding to (i) information on at least one of the position or the direction of the display device in the wide-angle video as estimated from the wide-angle video by the display state estimation unit, (ii) the instruction in accordance with the cue information, and (iii) the state of the observation system; and the display device that displays the display video.

An information processing device according to one aspect of the present disclosure is used in a video display system for displaying a display video on a display device, the display video being at least part of a wide-angle video, and includes: a reception unit configured to receive metadata that is based on input data related to at least one of a position or a direction of a gazing target to be gazed at by a user of the display device in the wide-angle video; and a differential calculation unit configured to calculate and output at least one of a relative position or a relative direction of the gazing target, based on a difference pertaining to at least one of the position or the direction of the gazing target in the metadata, the relative position being relative to a position of the display device in the wide-angle video, the relative direction being relative to a direction of the display device in the wide-angle video.

An information processing method according to one aspect of the present disclosure is for displaying a display video on a display device, the display video being at least part of a wide-angle video, and includes: receiving metadata based on input data related to at least one of a position or a direction of a gazing target to be gazed at by a user of the display device in the wide-angle video; and calculating and outputting, based on a difference between (i) at least one of a position or a direction of the display device in the wide-angle video as estimated and (ii) at least one of the position or the direction of the gazing target in the metadata, at least one of a relative position or a relative direction of the gazing target relative to an orientation of the display device.

General or specific aspects of the present disclosure may be realized as a system, a device, an integrated circuit, a computer program, a computer readable recording medium such as a CD-ROM, or any given combination thereof.

Advantageous Effects of Invention

The present disclosure provides a video display system and the like that are capable of displaying appropriate video.

BRIEF DESCRIPTION OF DRAWINGS

FIG. 21 conceptually illustrates the generation of display video according to an embodiment.
FIG. 22 conceptually illustrates the generation of display video according to an embodiment.
FIG. 23 conceptually illustrates the generation of display video according to an embodiment.
FIG. 24 conceptually illustrates the generation of display video according to an embodiment.
FIG. 25 conceptually illustrates the generation of display video according to an embodiment.
FIG. 26 conceptually illustrates the generation of display video according to an embodiment.
FIG. 27 conceptually illustrates the generation of display video according to an embodiment.
FIG. 29 conceptually illustrates the generation of display video according to an embodiment.
FIG. 30 conceptually illustrates the generation of display video according to an embodiment.
FIG. 31 conceptually illustrates the generation of display video according to an embodiment.
FIG. 36 illustrates an example of the metadata structure according to an implementation example.
FIG. 37 illustrates an example of the metadata structure according to an implementation example.
FIG. 38 illustrates another example of the metadata structure according to an implementation example.

DESCRIPTION OF EMBODIMENTS

Knowledge Forming the Basis of Disclosure

Figure 1:
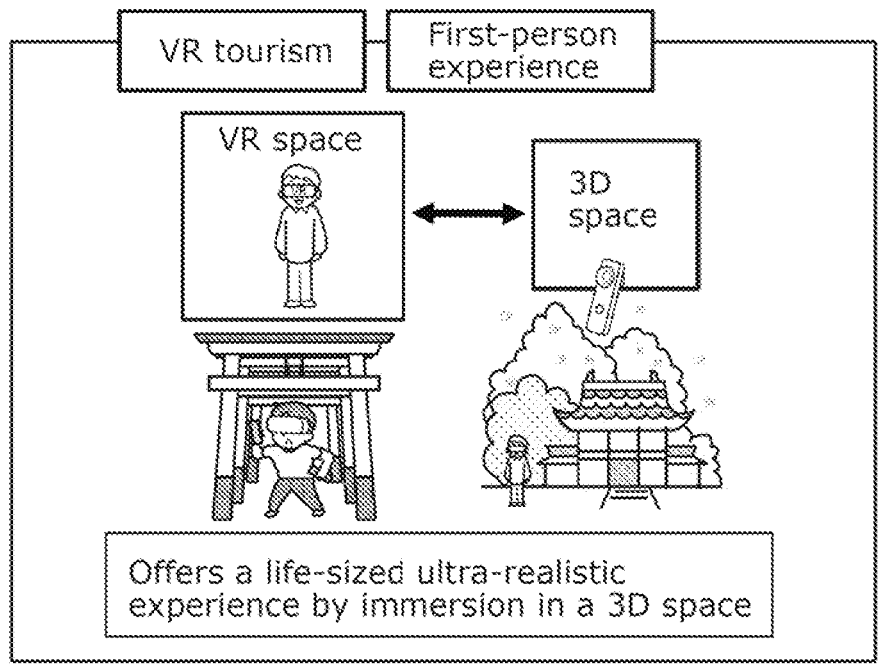
FIG. 1 is for illustrating a conventional example.

In recent years, display devices have been developed that enable a user to wear the display unit on their heads, placed in front of their eyes, and thus view displayed images on a screen that appears to be large. Such a display device is known as a head-mounted display (HMD), and allows images to optically appear as a large screen. Some HMDs also allow the video being viewed to appear three-dimensionally by displaying video with a disparity shift corresponding to the user's right and left eyes. Recent improvements in communication quality have made it possible to view video captured by remotely located observation devices in real time with a delay of only a few to tens of milliseconds, enabling the viewer to experience the scene as if they were there without having to visiting the site. Utilizing this technology, virtual tourism experiences such as sightseeing tours, exhibition tours, inspection tours, factory tours, and visits to art and other types of museums, zoos, and aquariums (hereinafter referred to as "pseudo tourism" or "VR (virtual reality) tourism") have also come about.

Cameras capable of capturing 360-degree (full circle in the horizontal plane) video (also referred to as an omnidirectional camera) are used as observation devices in VR tourism. The video captured by the observation device is a wide-angle video, forming a three-dimensional image space. The user side of the display device can cut out and display an image of the viewing range in any direction from the video (i.e., an image that constitutes the 3D image space). For example, if the display device includes a function for detecting the direction in which the user is facing, the display device can cut out and display a portion of the three-dimensional image space in accordance with the user's orientation, making it possible to provide a viewing experience that meets the needs of many users from a video captured by a single camera.

When the user is looking at a portion of the video in an arbitrary direction and is instructed by the guide in the video to gaze at a given gazing target, the user may not understand where in the 3D image space this instructed gazing target is. For example, if the user is looking in the 3 o'clock direction and the guide present in the 12 o'clock direction gives the user voice instructions such as "please look to your left" to make the user look in the 9 o'clock direction, the user will look in the 12 o'clock direction instead of the 9 o'clock direction. Thus, if the guide issues instructions to the user to gaze at the gazing target based on the assumption that the user is looking forward, the user may not be able to understand where the gazing target the guide is referring to is located.

In view of this, the present disclosure has an object to provide a video display system capable of presenting to the user a direction corresponding to a gazing target in order to inhibit such a situation in which the user cannot understand where the gazing target is. Although the description in the present disclosure presents an example in which 360-degree wide-angle video is captured by the observation device, a wide-angle video may be, for example, a video captured over 270 degrees, 180 degrees, or 150 degrees, or some other given angular range. The wide-angle video may be at least wider than the angle at which the user views the video displayed on their display device. Although the present disclosure describes a video display system that assumes video movement occurring in the horizontal plane, the present disclosure can also be applied to video movement occurring in an intersecting plane that intersects the horizontal plane, including vertical components.

Hereinafter, conventional video display systems and the like will be described in further detail with reference to the drawings. FIG. 1 is for illustrating a conventional example. As illustrated in FIG. 1, a service called VR tourism (first-person experience) has conventionally been offered. With VR tourism, if a local space is properly reproduced in VR, it is possible to experience tourism as if one were in that location. Examples of services with 360° degree camera photography include FirstAirlines (https://firstairlines.jp/index.html) and Travel Aid (https://www.tokyotravelpartners.jp/kaigotabisuke-2/). Examples of services with 3D computer graphics (CG) include Google Earth VR and Boulevard (https://www.blvrd.com/).

Figure 2:
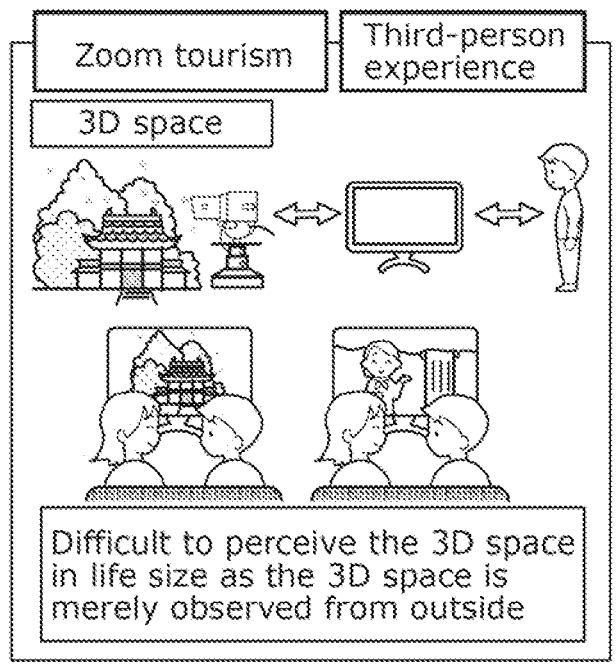
FIG. 2 is for illustrating a conventional example.

FIG. 2 is for illustrating a conventional example. As illustrated in FIG. 2, in addition to VR tourism, other services for viewing such videos from a third-person perspective by displaying videos captured at the site on a display device such as a television (also called third-person experiences) are also offered. A third-person experience offers features such as user-specific services, such as guides by experts, that can be monetized if they fit the individual's interests.

Figure 3:
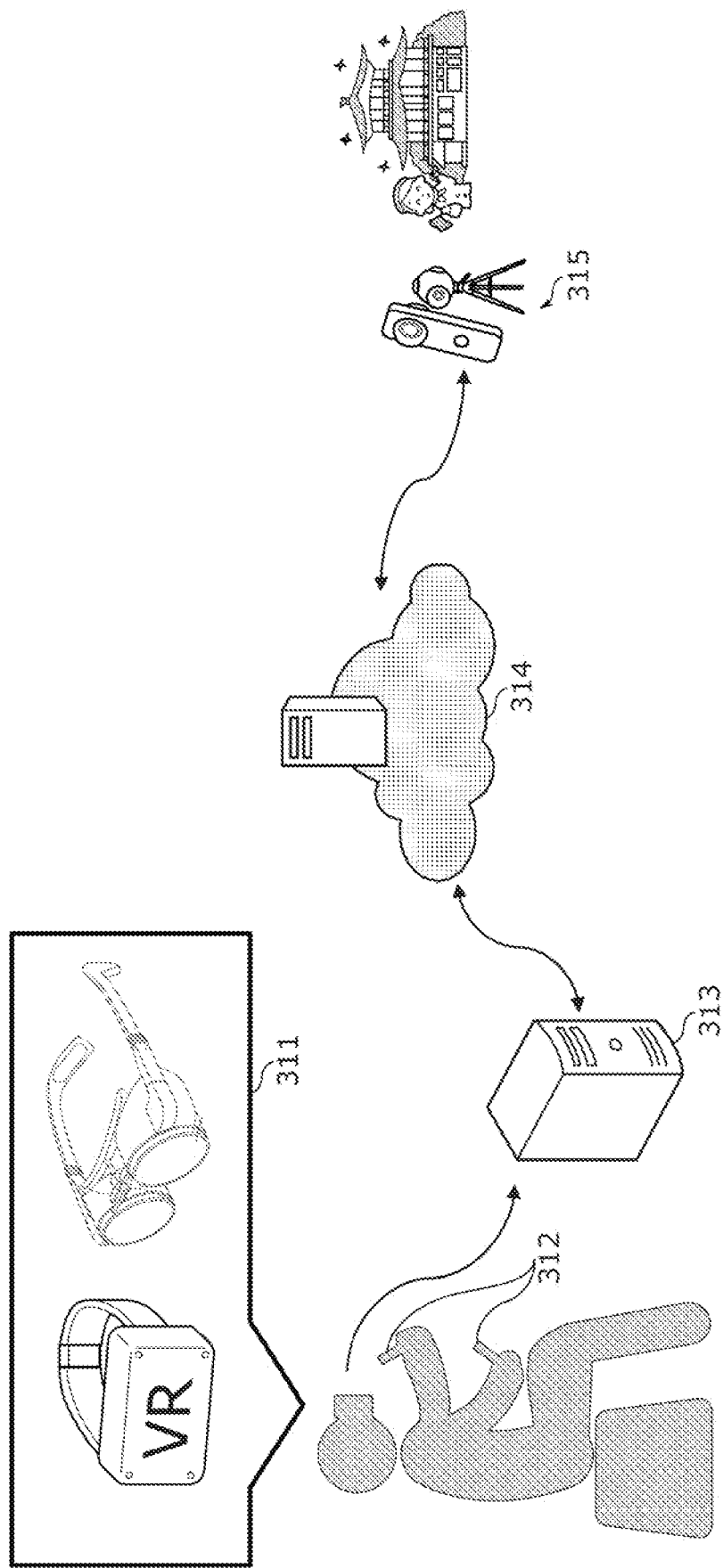
FIG. 3 is for illustrating a conventional example.

FIG. 3 is for illustrating a conventional example. As illustrated in FIG. 3, when developing VR tourism, the basic configuration requires the VR system main unit, controller 311, computer/smartphone 313, network/cloud 314, and observation system 315. Conventionally, the VR system main units were solely HMD units, which are heavy and cover the face considerably, but smaller units that are more like glasses are becoming more widespread as they are easier to use for long periods of time. There are two types of VR system main units: the all-in-one type in which the VR system main unit performs all the necessary functions, and the tethered type in which some functions are left to, for example, a computer/smartphone. The controller is used for, for example, menu selection and to move through the VR space. In some cases, the computer/smartphone may include only communication functionality, and in other cases may be a part of the VR system.

Network/cloud 314 connects the observation system and the VR system, and may implement some functions of the observation system or the VR system on a cloud-based computer system. The observation system utilizes a 360° camera with wireless capability or a 360°, 180°, or wide-angle camera connected wirelessly or over a wire to a computer or smartphone. Through these devices, users 312 can view the guide and the buildings and scenery to be visited in the VR space.

Although VR tourism utilizing a 360° camera is used as an example here, VR tourism may utilize anything that allows participants using VR glasses to change their viewpoints, such as a 180° camera. Moreover, although some examples include capturing video and providing a guide of actual scenery, sightseeing can also be realized by using a virtual camera in a virtual space constructed using computer graphics instead of actual scenery, by having guides enter such a virtual space using, for example, VR glasses, and by playing videos in the virtual space. Accordingly, the present invention can be applied to such applications. A typical example of the above is VR travel to areas and spaces that are not easily accessible to the average traveler, such as the moon.

Figure 4:
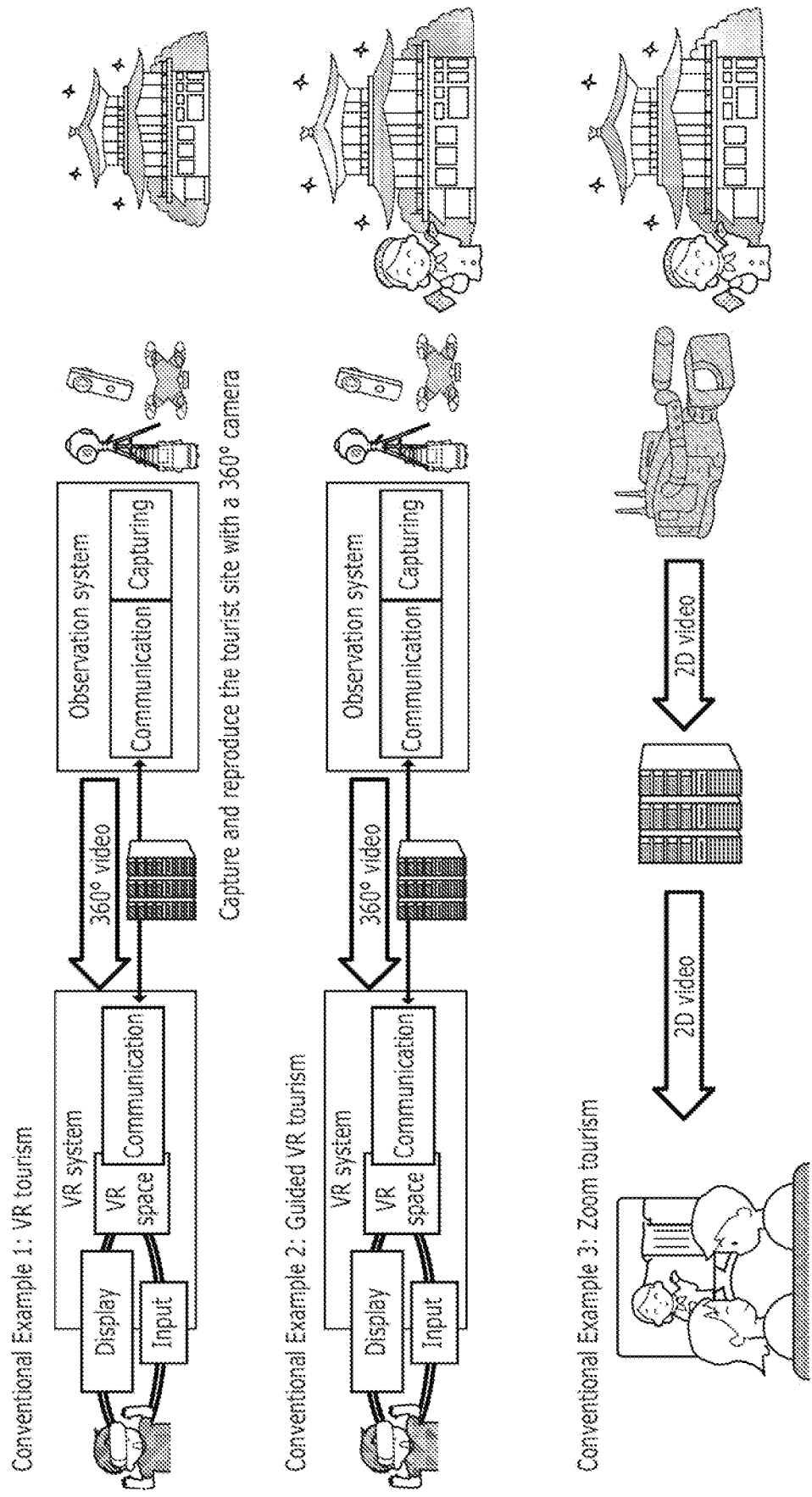
FIG. 4 is for illustrating a conventional example.

FIG. 4 is for illustrating a conventional example. FIG. 4 illustrates a schematic configuration of a VR tourism service utilizing 360° camera photography (upper row: without guide (hereinafter referred to as Conventional Example 1), middle row: with guide (hereinafter referred to as Conventional Example 2)) and a conventional example of a Zoom (registered trademark) sightseeing service, which is one example of a third-person experience (lower row (hereinafter referred to as Conventional Example 3)). In the present invention, audio, audio data, and audio information include not only spoken conversation but also audio signals including music and possibly ultrasonic waves outside the audible bandwidth. In VR tourism services, the observation system (tourism destination) side can send out pre-recorded videos, and the VR system side can operate a 360° camera, robot, or drone to view VR videos on the VR system side. As illustrated in the middle row, it is also possible to have a guide or camera operator on the observation system side and experience the VR video from a 360° camera or the like as VR using the VR system. As illustrated in the lower row, in the third-person experience, 2D video is sent in 2D from the observation system side through an audio visual remote conversation service that a plurality of people participate in such as Zoom, allowing visitors to view and experience video of tourism destinations from a remote location.

Figure 5:
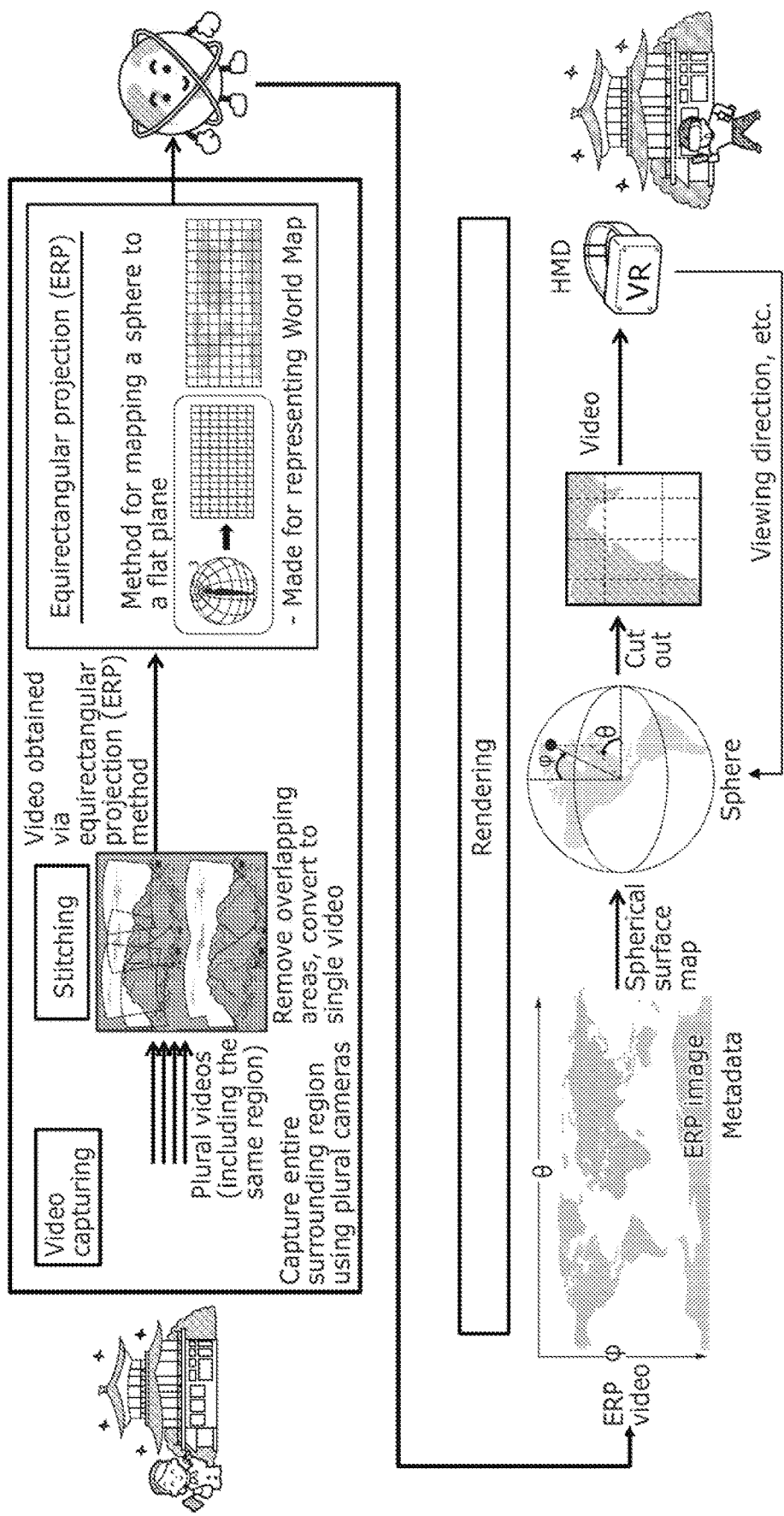
FIG. 5 is for illustrating a conventional example.

FIG. 5 is for illustrating a conventional example. Next, the overall system configuration for Conventional Example 2 will be described. Conventional Example 1 differs from Conventional Example 2 in that a pre-recorded VR video is used or operations are performed from the VR system side, and the differences between the two will also be explained. The observation system according to Conventional Example 2 includes a camera for capturing VR video such as a 360° camera, and a communication device for sending the captured information to a remote location.

The 360° camera for capturing VR video combines (stitches) videos from a plurality of cameras that capture video in different directions into a single video, maps it onto a flat surface using, for example, the equirectangular projection (ERP) method, compresses it appropriately as an ERP image, and sends it along with audio data captured by, for example, a microphone from the communication device to the VR system at the remote location. The 360° camera may be equipped on a robot or a drone, for example. The 360° camera or the robot or drone equipped with the 360° camera is operated by the photographer or guide. In Conventional Example 1, the 360° camera or the robot or drone equipped with the 360° camera may be operated on the VR system side, or the pre-recorded video or the like may be received on the VR system side. Thus, a three-dimensional image space is a concept that includes not only the images that constitute the space, in which the user experiences depth, but also the images displayed as a result, which are flat and include a plurality of flat images arranged in a virtual three-dimensional plane.

On the VR system side, contrary to the observation system, the received flat video (ERP image) is converted into a spherical video, a portion of the spherical video is cut out according to the observer's orientation and position and then displayed on the VR display device. In Conventional Example 3, the received video is 2D, so it is displayed as 2D, and in most cases, a 2D display device such as a tablet, smartphone, or TV will be used. The above also applies to cases in which pre-recorded video is received in Conventional Example 1.

In cases in which the 360° camera or the robot or drone equipped with the 360° camera is operated on the VR system side, there are instances where the observation system operates in conjunction with the orientation and position from the VR system side or operates according to key presses made via a mouse, a tablet, a joystick, and/or a keyboard, or by menus and icons being selected on a screen. Here, appropriate control data needs to be sent from the VR system side to the observation system and the situation on the observation system side, i.e., the orientation and position on the observation system side needs to be sent to the VR system.

Figure 6:
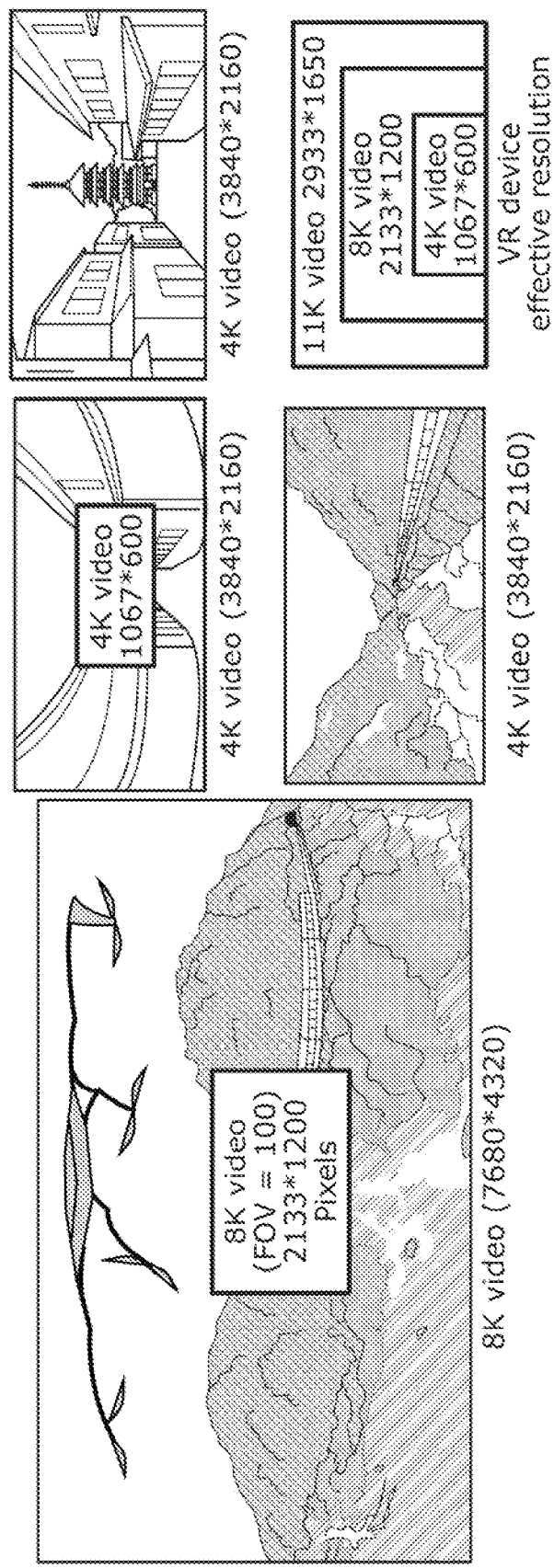
FIG. 6 is for illustrating a conventional example.

FIG. 6 is for illustrating a conventional example. The resolution of a 360° video when viewed on a VR system will be described while comparing and contrasting 360° video and regular video illustrated in FIG. 6. When a 360° 4K video is viewed on VR equipment with a viewing angle (FOV) of 100 degrees, the resolution of the video cut out for VR display is only 1067×600 (about twice that of SD video). Since a VR system using a 2K×2K resolution panel for one eye displays video on a square panel, the vertical direction is further stretched by a factor of two, resulting in a very low resolution video.

The resolution of the VR display for 8K video is 2133× 1200, which is 1.23 times the full HD (1920×1080) surface area in terms of data volume, but the vertical direction is stretched by a factor of 2, so the resolution of the video is approximately full HD. For 11K video (10560×5940), the VR resolution is 2933×1650, which is equivalent to the VR system.

In order to provide a high-resolution, highly realistic VR tourism experience, it is necessary to capture at least 8K, preferably 11K. Capturing 8K and 11K requires larger equipment, higher video transfer rates, and greater storage capacity. This makes both capturing and streaming expensive.

Therefore, it is essential to make the system easy to understand and use, to avoid VR sickness, and to lower the unit cost per user to make it more available to a large number of users. Effective use of VR recorded content will also be important for viable business.

Figure 7:
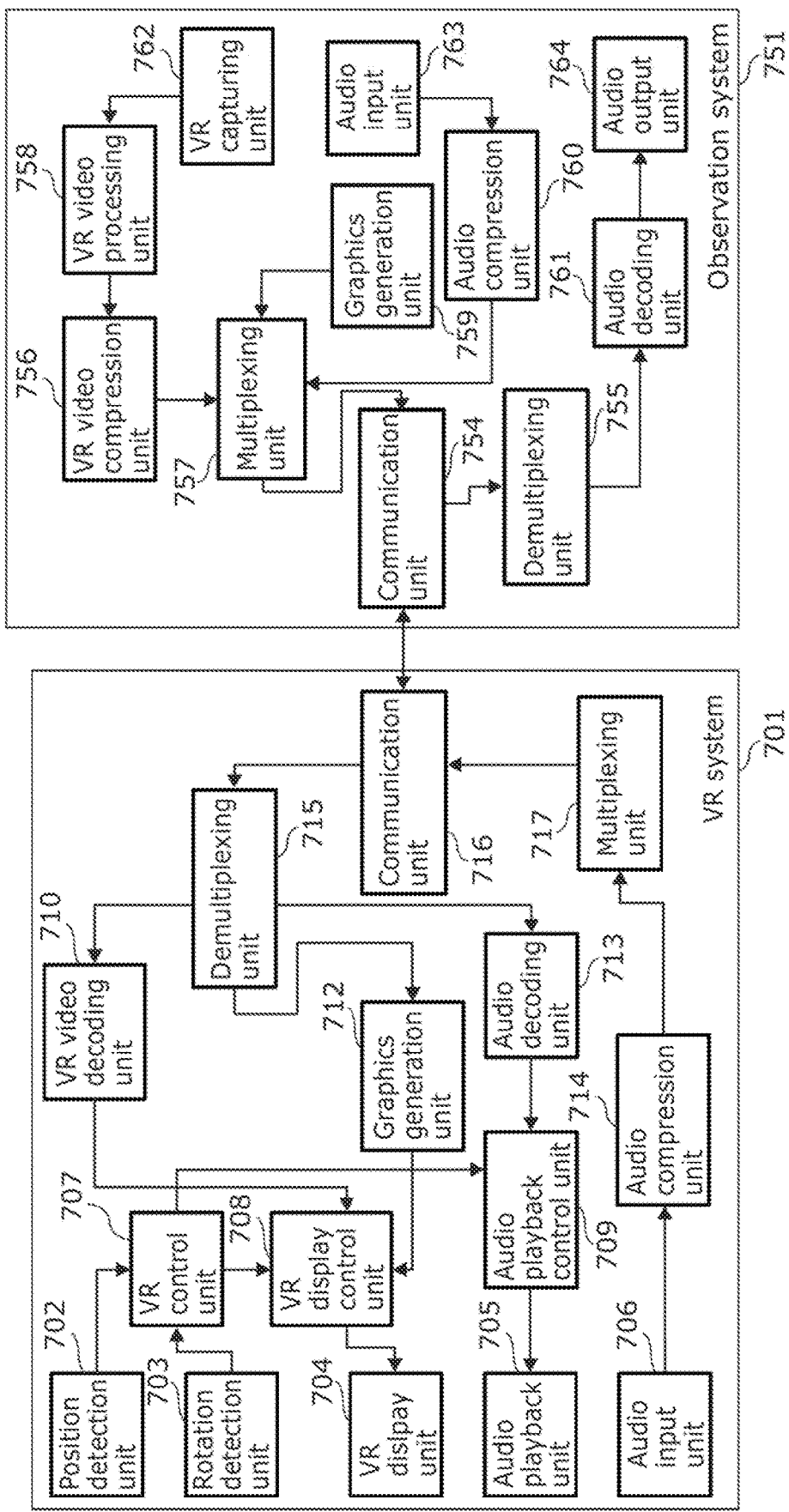
FIG. 7 is for illustrating a conventional example.

FIG. 7 is for illustrating a conventional example. Next, the main functions of Conventional Examples 1 and 2 will be described. Observation system 751 of Conventional Examples 1 and 2 includes: VR capturing unit 762 (VR capturing camera) for capturing VR video; VR video processing unit 758 that processes the video captured by VR capturing unit 762 to make images suitable for transmission; VR video compression unit 756 that compresses the VR video processed by VR video processing unit 758 to a data rate and video signal format suitable for transmission; audio input unit 763 including a microphone for receiving audio from the guide and surrounding area; audio compression unit 760 that compresses the audio signal input via audio input unit 763 to a data rate and audio signal format suitable for transmission; graphics generation unit 759 that generates auxiliary information as graphics; multiplexing unit 757 that converts the video signal compressed by VR video compression unit 756, the audio signal compressed by audio compression unit 760, and the graphics information compressed by graphics generation unit 759 into signals suitable for transmission; communication unit 754 for transmitting communication observation signals multiplexed by multiplexing unit 757 to a plurality of VR systems 701 and receiving communication audio signal from the plurality of VR systems 701; demultiplexing unit 755 that extracts compressed audio signals from the communication audio signals received by communication unit 754; audio decoding unit 761 that extracts audio signals from the compressed audio signals from demultiplexing unit 755; and audio output unit 764 for outputting the audio signals decoded by audio decoding unit 761 as sound.

In this example, VR video processing unit 758, VR video compression unit 756, and graphics generation unit 759 are realized in the GPU, while audio compression unit 760, multiplexing unit 757, demultiplexing unit 755, and audio decoding unit 761 are realized in the CPU, but this example is non-limiting; in a simpler configuration, the CPU and the GPU may be realized as a single processor with their original functional configuration and operation.

VR capturing unit 762 is, for example, a 360° camera, and more specifically includes a plurality of cameras that capture images in different directions. The outputs of the cameras are combined (stitched) in the VR video processing unit to create a single video, which is mapped onto a flat surface using, for example, the equirectangular projection (ERP) method, the result is output as an ERP image.

In contrast to observation system 751, VR system 701 according to Conventional Examples 1 and 2 includes: communication unit 716 that receives communication observation signals transmitted from observation system 751 or transmits, to observation system 751 as communication audio information, audio input via VR system 701; demultiplexing unit 715 that demultiplexes and outputs the compressed VR video (ERP image), graphics information, and compressed audio information from the communication observation signal from communication unit 716; VR video decoding unit 710 that decodes the compressed VR video (ERP image) from demultiplexing unit 715; VR display control unit 708 that converts ERP images from VR video decoding unit 710 into spherical video, cuts out a portion according to control information from VR control unit 707 to obtain video displayable on VR display unit 704, and outputs graphics information from graphics generation unit 712 that converts graphics information output from demultiplexing unit 715 into graphics to be displayed, along with VR video to be displayed on VR display unit 704; and VR display unit 704 that outputs VR video from VR display control unit 708 for viewing by both eyes. The respective outputs of rotation detection unit 703 that detects the front, back, left, and right tilting of VR display unit 704 or the direction of the whites of the eyes and position detection unit 702 that detects the front, back, left, and right tilting of VR display unit 704 and position in the height direction are transmitted to VR control unit 707, and according to the output of VR control unit 707, the video to be displayed on VR display unit 704 and the audio output by the audio playback control unit and audio playback unit 709 are appropriately controlled. Compressed audio information demultiplexed by demultiplexing unit 715 is decoded in audio decoding unit 713 and transmitted to audio playback control unit 709 as audio information. In audio playback control unit 709, according to the control information from VR control unit 707, the balance in the left, right, front, and back directions is corrected and in some cases frequency characteristics processing, delay processing and creation of alarms for VR system 701 are carried out. Graphics generation unit 712 also generates graphics for displaying system menus and warnings for VR system 701, which are superimposed on the VR images and displayed on VR display unit 704. VR system 701 includes audio input unit 706 for receiving input of audio (speech) by the user of VR system 701, and audio information from audio input unit 706 is compressed by audio compression unit 714 into compressed audio information, transmitted to multiplexing unit 717, and sent to observation system 751 from communication unit 716 as communication audio information.

Figure 8:
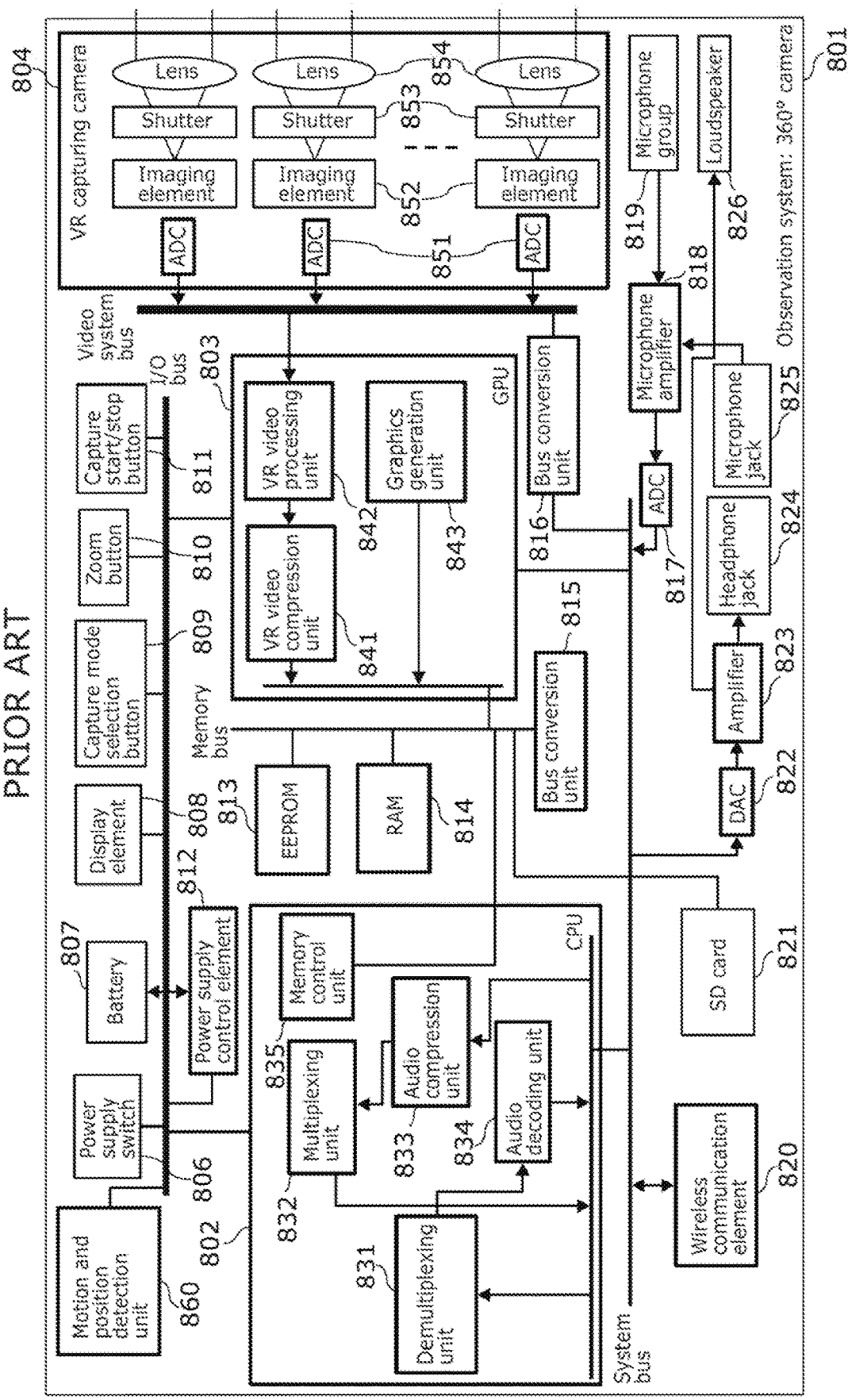
FIG. 8 is for illustrating a conventional example.

FIG. 8 is for illustrating a conventional example. Next, a typical realization example of 360° camera 801 will be described as a typical realization example of the observation system according to Conventional Example 2.

A typical example of 360° camera 801 combines two imaging systems each including ultra-wide angle lens 854, shutter 853, and imaging element 852, and captures 360° video all around (in the front, back, up, and down directions). Since two or more imaging systems may be combined to capture higher quality images, in this example, VR capturing camera 804 is illustrated as including two or more imaging systems. The imaging system may consist of a combination of independent cameras, in which case there is generally a high-speed digital video interface after ADC 851 for the video, and with this, the independent cameras are connected to high-speed digital video input connected to the video system bus connected to the graphics processing unit (GPU) 803 or central processing unit (CPU) 802, but the imaging system is described here as an integrated unit.

The main components of 360° camera 801 are: VR capturing camera 804 including the above-described plurality of imaging systems; GPU 803 that mainly processes video data and graphics; CPU 802 that performs general data processing, input/output processing, and overall control of 360° camera 801; Electrical Erasable Programmable ROM (EEPROM) 813 that stores programs for operating CPU 802 and GPU 803; RAM 814 that is used to store data for CPU 802 and GPU 803; SD card (registered trademark) 821, which is removable memory for storing video, audio, and programs; wireless communication element 820 for wireless communication via WiFi (registered trademark) and Bluetooth (registered trademark) for exchanging data with external devices and receiving operations from external devices; buttons and display element 808 for operating and displaying; battery 807; power supply control element 812; an audio input unit including a plurality of microphones (microphone group 819) or microphone jack 825 for inputting audio, microphone amplifier 818, and ADC 817; an audio output unit including loudspeaker 826 or headphone jack 824, amplifier 823, and DAC 822; a video system bus used to connect mainly VR capturing camera 804 and CPU 802 and read digital video data; a memory bus that connects EEPROM 813, RAM 814, SD card 821, GPU 803, and CPU 802 and transmits and receives data to and from the memory; a system bus to which CPU 802, GPU 803, wireless communication element 820, the audio input unit, and the audio output unit are connected and that transmits and receives data to and from and performs controls pertaining thereto; an I/O bus that controls and performs low-speed data transmission with the buttons and display element 808, power supply control element 812, the audio input unit and audio output unit that are not illustrated in the drawing, and VR capturing camera 804; and a number of bus conversion units 815 and 816 for connecting the above buses. Motion and position detection unit 860 is also connected to the I/O bus. Whether a process is performed by GPU 803 or CPU 802 may differ from this example, and the bus configuration may also differ from this example, but even in such cases, there is no difference in the functional configuration and operations that will be described below.

Each VR capturing camera 804 includes: lens 854 for capturing wide-angle video; imaging element 852 that converts light collected by lens 854 into an electrical signal; shutter 853 that is located between lens 854 and imaging element 852 and shuts out light; an iris (not illustrated) that is located in the same position as shutter 853 and controls the intensity of light from lens 854; and ADC 851 that converts the analog electrical signal from imaging element 852 into a digital video signal. Although not illustrated, each VR capturing camera 804 is controlled by CPU 802 via the I/O bus, and CPU 802 is notified of the states of VR capturing cameras 804.

The buttons include power supply switch 806 to turn the power supply on and off, capture start/stop button 811 to start/stop capturing, capture mode selection button 809 to change the mode of capture, which need not be provided, and zoom button 810 to move lens 854 and digitally control the angle of view and zoom in and out.

Power supply control element 812, which may be integrated with battery 807, stabilizes the voltage, manages the battery capacity, and although not illustrated, supplies power to all elements. In addition, power is supplied to the HMD/VR glasses via USB or AV output.

Each of the functions realized by GPU 803 is realized by dedicated hardware and programs, such as image processing hardware and programs, while the functions realized by CPU 802 are generally realized by general-purpose hardware and programs. As one example, GPU 803 is used to implement VR video processing unit 842, VR video compression unit 841, and graphics generation unit 843. As one example, CPU 802 is used to implement memory control unit 835, multiplexing unit 832, audio compression unit 833, audio decoding unit 834, and demultiplexing unit 831.

Figure 9:
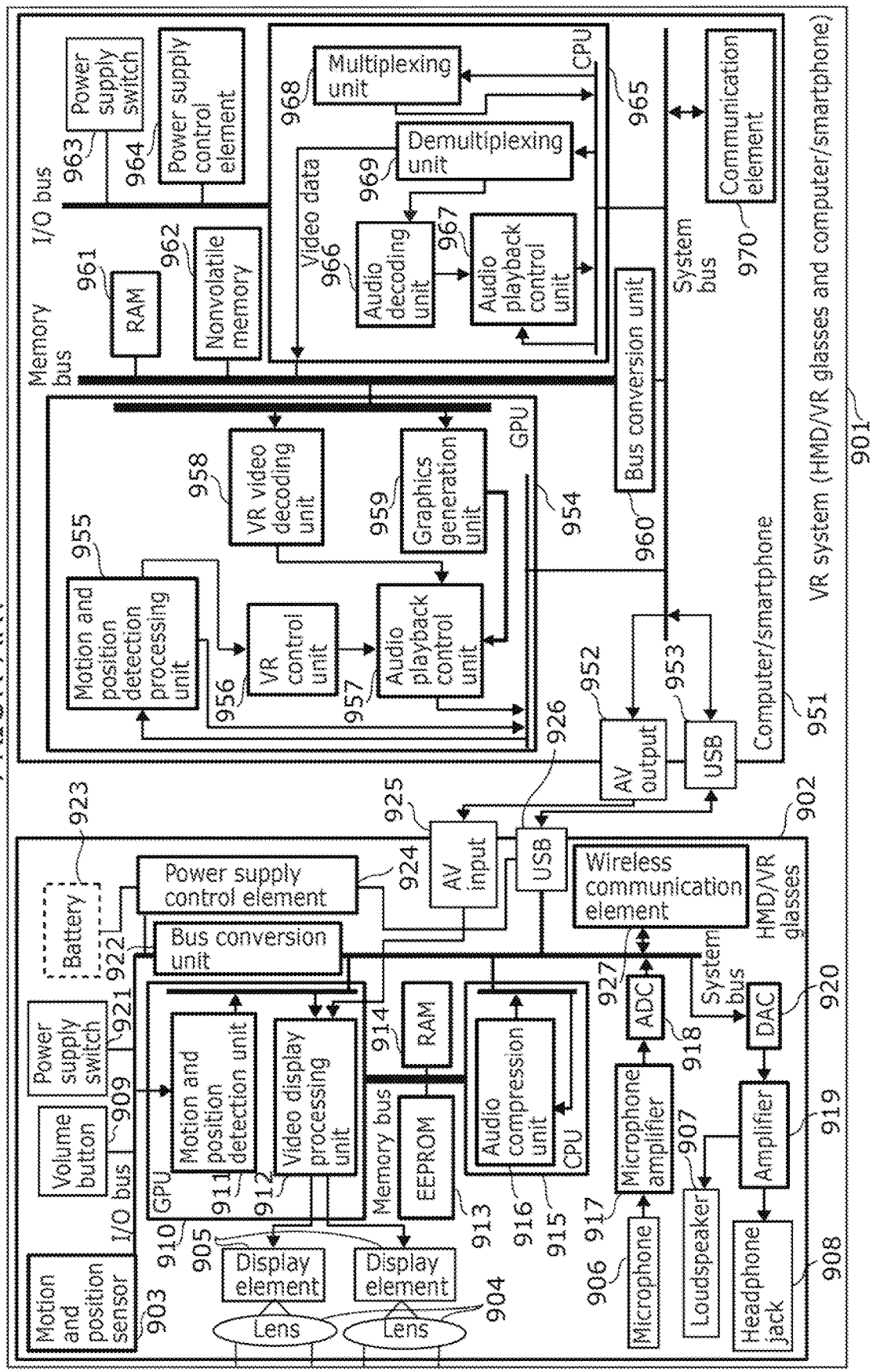
FIG. 9 is for illustrating a conventional example.

FIG. 9 is for illustrating a conventional example. With reference to FIG. 9, next, a typical realization example of VR system 901 will be described as a typical realization example of the observation system according to Conventional Example 2. In the present realization example, VR system 901 includes computer or smartphone 951 and HMD or VR glasses 902 connected thereto. In stand-alone implementation examples of HMD or VR Glasses 902, one can assume that CPU and GPU functions of both will be combined into one, as well as the peripheral functions.

The main components of computer/smartphone 951 of VR system 901 include: WiFi or Ethernet (registered trademark) high-speed communication element 970 for connecting to the observation system; GPU 954 that mainly processes video data and graphics; CPU 965 that performs general data processing and controls the entire computer/smartphone 951; nonvolatile memory 962, such as a hard disk or flash memory, for storing computer programs for operating CPU 965 and GPU 954; RAM 961 for storing data for CPU 965 and GPU 954 to operate; power supply control element 964 for supplying a supply of power to power supply switch 963 and various components; AV output 952 for outputting video and audio signals to HMD/VR 902; an interface such as USB 953 for controlling HMD/VR glasses 902 and obtaining data therefrom; a memory bus for connecting RAM 961 and nonvolatile memory 962 and allowing CPU 965 and GPU 954 to access them; a system bus for CPU 965 and GPU 954 to access AV output 952, USB 953, and communication element 970; a bus connector (bus conversion unit 960) for connecting the system bus and the memory bus; a display device (not illustrated); an input device (not illustrated) for receiving operations; and an other general-purpose interface (not illustrated).

Whether a process is performed by GPU 954 or CPU 965 may differ from this example, and the bus configuration may also differ from this example, but even in such cases, there is no difference in the functional configuration and operations that will be described below. As one example, GPU 954 is used to realize motion and position detection processing unit 955, VR control unit 956, VR display control unit 957, VR video decoding unit 958, and graphics generation unit 959. As one example, CPU 965 is used to realize audio decoding unit 966, audio playback control unit 967, multiplexing unit 968, and demultiplexing unit 969.

AV output 952 and USB 953 can be replaced by a high-speed bidirectional interface, such as USB Type-C (registered trademark). In such cases, HMD/VR glasses 902 should be connected using the same interface or with a converter that converts the interface. Generally, when transmitting video via USB 953, appropriate video compression is performed by CPU 965 or GPU 954 to compress the data and transmitted to HMD/VR glasses 902 via USB 953.

The main components of HMD/VR glasses 902 of VR system 901 include: an audio input unit including microphone 906 for inputting audio, microphone amplifier 917, and ADC 918; an audio output unit including loudspeaker 907 or headphone jack 908, amplifier 919, and DAC 920; a VR display unit including a pair of lenses 904 for the user to view VR video and display element 905; motion and position sensor 903 including a motion and position detection unit including a gyrosensor, camera, or ultrasonic microphone and an orientation detection unit; wireless communication element 927 that uses, for example, Bluetooth technology and is for communicating with a controller (not illustrated), volume button 909 for controlling the volume of output from the audio output unit; power supply switch 921 for turning on and off the power supply of the HMD/VR glasses; power supply control element 924 for controlling the supply of power; a memory bus that connects EEPROM 913, RAM 914, the SD card, GPU 910, and CPU 915 and transmits and receives data therebetween, AV input 925 for receiving video and audio signals from CPU 915, GPU 910, wireless communication element 927, and computer/smartphone 951; an interface such as USB 926 for receiving control signals from computer/smartphone 951 and transmitting video signals, audio signals, and motion and position data; CPU 915 that mainly controls audio compression (realized by audio compression unit 916), switching, and power supply, and controls the entire HMD/VR glasses 902; GPU 910 that mainly performs video display processing (realized by video display processing unit 912) for adjusting video to be displayed on the VR display unit and motion and position detection (realized by motion and position detection unit 911) of correcting/formatting motion and position information to be transmitted to computer/smartphone 951 from information from motion and position sensor 903; EEPROM 913 for storing programs and data for operating CPU 915 and GPU 910; RAM 914 for storing data to be used during operation of CPU 915 and GPU 910; a memory bus for connecting CPU 915, GPU 910, RAM 914, and EEPROM 913; a system bus to which CPU 915, GPU 910, USB 926, the audio input unit, the audio output unit, and wireless communication element 927 are connected and controls and transmits data therebetween; an I/O bus for controlling and low-speed transmission between buttons, power supply control element 924, motion and position sensor 903, the audio input unit (not illustrated), the audio output unit (not illustrated), and the VR capturing camera; and a number of bus conversion units 922 that connect the various buses. Whether a process is performed by GPU 910 or CPU 910 may differ from this example, and the bus configuration may also differ from this example, but even in such cases, there is no difference in the functional configuration and operations that will be described below.

Since the video data from AV input 925 is large and fast, it is shown as being taken directly to GPU 910 if the system bus is not fast enough.

The video information captured by the camera of motion and position sensor 903 may be transmitted to the display element as information for enabling the user to check the surroundings of HMD/VR glasses 902 or to computer/smartphone 951 via USB 926 for monitoring whether the user is in a dangerous situation.

Power supply control element 924 receives a supply of power from USB 926 or AV input 925, stabilizes the voltage, manages the battery capacity, and although not illustrated, supplies power to all elements. In some cases, battery 923 may be provided internally or externally, and may be connected to power supply control element 924.

The states of the buttons and cursor on the controller not illustrated in the drawings are obtained by CPU 915 through wireless communication element 927 and used to control button operations, movement, and applications in the VR space. The position and orientation of the controller are detected by a camera or ultrasonic sensor in the motion and position detection unit, and after appropriate processing by the motion and position sensor, they are used for control by CPU 915 and transmitted to computer/smartphone 951 via USB 926 and used for drawing graphics and image processing executed by GPU 910 or by programs executed by CPU 915. Since basic operations are not directly related to the present invention, description thereof will be omitted.

Figure 10:
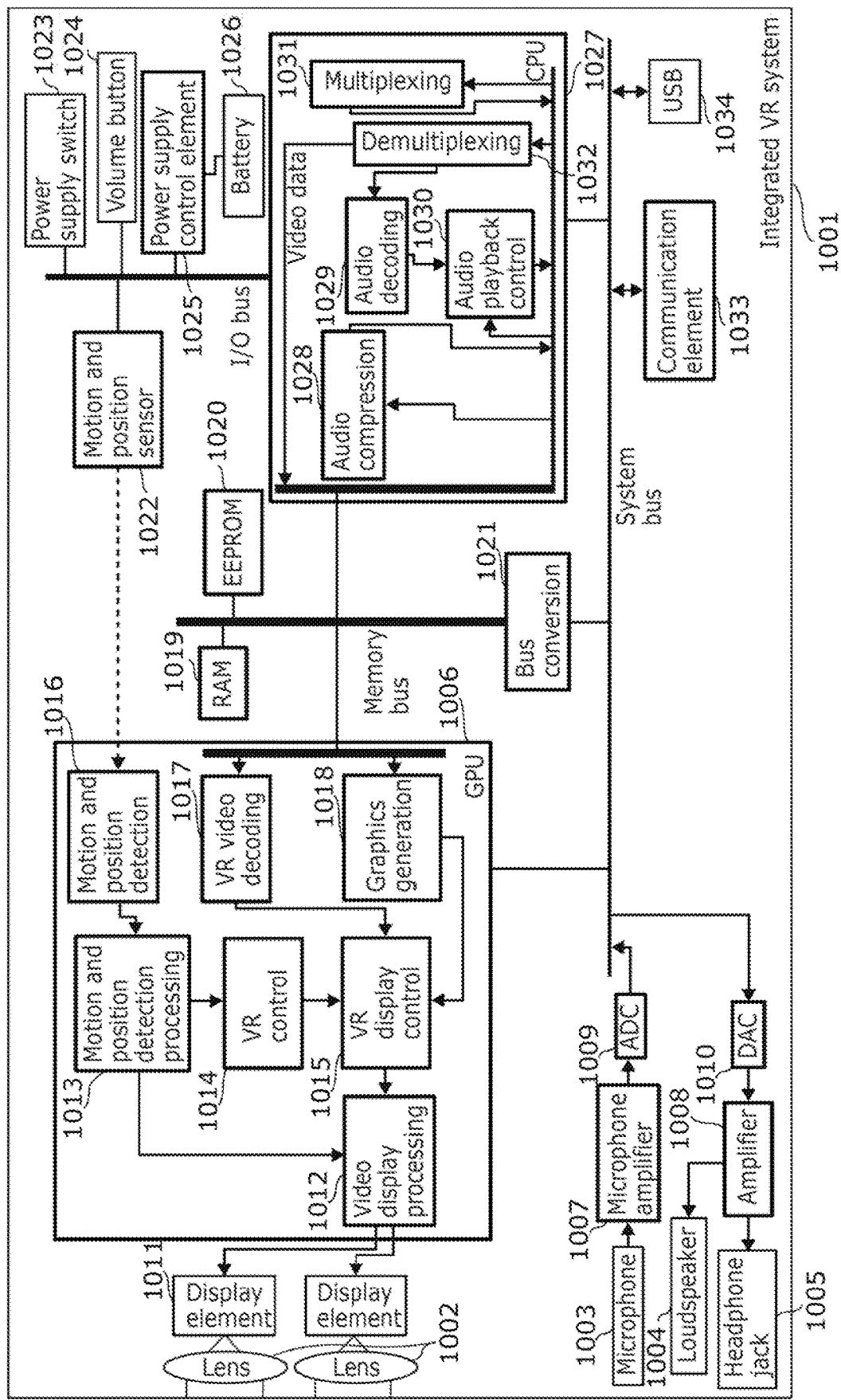
FIG. 10 is for illustrating a conventional example.

FIG. 10 is for illustrating a conventional example. Next, a realization example of integrated VR system 1001 that includes HMD/VR glasses with functions for VR within a computer/smartphone.

As illustrated in FIG. 10, the functions of the computer/smartphone and the functions of HMD/VR glasses are integrated, the CPU functions are integrated into a single CPU, and the GPU functions are integrated into a single GPU.

Communication element 1033 typically uses WiFi technology for wireless communication and includes battery 1026 as it does not include a power cable. Communication element 1033 includes a general purpose interface for a computer, such as USB 1034, for charging and initial setup of battery 1026.

Integrated VR system 1001 does not require AV output, AV input, or USB to connect the computer/smartphone and the HMD/VR glasses, enabling high-quality, delay-free transmission of AV information and efficient control. However, the size limitation of the integrated system may make it impossible to use the high-performance CPU 1027 and GPU 1006 due to power, heat, and space limitations, and may result in limited VR functionality.

However, not being connected by cables increases flexibility and broadens the range of applications.

In addition, by realizing some of the functions on a computer in the cloud, for example, it is possible to compensate for the lack of performance and realize highly functional applications.

Similar to the configurations described with reference to FIG. 8 and FIG. 9, integrated VR system 1001 also includes lens 1002, display element 1011, microphone 1003, microphone amplifier 1007, ADC 1009, loudspeaker 1004, headphone jack 1005, amplifier 1008, DAC 1010, RAM 1019, EEPROM 1020, bus conversion 1021, motion and position sensor 1022, power supply switch 1023, volume button 1024, and power supply control element 1025. Video display processing 1012, motion and position detection processing 1013, VR control 1014, VR display control 1015, motion and position detection 1016, VR video decoding 1017, and graphics generation 1018 are realized using GPU 1006. Audio compression 1028, audio decoding 1029, audio playback control 1030, multiplexing 1031, and demultiplexing 1032 are realized using CPU 1027.

Figure 11:
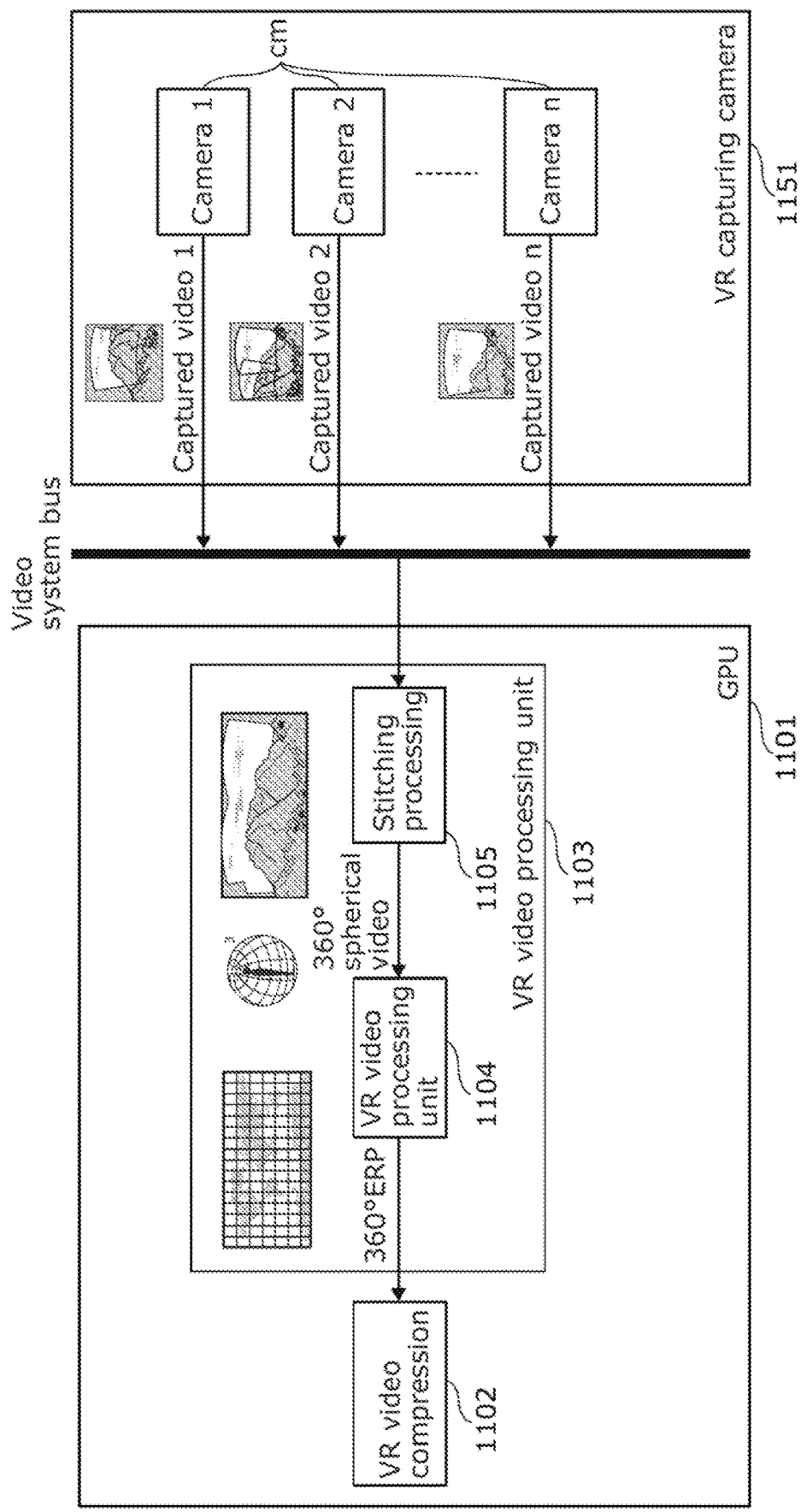
FIG. 11 is for illustrating a conventional example.

FIG. 11 is for illustrating a conventional example. Next, a more detailed configuration of VR video processing unit 1103, which processes the video captured by VR capturing camera 1151 of the observation systems according to Conventional Examples 1 and 2, will be described based on FIG. 11.

As mentioned above, a VR capturing camera includes a plurality of cameras cm, typically with ultra-wide angle lenses, for capturing 360° omnidirectional video, and the individual rectangular videos with the same pixels captured by each camera cm are input to VR video processing unit 1103, which is realized by a program or dedicated circuit in GPU 1101.

In VR video processing unit 1103, the plurality of videos captured by each camera cm are first input to stitching processing unit 1105, which evaluates the direction of each camera cm and the video captured by each camera cm, and then combines and stitches the videos together to form a continuous spherical video. The spherical video data output from stitching processing unit 1105 is mapped to a flat surface by VR video mapping unit 1104 using, for example, the equirectangular projection (ERP) method, and is output from VR video processing unit 1103 as an ERP image, which is then passed to VR video compression unit 1102.

The connection between the video system bus and the cameras is illustrated in the figure such that each camera is connected to the bus, but it is also possible to combine the signals into a single signal in VR capturing camera 1151, transmit the video captured by each camera in a time-division manner to the video bus, and input the video to VR video processing unit 1103. In a simplified configuration, since there are two cameras cm, it is possible to have GPU 1101 receive the output of each of the two cameras instead of using a bus, and have the VR videos captured in parallel received and processed by VR video processing unit 1103.

Figure 12:
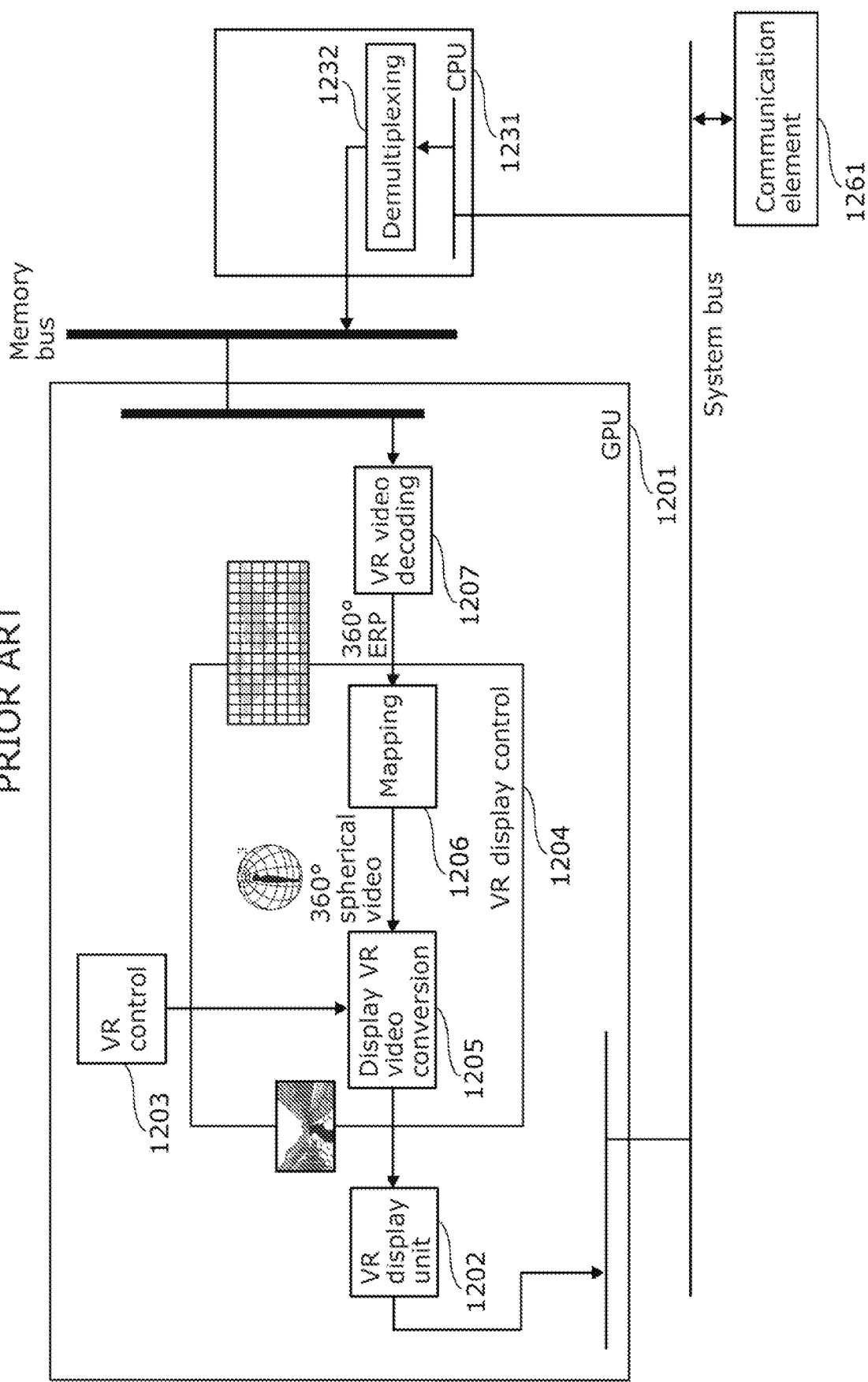
FIG. 12 is for illustrating a conventional example.

FIG. 12 is for illustrating a conventional example. Next, a more detailed configuration of VR display control unit 1204 of the VR systems according to Conventional Examples 1 and 2 will be described based on FIG. 12.

As mentioned above, VR display control unit 1204 is realized by a program or a dedicated circuit in GPU 1201 of the computer/smartphone and includes mapping unit 1206 and display VR video conversion unit 1205.

Operations performed thereby are as follows. Communication element 1261 receives communication data transmitted from the observation system, the compressed video is demultiplexed by demultiplexing unit 1232 of CPU 1231, GPU 1201 receives the video via the memory bus, and VR video decoding unit 1207 decodes the video, thereby generating a flat video (ERP image). The flat video is converted into a 360° spherical video in mapping unit 1206 of VR display control unit 1204, and then in display VR video conversion 1205, the portion to be displayed on VR display unit 1202 is cut out based on control information output by VR control unit 1203.

More specifically, the center of the ERP image is the entire surface and the origin of the 360° spherical video. The initial video of the VR image displayed on VR display unit 1202 is centered on the origin, and depending on the capability of VR display unit 1202, the image for the right eye is slightly to the right and the image for the left eye is slightly to the left, and the initial setting value is used for the height direction to cut out the videos, and the images are displayed on the display elements for the right and left eyes. From here, the position of the cutout changes depending on whether the VR system rotates to the left or right, looks up or down, etc.

In general, the video from a 360° camera does not change when the VR system is moved, but in the case of CG-generated images, the position changes when the VR system is moved or operated with a controller.

The initial value of the cutout from the 360° spherical video may be from the previous cutout position, but generally, a function is included to restore the initial position.

Figure 13:
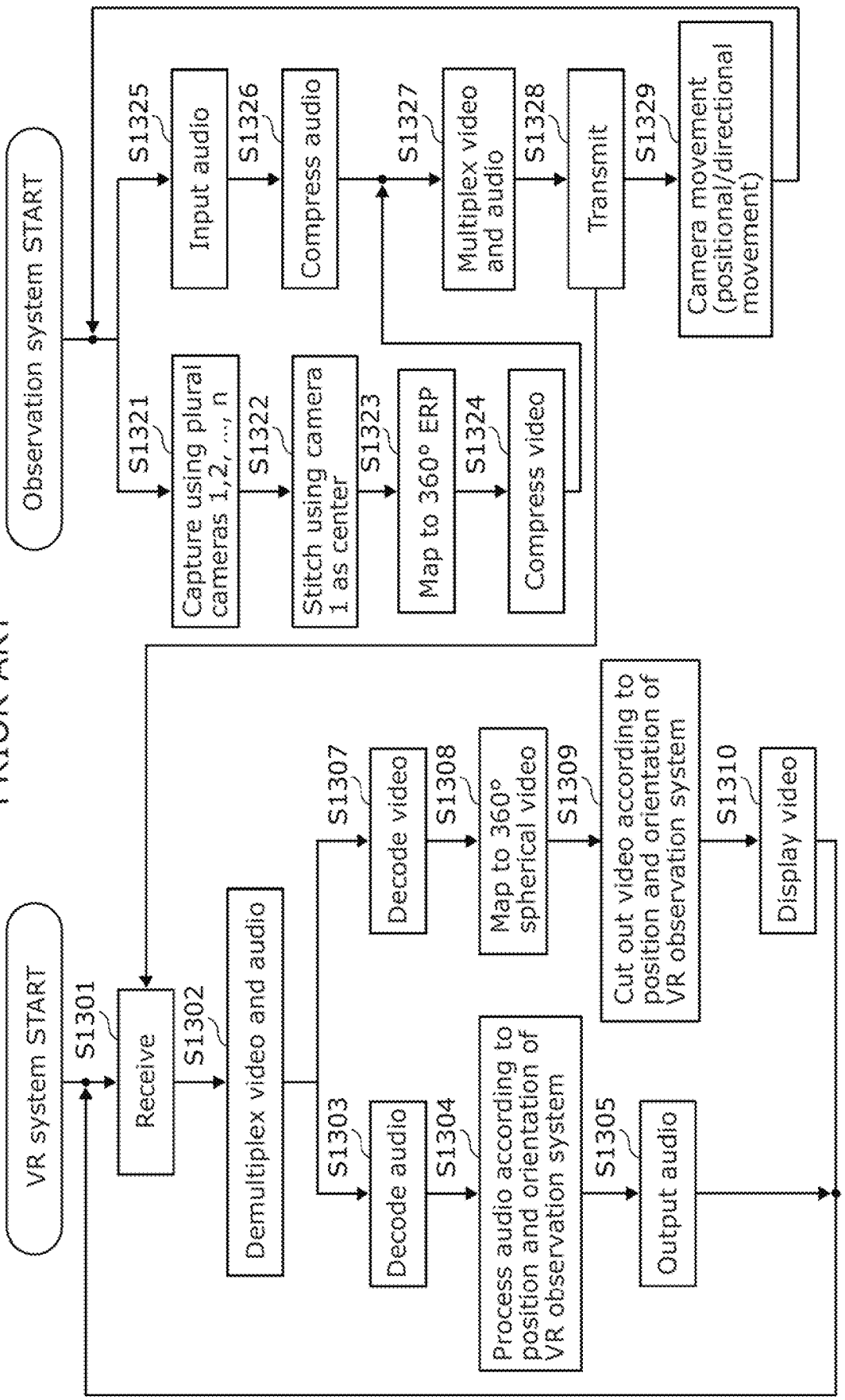
FIG. 13 is for illustrating a conventional example.

FIG. 13 is for illustrating a conventional example. Next, an operation example of Conventional Example 2 will be described based on FIG. 13.

In the observation system, audio is input by the audio input unit (microphone group, microphone jack, microphone amplifier, and ADC) (S1325), and audio compression is performed by the audio compression unit (S1326).

At the same time, video is captured by a plurality of cameras (lenses, shutters, imaging elements, ADCs) in the VR capturing camera (S1321), stitched into a spherical image with camera 1, which is the center camera, as the center in the stitching processing unit of the VR video processing unit (S1322), these are then used to generate an ERP image by the VR image mapping section using the positive distance cylinder The ERP image is then generated by equirectangular projection (ERP) or the like by the VR video mapping unit (S1323), and the ERP image is then appropriately compressed by the VR video compression unit (S1324).

The compressed ERP image and audio information are multiplexed by the multiplexing unit (S1327) into a transmittable format and sent (transmitted) out to the VR system by the wireless communication element (S1328).

Over time, in some cases, the camera moves in a new direction and/or to a new position (S1329), and the audio input and steps from capturing by the plurality of VR capturing cameras to the transmission are repeated.

Although graphics information is omitted here, graphics information may be superimposed on the video before video compression or multiplexed together with video and audio as graphics information.

In the VR system, the computer/smartphone receives the information transmitted from the observation system by the communication element (S1301) and transmits it to the demultiplexing unit. The demultiplexing unit demultiplexes the transmitted compressed video information and compressed audio information (S1302). The compressed audio information demultiplexed by the demultiplexing unit is transmitted to the audio decoding unit for decoding (S1303), thereby generating uncompressed audio information. The audio information is transmitted from the audio decoding unit to the audio playback control unit, where audio processing is performed based on the position and orientation information of the VR observation system transmitted from the VR control unit of the GPU via the system bus (S1304). The audio information that has undergone the audio processing is transmitted to the audio output unit (DAC, amplifier, loudspeaker, and headphone jack) of the HMD/VR glasses via the system bus by way of AV output or USB, and is output as audio (S1305). Audio processing includes controlling the left-right balance and the volume in the space, changing the frequency characteristics, delay, movement within the space, similar processing for only certain sound sources, and adding sound effects.

The compressed video signal is transmitted to the VR video decoding unit of the GPU via the memory bus with the video data from the demultiplexing unit of the CPU of the computer/smartphone, decoded in the VR video decoding unit (S1307) and input to the VR display control unit as an ERP image. In the VR display control unit, the mapping unit maps the ERP video onto the 360° spherical video (S1308), and in the display VR video conversion unit, the appropriate portion of the video is cut out from the 360° spherical video based on the position and orientation information of the VR system from the VR control unit (S1309) and displayed as VR video by the VR display unit (display element and lenses) (S1310).

Video display and audio output are repeated from reception from the observation system.

Graphics may be demultiplexed at the same time as video and audio demultiplexing and superimposed on the VR video by the VR display control unit, or they may be generated in the VR system and superimposed on the VR video, but explanation thereof will be omitted here.

Overview of Disclosure

An overview of the present disclosure is as follows.

A video display system according to one aspect of the present disclosure is for displaying a display video via a display device, and includes: an observation device including: a capturing unit configured to generate a wide-angle video; a data obtainment unit configured to obtain (i) data related to at least one of a position or a direction of a gazing target in the wide-angle video to be gazed at by a user of the display device and (ii) cue information for informing the user of a change in a state of an observation system; a metadata composition unit configured to compose metadata from the data from the data obtainment unit and other information; and a transmission unit configured to transmit the wide-angle video together with the metadata; and a VR device including: a reception unit configured to receive the wide-angle video, the data, and the cue information; a display state estimation unit configured to estimate at least one of a position or a direction of the display device in the wide-angle video; a differential calculation unit configured to calculate, based on a difference between (i) at least one of the position or the direction of the display device in the wide-angle video as estimated and (ii) at least one of the position or the direction of the gazing target in the metadata, at least one of a relative position or a relative direction of the gazing target, the relative position being relative to the position of the display device in the wide-angle video, the relative direction being relative to the direction of the display device in the wide-angle video; a presentation unit configured to present, to the user of the display device, (i) information on at least one of the relative position calculated or the relative direction calculated, (ii) an instruction in accordance with the cue information, and (iii) a state of the observation system; a video generation unit configured to generate, from the wide-angle video received, the display video including a portion corresponding to a viewing area corresponding to (i) information on at least one of the position or the direction of the display device in the wide-angle video as estimated from the wide-angle video by the display state estimation unit, (ii) the instruction in accordance with the cue information, and (iii) the state of the observation system; and the display device that displays the display video.

Such a video display stem uses metadata to calculate at least one of a relative position of gazing target to be gazed at by the user of the display device or a relative direction of the gazing target, which pertain to at least one of the position or the direction of the gazing target. Since at least one of the relative position or relative direction is presented to the user, the problem of losing sight of the position of the gazing target when the user is mobile is inhibited. Therefore, with the video display system, it is possible to display appropriate video in terms of inhibiting the problem of losing sight of the position of the gazing target when the user is mobile.

For example, the video display system may further include a camera that captures a video or an image generation unit configured to generate an image by calculation. The wide-angle video may be a video captured by the camera or an image calculated by the image generation unit.

With this, it is possible to display an appropriate wide-angle video consisting of the video captured by the camera or images calculated by the image generation unit.

For example, the presentation unit may be configured to: generate and output a graphic indicating information that is based on the cue information and at least one of the relative position calculated or the relative direction calculated; and cause the video generation unit to superimpose the graphic onto the portion to present at least one of the relative position or the relative direction.

With this, graphics can be used to present at least one of the relative position or the relative direction to the user.

For example, the data obtainment unit may be configured to receive an input of data related to the direction of the gazing target, the display state estimation unit may be configured to estimate the direction of the display device in the wide-angle video, and the graphic may display an arrow indicating the relative direction on the display video.

With this, at least one of the relative position or the relative direction can be presented to the user through graphics that display an arrow pointing in the relative movement direction on the display video.

For example, the data obtainment unit may be configured to receive an input of data related to the direction of the gazing target, the display state estimation unit may be configured to estimate the direction of the display device in the wide-angle video, and the graphic may display, as a mask, an image for covering at least part of the display video other than a part corresponding to the relative direction.

With this, the relative direction can be presented to the user by means of a graphic that displays, as a mask, an image for covering at least part of the display video other than a part corresponding to the relative direction.

For example, the data obtainment unit may be configured to receive an input of data related to the position of the gazing target, the display state estimation unit may be configured to estimate the position of the display device in the wide-angle video, and the graphic may display a map indicating the relative position on the display video.

With this, the relative movement direction can be presented to the user through graphics that display a map indicating the relative position on the display video.

For example, the video display system may further include an input interface for inputting the data. The data obtainment unit may be configured to obtain the data input via the input interface.

With this, metadata can be composed from data input via the input interface.

For example, the video display system may further include an input interface for specifying a timing of at least one of a start or an end of movement by the user in the wide-angle video. The data obtainment unit may be configured to obtain the timing of at least one of the start or the end of the movement that has been input via the input interface.

With this, the timing of at least one of the start or the end of the movement can be obtained as input via the input interface.

For example, images included in the wide-angle video may be images output by a capturing unit configured to capture a real space, and the input interface may include: an indication marker that is held by an operator of the input interface in the real space and indicates at least one of the position or the direction of the gazing target according to the movement of the indication marker; and an image analysis unit configured to receive at least one of the position or the direction of the gazing target indicated by the indication marker by analyzing an image including the indication marker output by the capturing unit.

With this, at least one of the relative position or the relative direction can be calculated by indicating at least one of the position or the direction of the gazing target by the movement of the indication marker.

For example, the video display system may further include an information processing device that includes at least one of functions included in the observation device and the VR device, is connected to the observation device and the VR device over a network, and performs one or more processes of the observation device or the VR device.

With this, the video display system can be realized by the observation device, the VR device, and the information processing device.

For example, the information processing device may include: a reception unit configured to receive, as the metadata from the observation device, the wide-angle video, the data, and the cue information; a presentation unit configured to generate information for presenting, to the user of the display device, information in accordance with the cue information and at least one of the position or the direction of the gazing target in the metadata; a video generation unit configured to generate the display video from the wide-angle video received by adding the information generated by the presentation unit to a portion of the wide-angle video that corresponds to a viewing area corresponding to information on at least one of the position or the direction of the display device in the wide-angle video estimated by the display state estimation unit; and a transmission unit configured to transmit: the wide-angle video; a portion of the wide-angle video that corresponds to a viewing area corresponding to information on at least one of the relative position or the relative direction; and the metadata.

With this, the video display system can be realized by the observation device, the VR device, and the information processing device.

For example, the information processing device may include: a reception unit configured to receive, as the metadata from the observation device, the wide-angle video, the data, and the cue information; a presentation unit configured to generate information for presenting, to the user of the display device, information in accordance with the cue information and at least one of the position or the direction of the gazing target in the metadata; a metadata composition unit configured to generate the metadata from the information generated by the presentation unit; and a transmission unit configured to transmit, to the VR device, the metadata generated by the metadata composition unit, the wide-angle video received by the reception unit, and other information.

With this, the video display system can be realized by the observation device, the VR device, and the information processing device.

For example, the information processing device may include: a reception unit configured to receive, as the metadata from the observation device, the wide-angle video, the data, and the cue information, and receive, from the display device, data related to an orientation of the display device; a differential calculation unit configured to calculate a relative movement direction based on the cue information and a difference between the orientation of the display device and movement information related to movement of the capturing unit, the relative movement direction being a movement direction of the capturing unit relative to the orientation of the display device; a presentation unit configured to generate and output a graphic that indicates the relative movement direction calculated and presents, to the user of the display device, information in accordance with the cue information and the relative movement direction by being superimposed on a portion of the wide-angle video that corresponds to a viewing area corresponding to the orientation of the display device estimated; a video generation unit configured to generate the display video by correcting the graphic based on data related to the orientation of the display device and superimposing the graphic corrected on the wide-angle video; and a transmission unit configured to transmit the display video and other information.

With this, the video display system can be realized by the observation device, the VR device, and the information processing device.

For example, the information processing device may be provided in a cloud connected to a wide-area network, and may be connected to the observation device and the VR device over the wide-area network.

With this, the video display system can be realized by the observation device, the VR device, and the cloud-based information processing device connected to the observation device and the VR device over a wide-area network.

For example, the cue information may be information indicating that a movement direction of the observation device or at least one of the position or the direction of the gazing target to be gazed at by the user of the display device changes.

With this, information indicating that the movement direction of the observation device or at least one of the position or the direction of the gazing target to be gazed at by the user of the display device changes can be used as cue information.

An information processing device according to one aspect of the present disclosure is used in a video display system for displaying a display video on a display device, the display video being at least part of a wide-angle video, and includes: a reception unit configured to receive metadata that is based on input data related to at least one of a position or a direction of a gazing target to be gazed at by a user of the display device in the wide-angle video; and a differential calculation unit configured to calculate and output at least one of a relative position or a relative direction of the gazing target, based on a difference pertaining to at least one of the position or the direction of the gazing target in the metadata, the relative position being relative to a position of the display device in the wide-angle video, the relative direction being relative to a direction of the display device in the wide-angle video.

For example, the information processing device may further include a presentation unit configured to generate and output a graphic that indicates at least one of the relative position or the relative direction calculated and presents, to the user of the display device, at least one of the relative position or the relative direction by being superimposed on a portion of the wide-angle video that corresponds to a viewing area corresponding to at least one of the position or the direction of the display device in the wide-angle video as estimated.

By using this in the video display system described above, the same advantageous effects as the video display system described above can be achieved.

An information processing method according to one aspect of the present disclosure is for displaying a display video on a display device, the display video being at least part of a wide-angle video, and includes: receiving metadata based on input data related to at least one of a position or a direction of a gazing target to be gazed at by a user of the display device in the wide-angle video; and calculating and outputting, based on a difference between (i) at least one of a position or a direction of the display device in the wide-angle video as estimated and (ii) at least one of the position or the direction of the gazing target in the metadata, at least one of a relative position or a relative direction of the gazing target relative to an orientation of the display device.

Such an information processing method can achieve the same advantageous effects as the video display system described above.

The non-transitory computer-readable recording medium according to one aspect of the present disclosure has recorded thereon a computer program for causing a computer to execute the information processing method described above.

Such a recordable medium can, with the use of a computer, achieve the same advantageous effects as the video display system described above.

Hereinafter, embodiments of the present disclosure will be described with reference to the drawings.

Each embodiment described below shows a general or specific example. The numerical values, shapes, materials, elements, the arrangement and connection of the elements, steps, order of the steps etc., indicated in the following embodiments are mere examples, and therefore do not intend to limit the scope of the claims. Therefore, among elements in the following embodiments, those not recited in any of the independent claims are described as optional elements.

The figures are not necessarily precise illustrations. In the figures, elements that are essentially the same share the same reference signs, and repeated description may be omitted or simplified.

In the present specification, terms indicating relationships between elements, such as "parallel", terms indicating shapes of elements, such as "rectangle", numerical values, and numerical ranges are expressions that include, in addition to their exact meanings, substantially equivalent ranges, including differences such as errors of approximately a few percent, for example.

Embodiment

[Configuration]

Figure 14:
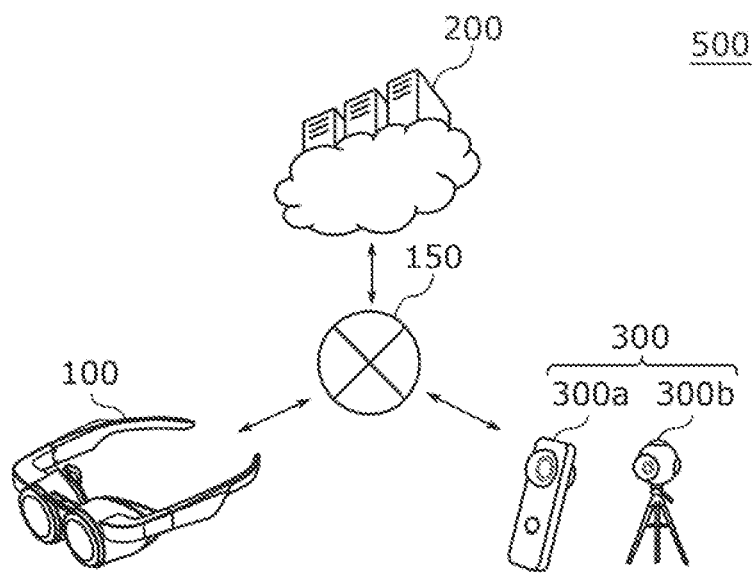
FIG. 14 illustrates the schematic configuration of the video display system according to an embodiment.
Figure 15:
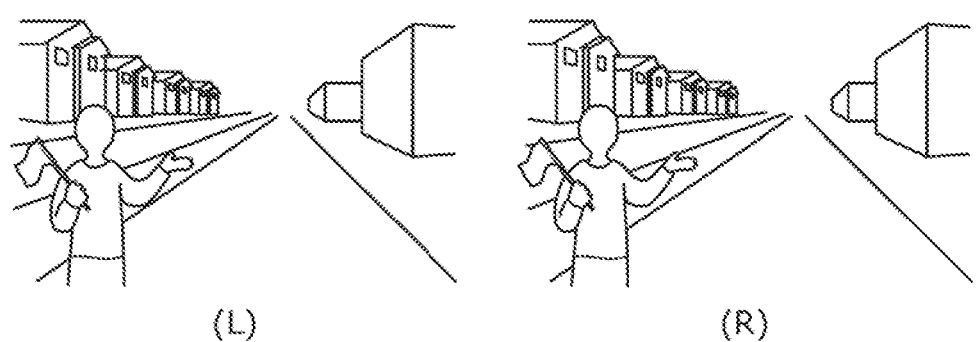
FIG. 15 illustrates one example of video displayed in the video display system according to an embodiment.

First, an overview of the video display system according to an embodiment will be described with reference to FIG. 14 and FIG. 15. FIG. 14 illustrates the schematic configuration of the video display system according to an embodiment. FIG. 15 illustrates one example of video displayed in the video display system according to an embodiment.

As illustrated in FIG. 14, video display system 500 according to the present embodiment is realized by observation device 300, server device 200 connected via network 150, and display device 100 connected via network 150.

Observation device 300 is a device that holds images therein. More specifically, observation device 300 is configured to hold the image obtained by capturing as wide-angle video information, and supply it to display device 100 so that a portion of the video can be viewed on display device 100. Observation device 300 is an omnidirectional camera capable of capturing video of 360 degrees around it. Observation device 300 may be, for example, capturing device 300a that is hand-held, or observation device 300b that is fixed on a tripod or the like. In the case of the hand-held capturing device 300a, it is easy to capture images while moving around. Hereafter, the observation device will be denoted simply as observation device 300 without differentiating between the types (observation device 300a and observation device 300b). Observation device 300 includes an optical element such as a fisheye lens and can capture a wide-angle area, for example 180 degrees, with a single sensor array. A plurality of combinations of optical elements and sensor arrays arranged to complement each other in different wide-angle areas can be used to capture 360 degree wide-angle video. The images captured in each of the plurality of sensor arrays are stitched together by identifying the elements that correspond to each other. This results in a single image that can be mutually transformed between flat and spherical surfaces, for example, an equirectangular projection. By continuously generating such images in the time domain, a video (moving image) that changes in the time domain is generated. Note that the interior of the spherical video is also referred to as the 3D video space or three-dimensional image space.

In the present embodiment, two three-dimensional image spaces with a displacement corresponding to human binocular disparity are generated. These two three-dimensional image spaces may be generated from single three-dimensional image space by, for example, simulation, or they may be generated by two cameras that are displaced by a disparity shift. In the present embodiment, a VR video that allows the user to view any direction in the three-dimensional image space from inside this three-dimensional image space can be displayed.

Network 150 is a communication network for communicably connecting observation device 300, server device 200, and display device 100 with each other. Here, a communication network such as the Internet is used as network 150, but network 150 is not limited to this example. Each of the connection between observation device 300 and network 150, the connection between server device 200 and network 150, and the connection between display device 100 and network 150 may be accomplished via wireless communication or wired communication.

Server device 200 is a device for performing information processing and the like, and is realized using, for example, a processor and memory. Server device 200 may be realized by an edge computer or by a cloud computer. One server device 200 may be provided per video display system 500, or one server device 200 may be provided per a plurality of video display systems 500. Stated differently, server device 200 may perform various processes in a plurality of video display systems 500 in parallel. Note that server device 200 is not an essential component of video display system 500.

For example, a video display system that includes only observation device 300 and display device 100 can be realized by allocating each functional unit of server device 200 (described below) to observation device 300 and display device 100. In particular, if display device 100 is realized using an information processing terminal such as a smartphone that also serves as a display panel, the functional units of server device 200 can be easily realized using, for example, the processor of the information processing terminal. Alternatively, by giving functions of observation device 300 and display device 100 to server device 200, some of the functions of observation device 300 or display device 100 can be reduced and existing observation devices and display devices can be used. Stated differently, a video display system can be easily implemented by consolidating various functions in server device 200. Each functional unit of server device 200 will be described below with reference to, for example, FIG. 16.

Display device 100 is a glasses HMD that supports two lens tubes that are separated from each other by having the temple portions extending from each of the left and right sides engaged with the external ears, thereby holding the two lens tubes in positions corresponding to the user's right and left eyes. The lens tubes of display device 100 have built-in display panels, which project video with a disparity shift to the user's left and right eyes, respectively, as illustrated in FIG. 15, for example. In FIG. 15, (L) shows an image for the left eye corresponding to one frame of the video, and (R) shows an image for the right eye corresponding to the same frame of the video. Display device 100 does not need to be a terminal dedicated to displaying such video. It is possible to realize the display device according to the present disclosure using a display panel included in a smartphone, tablet device, or PC, for example.

Figure 16:
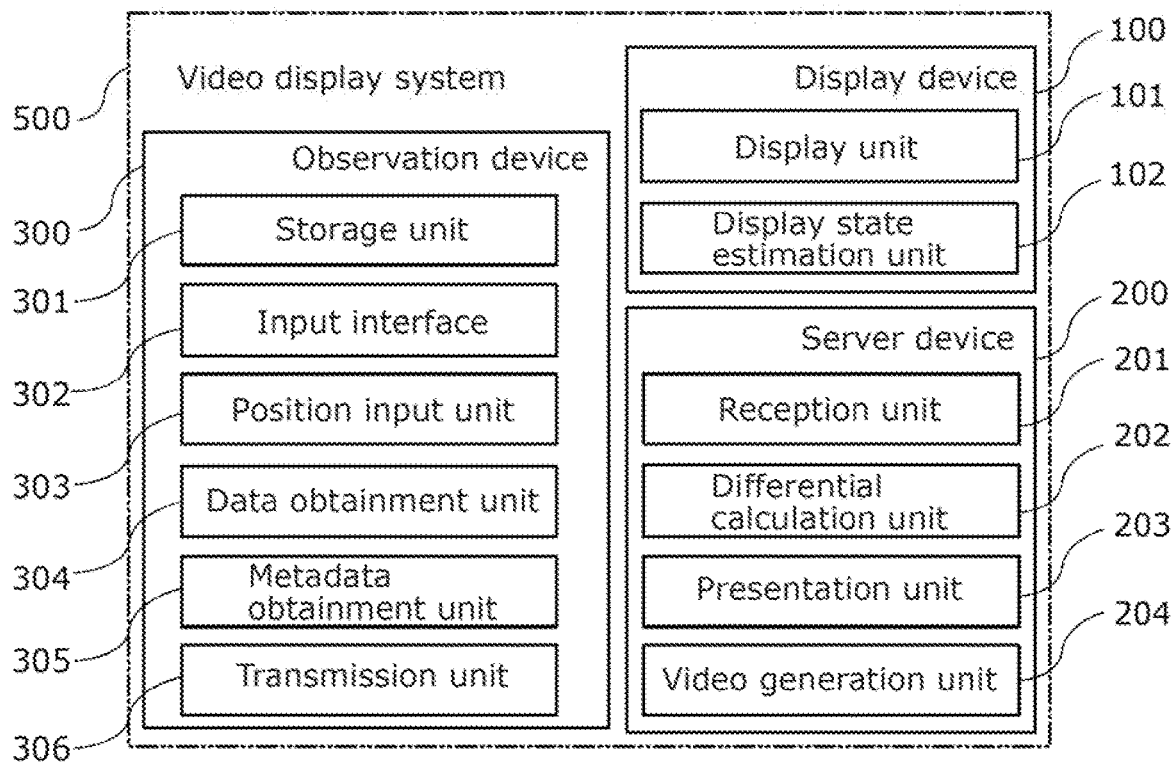
FIG. 16 is a block diagram illustrating the functional configuration of the video display system according to an embodiment.

Hereinafter, video display system 500 according to the present embodiment will be described in detail with reference to FIG. 16 through FIG. 18. FIG. 16 is a block diagram illustrating the functional configuration of the video display system according to an embodiment. As illustrated in FIG. 16 and as described with reference to FIG. 14, video display system 500 includes display device 100, server device 200, and observation device 300.

Display device 100 includes display unit 101 and display state estimation unit 102. Display unit 101 is a functional unit that outputs an optical signal according to image information using, for example, a backlight and LCD panel, an organic EL panel, or micro LEDs. Display unit 101 controls the output optical signal so that the image is formed on the retina of the user's eye through optical elements such as a lens and an optical panel. Forming the image on the user's retina allows the user to see the image. Display unit 101 outputs the image continuously in the time domain to allow the viewer to see a series of images, i.e., a video. In this way, display unit 101 displays the video to the user of display device 100.

Display state estimation unit 102 is a functional unit for estimating at which position and in which direction the user is viewing the video in the three-dimensional image space using display device 100. Display state estimation unit 102 can be said to estimate at least one of the position or orientation of display device 100 in the three-dimensional image space. Display state estimation unit 102 is realized by various sensors, such as acceleration sensors, gyro sensors, etc., built into display device 100 at appropriate locations. Display state estimation unit 102 estimates the position of display device 100 in the three-dimensional image space by estimating in which direction and by how much the position has changed relative to the reference position previously set for display device 100. Display state estimation unit 102 estimates the direction of display device 100 in the three-dimensional image space by estimating in which direction and by how much the orientation has changed in relation to a reference direction preset in display device 100. As explained earlier, display device 100 is supported by the user's head (external ear and root of the nose) and thus moves with the user's head.

Then, by estimating the position and direction of display device 100, the viewing area corresponding to that position and direction can be cut out from the wide-angle video and displayed. Stated differently, by using the position and direction of display device 100 estimated by display state estimation unit 102, assuming the direction in which the user's head is facing is the viewing area the user wishes to view in the three-dimensional image space, it is possible to display this viewing area. Note that the direction of display device 100 estimated here corresponds to the normal direction of the display panel of display device 100. The display panel is positioned to face the user's eyes, so the user's eyes are usually located in the normal direction of the display panel. The orientation of display device 100 is therefore consistent with the direction connecting the user's eyes and the display panel.

However, the direction of display device 100 and the direction of the user's line of sight may shift due to the user's eye movements. In such cases, if display device 100 includes a sensor that detects the user's line of sight (i.e., an eye tracker), the detected user's line of sight may be used as the direction of display device 100. Stated differently, the eye tracker is another example of the display state estimation unit.

In addition to the above, display device 100 includes a power supply, various input switches, a circuit for driving the display panel, wired and wireless communication modules for input and output, audio signal processing circuits such as a signal converter and an amplifier, and a microphone and a loudspeaker for audio input and output. These configurations will be described in greater detail later.

Server device 200 includes reception unit 201, differential calculation unit 202, presentation unit 203, and video generation unit 204. Reception unit 201 is a processing unit that receives (obtains) various signals from observation device 300 (to be described later). Reception unit 201 receives the wide-angle video captured at observation device 300. Reception unit 201 also receives metadata obtained at observation device 300. Reception unit 201 also receives information related to the position and direction of display device 100 estimated at display device 100.

Differential calculation unit 202 is a processing unit that calculates, based on the difference between (i) the position and direction of display device 100 and (i) the position and direction of gazing target 301 in the metadata, a relative position and a relative direction of gazing target 301 relative to the position and the direction of display device 100. Operations performed by differential calculation unit 202 will be described in greater detail later.

Presentation unit 203 is a processing unit that presents, to the user of display device 100, the relative position and the relative direction calculated in differential calculation unit 202. Although an example in which presentation unit 203 causes video generation unit 204 to make the above presentation by including content indicating the relative movement direction in the display video generated in video generation unit 204, the presentation of the relative movement direction is not limited to the example of including it in the display video. For example, it may be presented as audio from a predetermined direction of arrival corresponding to at least one of the relative position or the relative direction in a three-dimensional sound field, or it may be presented by vibrating a device, such as a vibrating device held in both hands, corresponding to at least one of the relative position or the relative direction. Operations performed by presentation unit 203 will be described in greater detail later along with operations performed by differential calculation unit 202.

Video generation unit 204 cuts out, from the received wide-angle video, a portion corresponding to the viewing area corresponding to the position and direction of display device 100 as estimated by display state estimation unit 102, and further, if necessary, generates a display video that includes content indicating at least one of the calculated relative position or the relative direction. Operations performed by video generation unit 204 will be described in greater detail later along with the operations performed by differential calculation unit 202 and presentation unit 203. Server device 200 also includes a communication module for transmitting the generated display video to display device 100.

Observation device 300 includes storage unit 301, input interface 302, position input unit 303, data obtainment unit 304, metadata obtainment unit 305, and transmission unit 306. Observation device 300 includes a capturing unit (not illustrated) that is the functional part related to capturing images and is integrated with other functional components of observation device 300. The capturing unit may be separate from other functional components of capturing device 300 and communicate via wired or wireless communication. The capturing unit includes an optical element, a sensor array, and an image processing circuit. The capturing unit, for example, outputs the luminance value of light received by each pixel on the sensor array through the optical element as 2D luminance value data. The image processing circuit performs post-processing such as noise removal for the luminance value data, as well as processing to generate a 3D image space from 2D image data, such as stitching. The present embodiment describes an example in which a display device is used to display a video in a three-dimensional image space formed from actual images captured by the capturing unit, but the three-dimensional image space may be a virtual image constructed by computer graphics or other technology. Accordingly, the capturing unit is not an essential element.

Storage unit 301 is a storage device that stores image information (images forming the three-dimensional image space) of the three-dimensional image space generated by the capturing unit. Storage unit 301 is realized using semiconductor memory or the like.

Input interface 302 is a functional unit used when inputs are made in the three-dimensional image space by a guide who provides guidance for VR tourism and the like. For example, input interface 302 includes a stick that can be tilted in each direction in 360 degrees corresponding to the movement direction of capturing unit 301, and a physical sensor that detects the direction of tilting. The guide can input the direction of the gazing target into the system by tilting the stick in that direction. As another example, an input interface may include: an indication marker, such as a fluorescent marker attached to the tip of an indication stick or the like held by the guide, which indicates the direction of the gazing target according to the movement of the indication marker; and an image analysis unit that receives the direction of the gazing target indicated by the indication marker by analyzing the image including the indication marker output by the capturing unit. Note that input interface 302 is not an essential element; the present embodiment may be realized so long as only one of input interface 302 or position input unit 303 (described later) is provided.

Position input unit 303 is a functional unit for inputting the position of the gazing target. For example, position input unit 303 can be realized by running a dedicated application on an information terminal such as a smartphone operated by the guide. Map information of the entire space corresponding to the three-dimensional image space is displayed on the screen of the information terminal, and the selected position is input into the system as the position of the gazing target by selecting a predetermined position on this map information. In this way, position input unit 303 is one example of an input interface for inputting the position of the gazing target.

Data obtainment unit 304 is a functional unit that obtains, from, for example, input interface 302 and position detection unit 303, data related to the position and direction of the gazing target. Data obtainment unit 304 is connected to at least one of input interface 302 or position detection unit 303, and data related to the position and direction of the gazing target from these functional units. Thus, data obtainment unit 304 is one example of a data receiving unit that receives an input of data related to the direction of the gazing target to be gazed at by the user of display device 100 according to the present embodiment.

Metadata obtainment unit 305 is a functional unit that obtains metadata by converting the data related to the position and direction of the gazing target obtained in data obtainment unit 304 into metadata to be added to the captured video data. In addition to the data related to the position and direction of the gazing target, the obtained metadata may include various other data to be used within video display system 500. Stated differently, metadata obtainment unit 305 is one example of a metadata composition unit that composes metadata by combining a plurality of pieces of data into a single unit of data that can be read from a single unit of information.

Transmission unit 306 is a communication module that transmits the captured video (wide-angle video) stored in storage unit 301 and the obtained metadata. Transmission unit 306 communicates with reception unit 201 of server device 200 to transmit the stored video and obtained metadata to be received by the reception unit.

Figure 17:
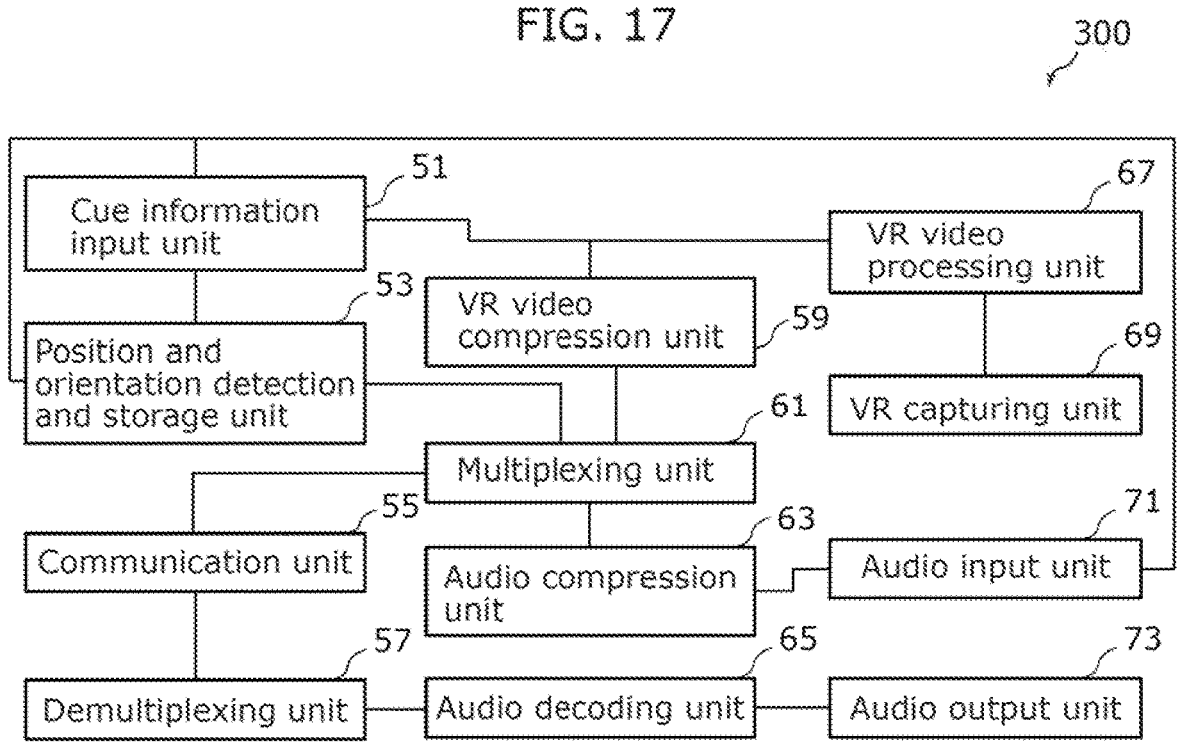
FIG. 17 is a more detailed block diagram illustrating the functional configuration of the observation device according to an embodiment.
Figure 18:
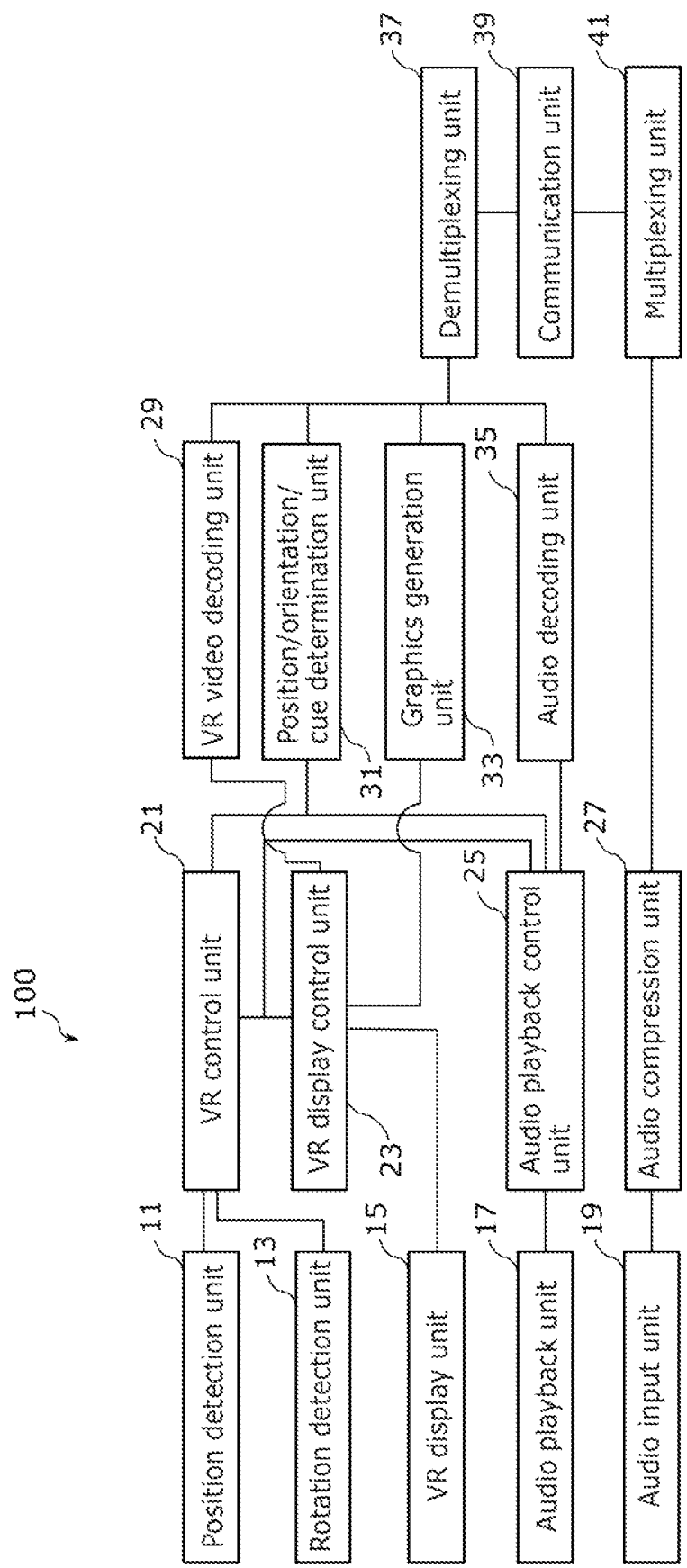
FIG. 18 is a more detailed block diagram illustrating the functional configuration of the display device according to an embodiment.

FIG. 17 is a more detailed block diagram illustrating the functional configuration of the observation device according to an embodiment. FIG. 18 is a more detailed block diagram illustrating the functional configuration of the display device according to an embodiment. FIG. 17 and FIG. 18 illustrate the functional configuration around observation device 300 and display device 100 in greater detail. Some of the functions illustrated in these figures may be realized by server device 200.

Cue information input unit 51 corresponds to input interface 302 and position input unit 303, where the position and direction of the gazing target is input by switches, tablets, smartphones, etc., that are physically operated by the operator of observation device 300 or the guide. Cue information input unit 51 specifies the target to be moved to from a plurality of targets via cue data.

Cue information input unit 51 may also obtain cue information from video obtained from VR video processing unit 67 or audio information obtained from audio input unit 71. Audio input unit 71 is another example of the input interface. VR video processing unit 67 is connected to VR capturing unit 69, which corresponds to the capturing unit.

The cue information obtained from cue information input unit 51 is transmitted to position and orientation detection and storage unit 53, where it is processed together with the position and orientation of observation device 300, and in some cases, the status is stored and formed into suitable data and transmitted as metadata to multiplexing unit 61, where it is then transmitted to the display device 100 via server device 200 by communication unit 55 after being multiplexed with video, audio, and graphics. In addition to the above, observation device 300 includes demultiplexing unit 57, VR video compression unit 59, audio compression unit 63, audio decoding unit 65, and audio output unit 73.

In display device 100, communication unit 39 receives the communication information from observation device 300, and demultiplexing unit 37 demultiplexes the metadata and transmits it to position/orientation/cue determination unit 31. In position/orientation/cue determination unit 31, cue data is taken from the metadata, ran through predetermined processing, transmitted to graphics generation unit 33 for displaying the cue information as a graphic, superimposed on the VR video in VR display unit 15, transmitted to VR control unit 21, the VR video is appropriately processed by VR display control unit 23 along with the state of position and orientation of display device 100, and displayed by VR display unit 15, or guide audio for guidance is generated by audio playback control unit 25, or playback audio is appropriately processed.

As a specific example, if the cue data indicates "move to target A," the relative position to target A may differ depending on the position of display device 100, and when cue information is shown in a graphic, an arrow is displayed in the appropriate direction. More specifically, if target A is on the left side, an arrow pointing left is displayed; if the video is controlled, for example, only the left side is made clear (the image quality on the right side is degraded); and if the video is controlled by voice, an announcement such as "please turn to the left" is played. In this way, the content of the cue data is compared with the position and orientation of display device 100, and appropriate processing is performed. In addition to the above, display device 100 includes position detection unit 11, rotation detection unit 13, audio playback unit 17, audio input unit 19, VR control unit 21, audio compression unit 27, audio decoding unit 35, and multiplexing unit 41. The elements illustrated in FIG. 3 are realized by including each of the above elements illustrated in FIG. 17 and FIG. 18 in one or more combinations.

[Operations]

Figure 19:
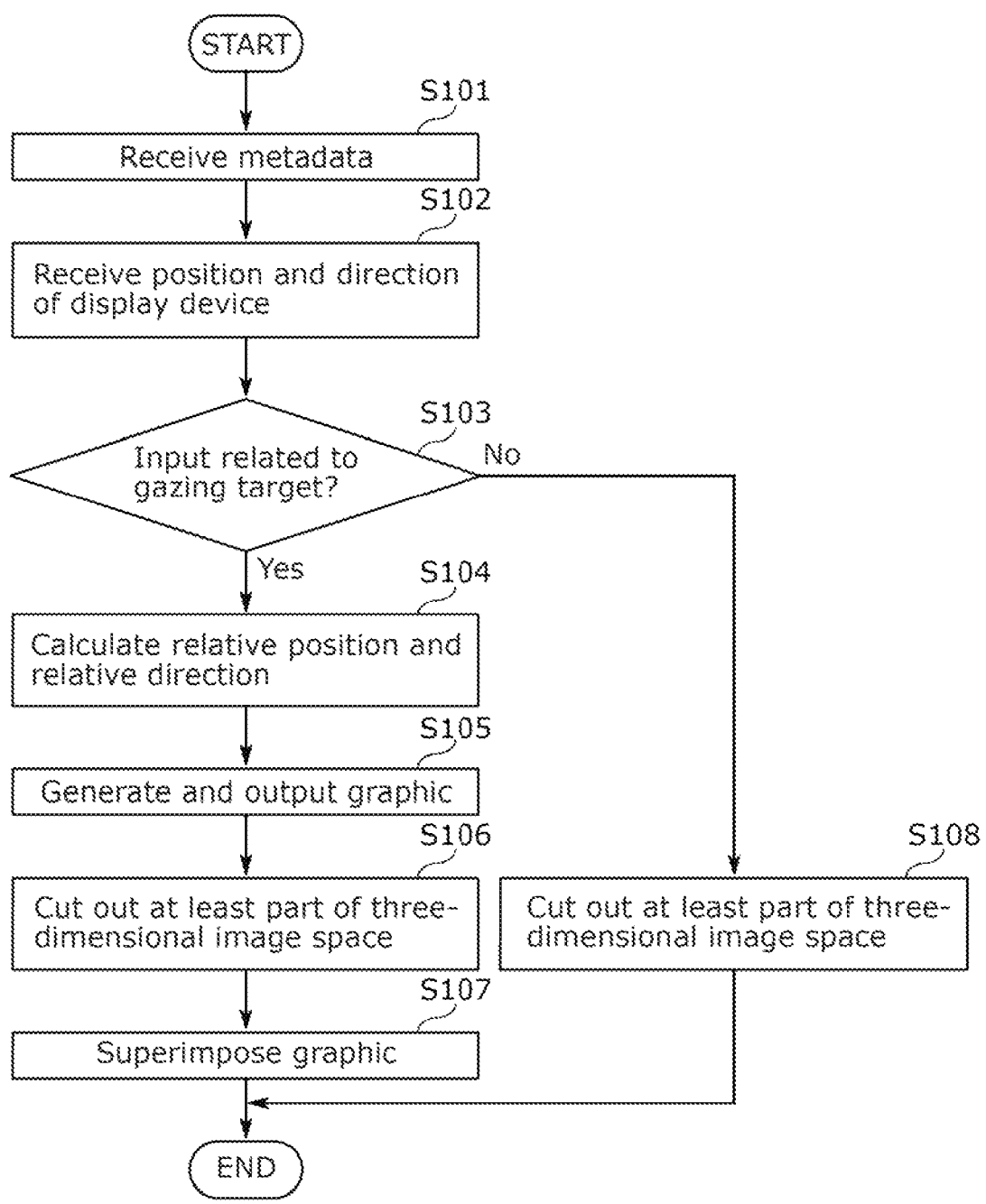
FIG. 19 is a flowchart illustrating operations performed by the video display system according to an embodiment.

Next, operations performed by video display system 500 configured as described above will be described with reference to FIG. 19 through FIG. 32. FIG. 19 is a flowchart illustrating operations performed by the video display system according to an embodiment.

When the operation of video display system 500 is started, the capturing unit captures video, images are stored in storage unit 301, and input interface 302, position input unit 303, data obtainment unit 304, and metadata obtainment unit 305 operate to obtain metadata including data related to the position and direction of the gazing target. The metadata is received together with the captured and stored video by server device 200 via transmission unit 306 and reception unit 201 (S101).

Display state estimation unit 102 of display device 100 continuously estimates the position and direction of display device 100. Display device 100 transmits the orientation of display device 100 estimated by display state estimation unit 102 to server device 200. As a result, server device 200 receives the estimated position and direction of display device 100 (S102). Note that the order of steps S101 and S102 may be interchanged. Server device 200 determines whether an input indicating the position and direction of the gazing target has been received based on whether data related to the position and direction of the gazing target is included (S103). If server device 200 determines that an input instructing the position and direction of the gazing target has been made (Yes in S103), server device 200 begins operations for presenting the relative position and relative direction to the user of display device 100. More specifically, differential calculation unit 202 calculates the position of the gazing target relative to the user's viewing position (i.e., corresponding to the position of display device 100) as the relative position based on the position and direction of display device 100 and data related to the position and direction of the gazing target in the metadata. Differential calculation unit 202 calculates the direction of the gazing target relative to the direction in which the user is looking (i.e., corresponding to the direction of display device 100) as the relative direction based on the position and direction of display device 100 and data related to the position and direction of the gazing target in the metadata (S104).

Figure 20:
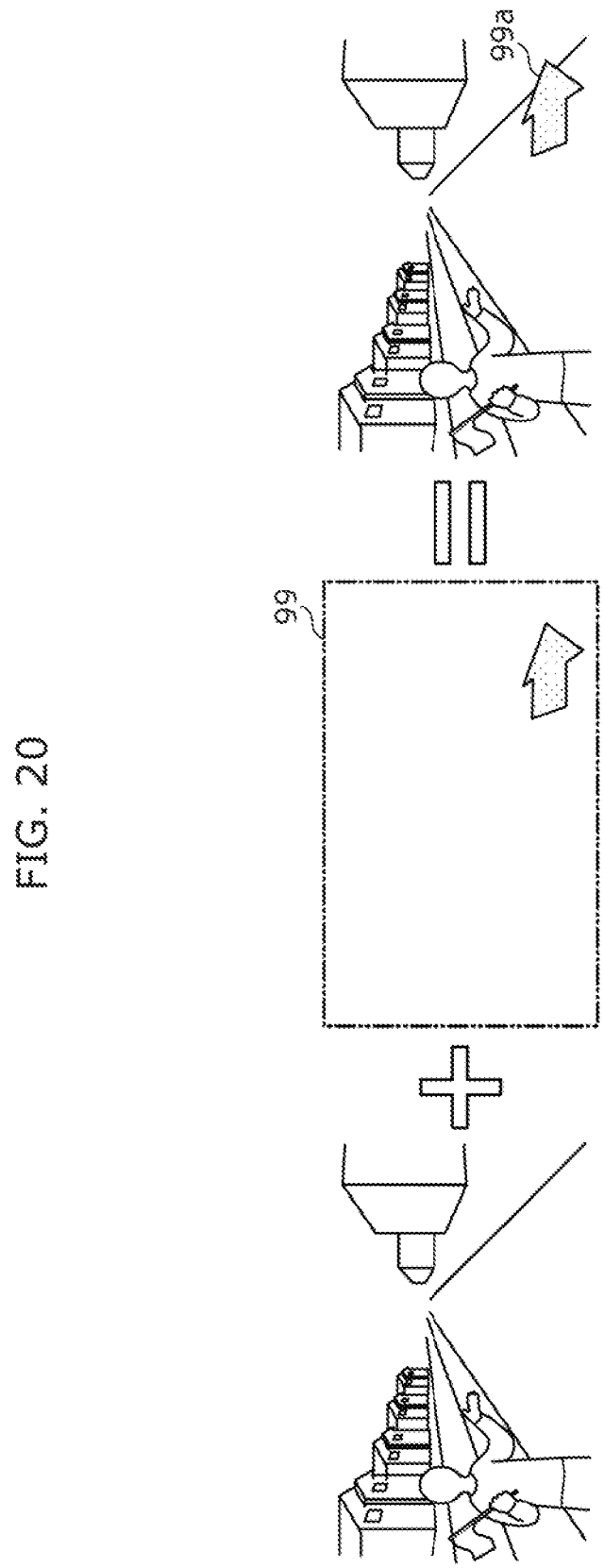
FIG. 20 conceptually illustrates the generation of display video according to an embodiment.

After calculating the relative position and relative direction, presentation unit 203 generates a graphic corresponding to the relative position and relative direction (S105). Video generation unit 204 cuts out at least a portion that corresponds the viewing area corresponding to the orientation of display device 100 from the three-dimensional image space (S106) and superimposes the graphic generated by presentation unit 203 on the cut-out portion of the video to generate the display video (S107). FIG. 20 conceptually illustrates the generation of display video according to an embodiment. In FIG. 20, (a) illustrates a portion cut from the three-dimensional image space, (b) illustrates graphic 99 generated by presentation unit 203, and (c) illustrates the display video generated by superimposition. Superimposing graphic 99 on part of the image places arrow 99a indicating at least one of the relative position or relative direction in the display video.

FIG. 21 conceptually illustrates the generation of display video according to an embodiment. In FIG. 21, (a) illustrates an image captured by the capturing unit and (b) illustrates the display video as seen by the user. Although a guide is illustrated in (a) in FIG. 21, the guide does not appear in the video. Therefore, in (b), the video is shown without a guide. Here, as illustrated in (a) in FIG. 21, the guide instructs the user facing the guide to gaze at the gazing target in the forward direction, as in "ahead you'll see . . . ". In (b) in FIG. 21, a schematic diagram of the direction in which the user is looking is illustrated below the diagram of the video the user is viewing.

Here, the upper side of the paper corresponds to the forward direction in the three-dimensional image space and is the direction recognized by the guide as the direction in which the user is looking. Stated differently, the user illustrated in FIG. 21 is looking forward. Here, as an input interface, the key word "ahead" uttered by the guide is obtained by means of audio input unit 71, etc., as data related to the direction of the gazing target. Then, as illustrated in (b) in FIG. 21, the display video is generated with arrow 99a superimposed. The direction of this arrow is simply arrow 99a pointing in the forward direction, since "forward" as the direction of the gazing target and "forward" as the direction of display device 100 coincide. Moreover, as illustrated in (b) in FIG. 21, audio is played. Here, since "forward" as the direction of the gazing target and "forward" as the direction of display device 100 coincide, the audio "ahead you'll see . . . " is played along with the display video as-is.

FIG. 22 conceptually illustrates the generation of display video according to an embodiment. In FIG. 22, (a) illustrates an image captured by the capturing unit and (b) illustrates the display video as seen by the user. Although a guide is illustrated in (a) in FIG. 22, the guide does not appear in the video. Therefore, in (b), the video is shown without a guide. Here, as illustrated in (a) in FIG. 22, the guide instructs the user facing the guide to gaze at the gazing target to the right, as in "to the right you'll see . . . ". In (b) in FIG. 22, a schematic diagram of the direction in which the user is looking is illustrated below the diagram of the video the user is viewing.

Here, the upper side of the paper corresponds to the forward direction in the three-dimensional image space and is the direction recognized by the guide as the direction in which the user is looking. Stated differently, the user illustrated in FIG. 22 is looking forward. Here, as an input interface, the key word "right" uttered by the guide is obtained by means of audio input unit 71, etc., as data related to the direction of the gazing target. Then, as illustrated in (b) in FIG. 22, the display video is generated with arrow 99a superimposed. Since "right" as the direction of the gazing target and "forward" as the direction of display device 100 do not coincide, the difference between "right" and "forward" is calculated, and arrow 99a pointing in the "right" direction is displayed. Moreover, as illustrated in (b) in FIG. 22, audio is played. Here, since "right" as the direction of the gazing target and "forward" as the direction of display device 100 do not coincide, the difference between "forward" and "right" is calculated, and the audio "to the right you'll see . . . " is played with the display video.

FIG. 23 conceptually illustrates the generation of display video according to an embodiment. In FIG. 23, (a) illustrates an image captured by the capturing unit and (b) illustrates the display video as seen by the user. Although a guide is illustrated in (a) in FIG. 23, the guide may or may not appear in the video. However, in (b), the viewing area of the video without a guide is shown. Here, as illustrated in (a) in FIG. 23, the guide instructs the user facing the guide to gaze at the gazing target to the right, as in "to the right you'll see . . . ". In (b) in FIG. 23, a schematic diagram of the direction in which the user is looking is illustrated below the diagram of the video the user is viewing.

Here, the upper side of the paper corresponds to the forward direction in the three-dimensional image space and is the direction recognized by the guide as the direction in which the user is looking. Stated differently, the user illustrated in FIG. 23 is looking to the right. Here, as an input interface, the key word "right" uttered by the guide is obtained by means of audio input unit 71, etc., as data related to the direction of the gazing target. However, "right" uttered by the guide here refers to a direction closer to the forward direction than the right direction the user is looking in. Such a detailed direction of the gazing target is entered using input interface 302 or other the like. As illustrated in (b) in FIG. 23, the display video is generated with arrow 99a superimposed. Since "forward and slightly to the right" as the direction of the gazing target and "right" as the direction of display device 100 do not coincide, the difference between "forward and slightly to the right" and "right" is calculated, and the direction of this arrow is arrow 99a pointing to the left.

FIG. 24 conceptually illustrates the generation of display video according to an embodiment. In FIG. 24, (a) illustrates an image captured by the capturing unit and (b) illustrates the display video as seen by the user. Although a guide is illustrated in (a) in FIG. 24, the guide does not appear in the video. Therefore, in (b), the video is shown without a guide. Here, as illustrated in (a) in FIG. 24, the guide instructs the user facing the guide to gaze at the gazing target to the right, as in "to the right you'll see . . . ". In (b) in FIG. 24, a schematic diagram of the direction in which the user is looking is illustrated below the diagram of the video the user is viewing.

Here, the upper side of the paper corresponds to the forward direction in the three-dimensional image space and is the direction recognized by the guide as the direction in which the user is looking. Stated differently, the user illustrated in FIG. 24 is looking forward. Here, as the input interface, the position of the gazing target input by the guide, such as by position input unit 303, is obtained, and this is obtained as data related to the position of the gazing target. As illustrated in (b) in FIG. 24, the display video is generated with map 99b superimposed. This map is marked with an arrow pointing to a location in the map that corresponds to the position of the gazing target. Since the position of the gazing target does not coincide with the position of display device 100, map 99b is marked with an arrow pointing in approximately the 4 o'clock direction. Note that in map 99b, the user's position (i.e., the position of display device 100) is in the center region.

FIG. 25 conceptually illustrates the generation of display video according to an embodiment. In FIG. 25, (a) illustrates an image captured by the capturing unit and (b) illustrates the display video as seen by the user. Although a guide is illustrated in (a) in FIG. 25, the guide may or may not appear in the video. However, in (b), the viewing area of the video without a guide is shown. Here, as illustrated in (a) in FIG. 25, the guide instructs the user facing the guide to gaze at the gazing target to the right, as in "to the right you'll see . . . ". In (b) in FIG. 25, a schematic diagram of the direction in which the user is looking is illustrated below the diagram of the video the user is viewing.

Here, the upper side of the paper corresponds to the forward direction in the three-dimensional image space and is the direction recognized by the guide as the direction in which the user is looking. Stated differently, the user illustrated in FIG. 25 is looking to the right. Here, as the input interface, the position of the gazing target input by the guide, such as by position input unit 303, is obtained, and this is obtained as data related to the position of the gazing target. As illustrated in (b) in FIG. 25, the display video is generated with map 99b superimposed. This map is marked with an arrow pointing to a location in the map that corresponds to the position of the gazing target. Since the position of the gazing target does not coincide with the position of display device 100, map 99b is marked with an arrow pointing in approximately the 2 o'clock direction.

FIG. 26 conceptually illustrates the generation of display video according to an embodiment. FIG. 26 illustrates another example of operations for a situation similar to FIG. 21, so description of the situation is omitted. As illustrated in (b) in FIG. 26, the display video is generated without arrow 99a superimposed. Since "forward" as the direction of the gazing target and "forward" as the direction of display device 100 coincide, arrow 99a pointing in the "forward" direction is simply displayed, but since presenting an arrow pointing in forward to a user who is looking forward is redundant, arrow 99a is not displayed here. However, as illustrated in (b) in FIG. 26, audio is played. Here, since "forward" as the direction of the gazing target and "forward" as the direction of display device 100 coincide, the audio "ahead you'll see . . . " is played along with the display video as-is.

FIG. 27 conceptually illustrates the generation of display video according to an embodiment. FIG. 27 illustrates another example of operations for a situation similar to FIG. 22, so description of the situation is omitted. As illustrated in (b) in FIG. 27, the display video is generated with mask 99c superimposed instead of arrow 99a. Since "right" as the direction of the gazing target and "forward" as the direction of display device 100 do not coincide, the difference between "right" and "forward" is calculated, and mask 99c for guiding the user to look to the right is displayed. Thus, by generating and superimposing mask 99c as graphic 99 that covers a portion of the side in the opposite direction of the relative direction, a significant change is imparted on the display video. While the direction is clearly visible with arrow 99a, it may be difficult to see the changes on the video. In this example, the above shortcomings can be compensated for. In other words, the user will naturally move their line of sight from the area covered by mask 99c to view the remaining video, whereby the direction of the eye movement will correspond to the relative direction, which has the advantage of making the change in the video easy to understand and making the relative direction naturally recognizable. The term "cover" here also includes covering the target area with an image in a semi-transparent state such that the target area partially appears through.

Moreover, as illustrated in (b) in FIG. 22, audio is played. Here, since "right" as the direction of the gazing target and "forward" as the direction of display device 100 do not coincide, the difference between "forward" and "right" is calculated, and the audio "to the right you'll see . . . " is played with the display video.

Figure 28:
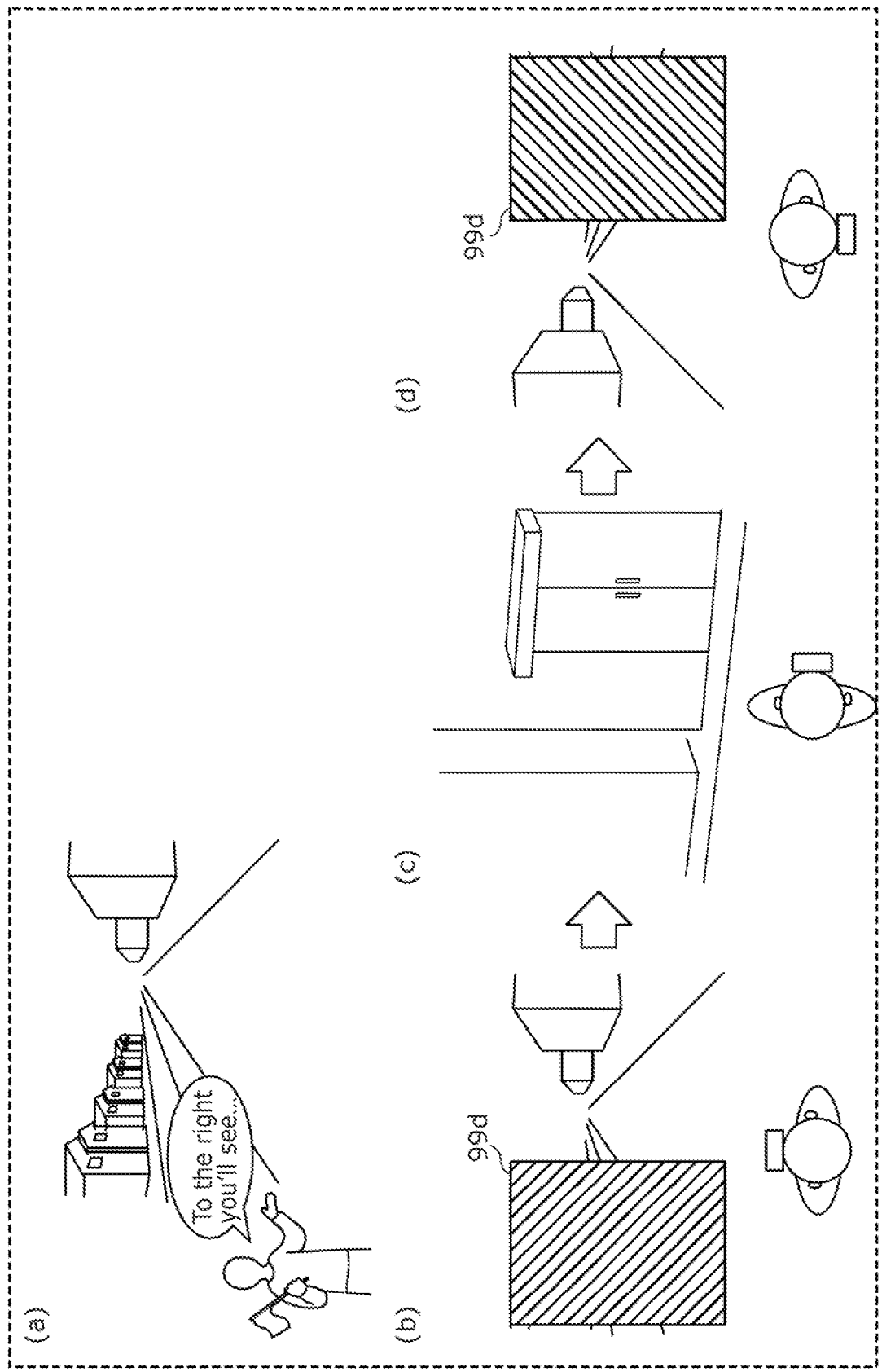
FIG. 28 conceptually illustrates the generation of display video according to an embodiment.

FIG. 28 conceptually illustrates the generation of display video according to an embodiment. FIG. 28 illustrates another example of operations for a situation similar to FIG. 22 and FIG. 27, so description of the situation is omitted. As illustrated in (b) in FIG. 28, the display video is generated with low-resolution filter 99d superimposed instead of mask 99c or arrow 99a. Low-resolution filter 99d roughens the image, like with mosaic processing, in the area where the filter is superimposed. As with mask 99c, the advantage is that the user moves their line of sight from the area that has become difficult to see due to the lower resolution to a clearer area of the video, and since the direction of the line of sight corresponds to the relative direction, the user can easily recognize the relative direction naturally.

In FIG. 28, (c) illustrates a situation in which the user is looking to the right. Since this right direction corresponds to the direction of the gazing target, low-resolution filter 99d is not superimposed to keep the image clear in this area. (c) in FIG. 28 also illustrates a situation in which the user is looking further to the right (i.e., backward relative to the original forward direction). Since the same low-resolution filter 99d is superimposed in the backward direction to generate the display video, this has the advantage that the right direction, which is the direction in which the user is guided to view, is more easily viewed by the user. The descriptions of (c) in FIG. 28 and (d) in FIG. 28 are valid for the example in which mask 99c used (the example in FIG. 27).

FIG. 29 conceptually illustrates the generation of display video according to an embodiment. FIG. 29 illustrates another example of operations for a situation similar to FIG. 21 and FIG. 29, so description of the situation is omitted. As illustrated in (b) in FIG. 29, the display video is generated without arrow 99a superimposed. Since "forward" as the direction of the gazing target and "forward" as the direction of display device 100 coincide, arrow 99a pointing in the "forward" direction is simply displayed, but since presenting an arrow pointing in forward to a user who is looking forward is redundant, arrow 99a is not displayed here. However, as illustrated in (b) in FIG. 29, audio is played. Here, since "forward" as the direction of the gazing target and "forward" as the direction of display device 100 coincide, the audio "ahead you'll see . . . " is played along with the display video as-is. However, the sound played here is stereoscopic sound that is perceived by the user as sound arriving from the front of the user.

FIG. 30 conceptually illustrates the generation of display video according to an embodiment. FIG. 30 illustrates another example of operations for a situation similar to FIG. 22, FIG. 27, and FIG. 28, so description of the situation is omitted. As illustrated in (b) in FIG. 30, the display video is generated without arrow 99a superimposed. However, as illustrated in (b) in FIG. 30, audio is played. Here, since "right" as the direction of the gazing target and "forward" as the direction of display device 100 do not coincide, the difference between "forward" and "right" is calculated, and the audio "to the right you'll see . . . " is played with the display video. Just as in the example of FIG. 29, the sound played here is stereoscopic sound that is perceived by the user as sound arriving from the right of the user.

FIG. 31 conceptually illustrates the generation of display video according to an embodiment. In FIG. 31, (a) illustrates an image captured by the capturing unit and (b) illustrates the display video as seen by the user. Although a guide is illustrated in (a) in FIG. 31, the guide may or may not appear in the video. However, in (b), the viewing area of the video without a guide is shown. Here, as illustrated in (a) in FIG. 31, the guide instructs the user facing the guide to gaze at the gazing target to the right, as in "to the right you'll see . . . ". In (b) in FIG. 31, a schematic diagram of the direction in which the user is looking is illustrated below the diagram of the video the user is viewing.

Here, the upper side of the paper corresponds to the forward direction in the three-dimensional image space and is the direction recognized by the guide as the direction in which the user is looking. Stated differently, the user illustrated in FIG. 31 is looking backward. Here, as an input interface, the key word "right" uttered by the guide is obtained by means of audio input unit 71, etc., as data related to the direction of the gazing target. Audio is then played as illustrated in (b) in FIG. 31. Here, since "right" as the direction of the gazing target and "backward" as the direction of display device 100 do not coincide, the difference between "right" and "backward" is calculated, and the audio "to the left you'll see . . . " is played with the display video.

Figure 32:
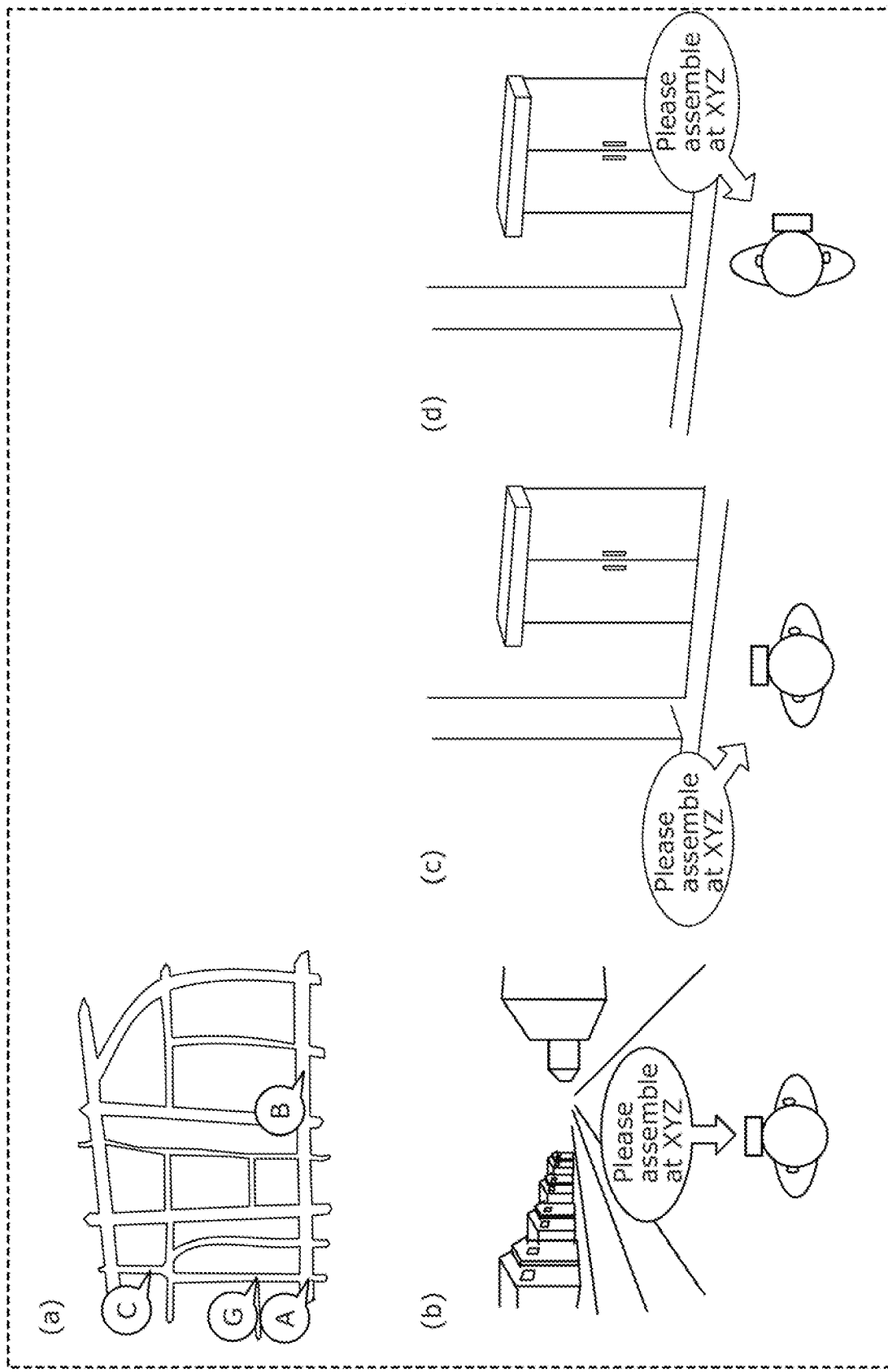
FIG. 32 conceptually illustrates the generation of display video according to an embodiment.

FIG. 32 conceptually illustrates the generation of display video according to an embodiment. In FIG. 32, (a) illustrates a map including each point in the three-dimensional image space and the points A, B, C, and G on the map, and (b) through (d) illustrate display video that the user is viewing. In FIG. 32, point A illustrated in (a) corresponds to the position of the user (position of display device 100) in (b), point B illustrated in (a) corresponds to the position of the user (position of display device 100) in (c), point D illustrated in (a) corresponds to the position of the user (position of display device 100) in (d), and point G illustrated in (a) corresponds to the position of the gazing target. In each of (b) through (d) in FIG. 32, a schematic diagram of the direction in which the user is looking is illustrated below the diagram of the video the user is viewing.

Here, the upper side of the paper corresponds to the forward direction in the three-dimensional image space and is the direction recognized by the guide as the direction in which the user is looking. Stated differently, the user illustrated in (b) in FIG. 32 is looking forward, the user illustrated in (c) in FIG. 32 is looking forward, and the user illustrated in (d) in FIG. 32 is looking right. Here, as an input interface, the key phrase "please assemble at XYZ (place name of point G)" uttered by the guide is obtained by means of audio input unit 71, etc., as data related to the position of the gazing target. Audio is then played as illustrated in (b) through (d) in FIG. 32. Here, since none of the positions of display device 100 coincides with the position of the gazing target, the relative position of each is calculated and the audio "please assemble at XYZ" is played along with the display video. Just as in the examples of FIG. 29 and FIG. 30, the sound played here is stereoscopic sound that is perceived by the user as sound arriving from the relative position.

In this way, the user can be made aware of at least one of the relative position or the relative direction, and can thus easily recognize at least one of the position or the direction of the gazing target. Thus, with video display system 500, it possible to display appropriate videos on display device 100.

[Implementation Examples]

Hereinafter, embodiments will be described in greater detail by way of implementation examples. This implementation example mainly describes two use cases of VR tourism. The two use cases are when a 360° camera is used to capture video and when a 3D CG space is used. In the former case, a photographer capturing video using a 360° camera in a remote location transmits 360° video and metadata to the viewer, the viewer's VR equipment generates CG based on the metadata information and the like and combines the CG with the received 360°, and the viewer views the composite video. This can be further divided into more narrow applications: VR tourism (real-time sightseeing), VR tourism (real-time and recorded video), VR factory tours, on-site inspection where a leader guides the tour (instructions to the cameraman are required), and VR real exhibition inspection where a leader (a privileged leader is designated for each group) leads a guided tour.

In the latter case, a plurality of people participate in a 3D space and one of them acts as a guide (privileged user) to guide and provide explanations to the other participants, who watch with VR equipment equipped with such functions. This can be further divided into more narrow applications: guided VR tourism (in a CG space): guided VR exhibition (VR market) visits, VR group education (for example 30 students, except when each person can move freely in a 3D space, such as in a museum. When students are studying in VR-CG space (360° space), the teacher can give instructions and thus may be superior to an actual classroom), and VR presentation: for example, when multiple people are checking an architectural CG space, the presenter can control the actions of the participants, etc.

In 360° video, when the 360° video is being captured and transmitted in real time, if the location is the same for all uses and only the direction each user is looking is different, if the guide is taking a selfie and puts in a cue when they want the viewer to look in the direction they are looking, the cue is transmitted in some way and when the cue arrives on the viewer side, the center of the viewpoint can be forced to move in that direction (thus changing the cutout position of the video). In this case, processing is performed to avoid VR sickness, such as displaying that the video is about to move or switching (for example, if the user is forced to move gradually, they may experience VR sickness). Alternatively, when a cue arrives, an arrow or target may be displayed to encourage the viewer to move their body to match that orientation.

However, if another person is capturing, the specific direction of the camera, when directed by the guide or decided by the cameraman, may be pointed in that direction, cued, and transmitted. The processes performed on the viewer side are the same as described above. For example, cues can be implemented by: adding a cue button to the 360° camera; applying image recognition technology, for example, when the guide presents a specific marker or a specific action (gesture, etc.), one of the camera, server, or viewer will recognize it and confirm the cue (image marker cue); using non-audible sound such as a dog whistle to transmit and cue (specific sound source cue); or using voice recognition technology, for example, specific keywords (AI loudspeaker activation words) are registered and recognized by the viewer (voice cue).

In the case of 3D CG, assuming that the user is taking a guided tour of a site such as Heijo-kyo reproduced in CG (same as when a plurality of people are viewing inside a large building in a VR conference system), it can be assumed that each person's position is different. In such cases, it is necessary to specify the location and the direction of gaze to forcefully move the current position to the specified location.

If the avatar in the CG corresponding to the guide instructs the user to look in a specific direction at a specific location in order to give an explanation on it, etc., the user is forced to look in a specific direction, the user is guided by displaying a spatial guide, and if the current position is significantly different from the specific location and the specified object is not visible, the position of the user is moved (warped). However, since a sudden warp may startle the user (and lead to VR sickness), some warning may be displayed on the display, and a different than usual warp button (escape button) may be displayed to allow the user take action before moving (and adjust the direction at the time of movement). Processes when instructing the avatars in the CG to assemble correspond to the third process described above; the avatars are warped to the location where the guide is and oriented so as to face in the direction of the guide.

Two important elements in the present invention are (i) a method for detecting, recording, and transmitting orientation and direction, and (ii) a method for generating, transmitting, and controlling cues (for example, forcing, alerting, etc.) to orient or assemble participants in a particular direction. (i) includes two additional sub-elements: the detection of direction and orientation and the transmission of direction and orientation. (ii) includes three additional sub-elements: the generation of the cue, the transmitting of the cue, and the method of controlling the VR space according to the cue.

Cues may be generated using switches, menus, the display of a specific object, such as a guide's information flag, a specific light pulse, a specific keyword, such as "forward", "right", or other terms indicating direction used by a tourist guide, the name of a building, an action such as assembling, or a specific keyword prefixed with "everyone, let's turn to the right," etc., or voice pulses that cannot be recognized by humans, such as audio watermarking.

The transmission of cues is assumed to be similar to the transmission of directions.

The following VR space control methods in accordance with cues are envisioned, depending on the type of cue: aligning the VR space with the marker location, moving the VR space location, controlling how the VR video looks (resolution, contrast, frame rate, viewing angle, etc.), and switching between live and recorded video, etc.

Figure 33:
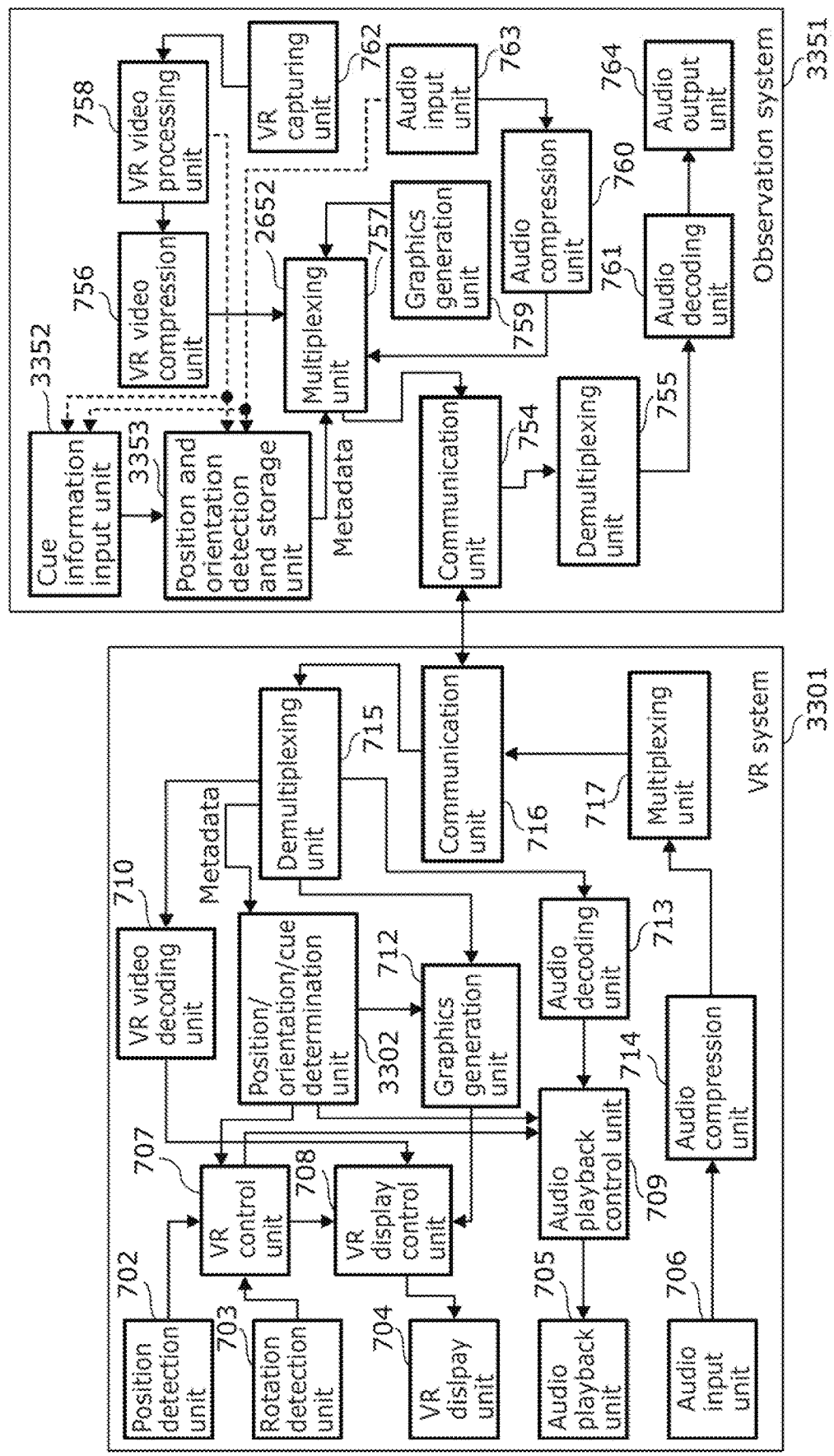
FIG. 33 illustrates one example of the functional configuration of the video display system according to an implementation example.
Figure 34:
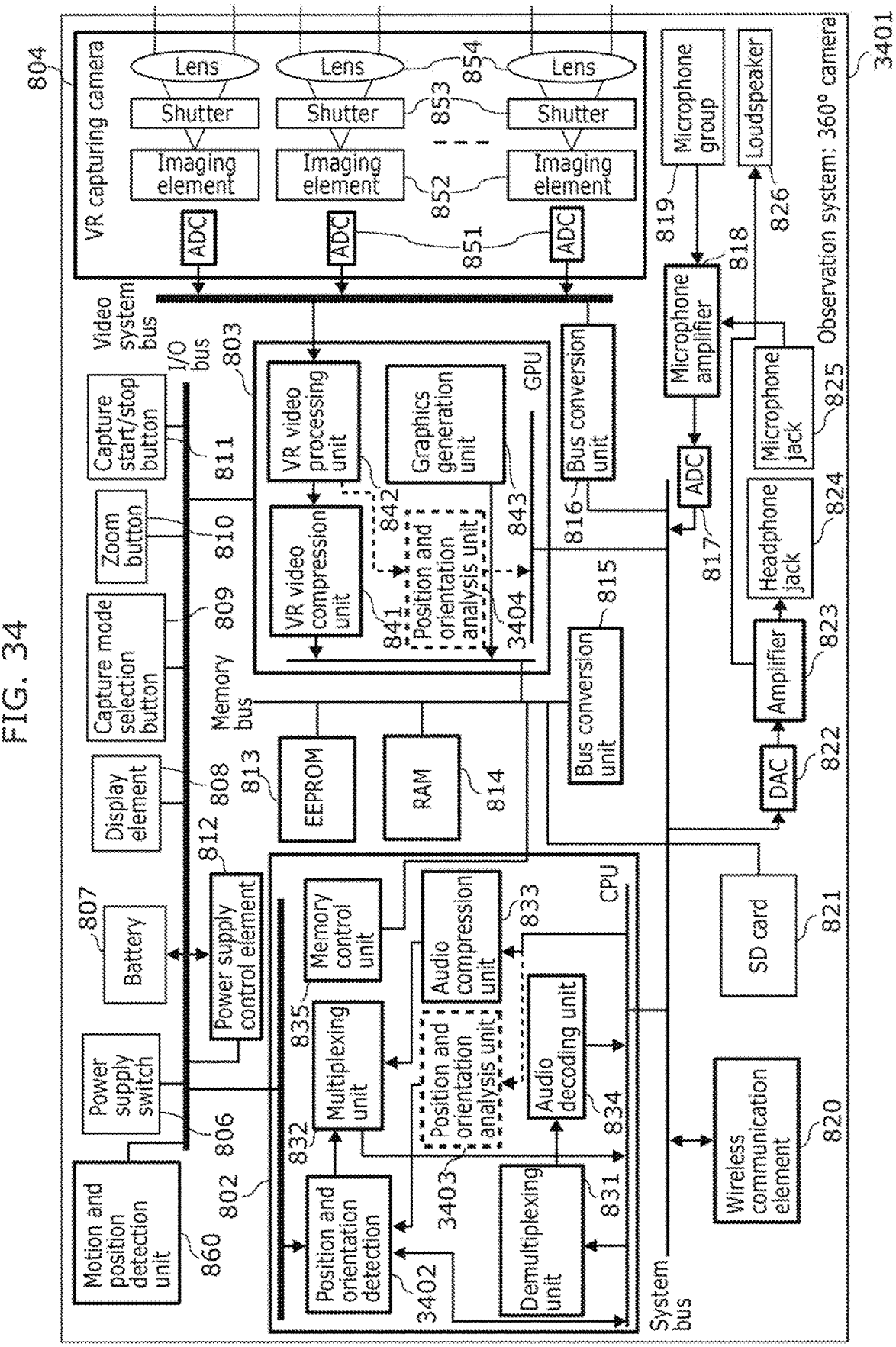
FIG. 34 illustrates one example of the functional configuration of the observation system according to an implementation example.
Figure 35:
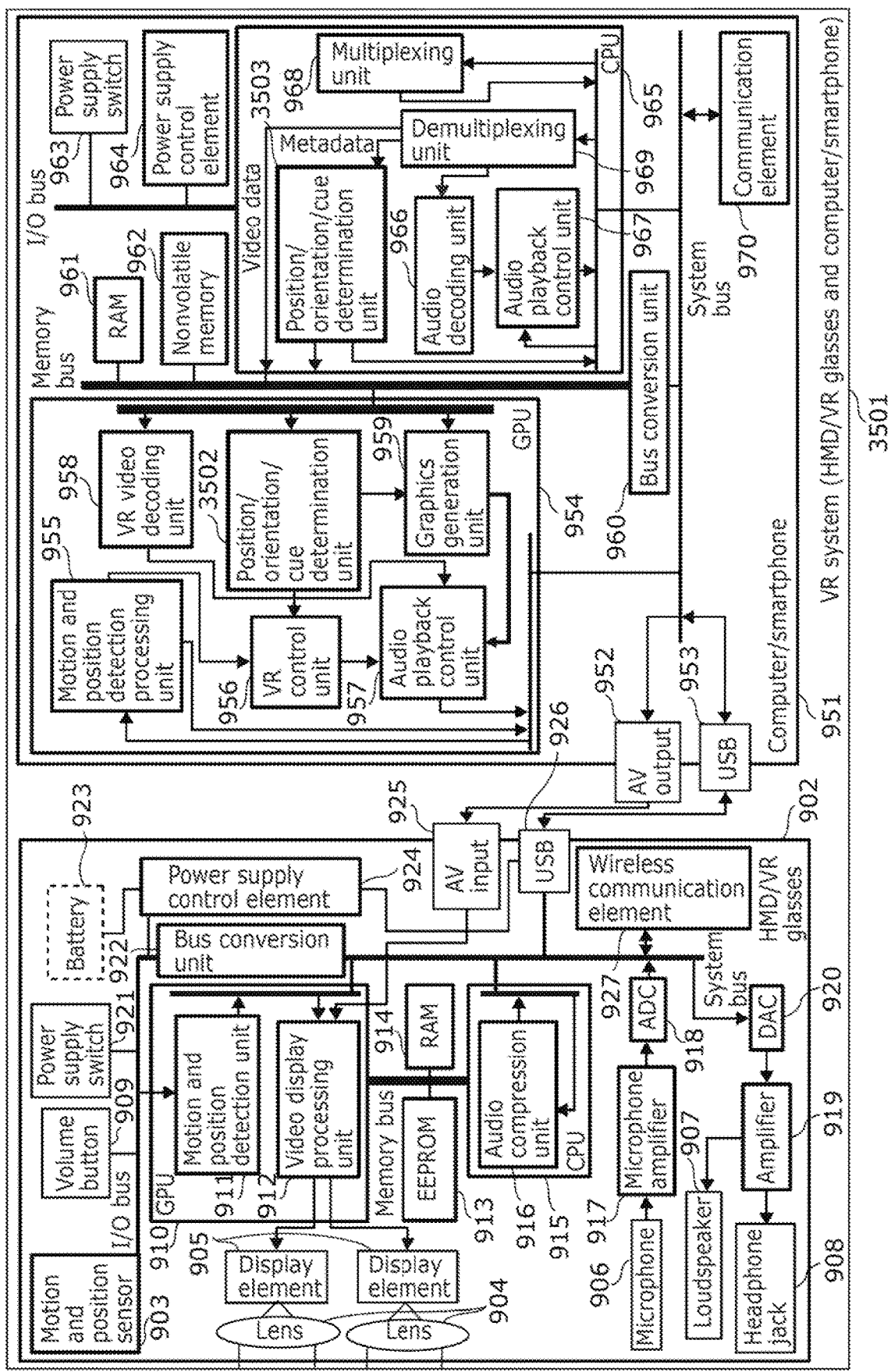
FIG. 35 illustrates one example of the functional configuration of the VR system according to an implementation example.

FIG. 33 illustrates one example of the functional configuration of the video display system according to an implementation example. FIG. 34 illustrates one example of the functional configuration of the observation system according to an implementation example. FIG. 35 illustrates one example of the functional configuration of the VR system according to an implementation example.

A realization example of a 360° camera in the realization example of the observation system (observation device) according to an implementation example of the present invention will be described with reference to FIG. 33 and FIG. 34.

Observation system 3351 (360° camera 3401) according to one implementation example of the present invention is almost the same as the realization example of the 360° camera according to Conventional Example 2. The differences will be described below. In the 360° camera according to an implementation example of the present invention, an input button as cue information input unit (cue information input unit 3352) and position/orientation detection/storage unit 3402 as a program of CPU 802 are added, cue information input from the input button (data input unit) and metadata based on the position and orientation detected by position/orientation detection/storage unit (metadata conversion unit) 3402 is generated by the position/orientation detection/storage unit, transmitted to multiplexing unit 832, multiplexed, and transmitted to VR system 3301 via wireless communication element (transmission unit) 820.

Cue information is used to select a destination and inform of the timing of when to start moving, by using an input button to select a pre-designated direction such as right or left, or by selecting a plurality of pre-designated locations by number or menu.

More specifically, the right, left, front, or back designation by a button and the start or end designation by start/end button 811 for changing orientation, target designation by number keys, and designation by touch panel are examples.

In some cases, the cue information is not only generated by an input button, but also by detecting the destination by comparing a pre-designated image by analyzing the captured video using position and orientation analysis units 3403 and 3404 indicated by dashed lines, to detect the position and orientation of the destination to move to, to detect the timing at which to move and the direction of movement by analyzing the hand and body movements of the guide, to detect a light emission pattern of pulsed light emitted by a light-emitting element such as an LED provided along with a button on an instruction stick held by the guide to detect the direction and position of the destination to move to, or detecting position or selecting one of predefined destinations or detecting the timing at which to move. Alternatively, audio from the microphone is analyzed to identify the destination from the words spoken by the guide to detect the movement direction or timing of movement, which is converted into appropriate metadata by a position and orientation detection function executed by CPU 802 and transmitted to VR system 3301.

Next, one realization example of VR system 3301 (display device, HMD/VR glasses, and computer/smartphone 3501) according to an implementation example of the present invention will be described with reference to FIG. 33 and FIG. 35.

Here, description will focus on the differences between VR system 3301 according to one implementation example of the present invention and the VR system according to Conventional Example 2.

In one implementation example, position/orientation/cue determination units (perspective determination units) 3502 and 3503 are added as programs to CPU 965 and GPU 954 of computer/smartphone 3501 of the VR system according to Conventional Example 2.

When the position/orientation/cue determination unit 3503 of CPU 965 receives cue data as metadata from observation system 3351 via the communication element (reception unit), along with the position and orientation of the target obtained from observation system 3351 or the guide, and changes the audio in accordance with the cue data, guide audio is generated or playback audio is appropriately processed by the audio playback unit realized by a program in CPU 965. When the VR video or graphic is to be changed according to the cue data, position/orientation/cue determination unit 3503 of CPU 965 sends the metadata to the GPU via the system bus.

GPU 954 processes the metadata received by position/orientation/cue determination unit 3502 and transmits the information to the graphics generation unit (graphics generation unit) 959 to display a graphic based on the cue data. Graphics data from graphics generation unit 959 is superimposed on the VR video in VR display control unit 957 and displayed. Alternatively, information based on the cue data from position/orientation/cue determination unit 3502 is transmitted to VR control unit 956, and information from motion and position sensor 903, together with the position and orientation state of the VR system detected by the motion and position detection processing unit (detection unit) 955, is appropriately processed at the VR display control unit (display control unit) 957, video data is transmitted from AV output 952 to AV input 925, and displayed by video display processing unit 912 as VR video on the display element (display unit) 905. Each of the above audio, graphic, and VR video processes may be realized independently and without other processing, or multiple processes may be realized and processing may be selected while the VR system or observation system is operating.

The position and orientation detection process performed by observation system 3351 may also be realized by a computer system between the observation system and the VR system, such as a cloud. In such cases, observation system 3351 does not send metadata, or the data input by the operator is sent out as metadata. Via the position and orientation detection unit, which is in the cloud, the position, orientation, or movement of the observation system, guide, or target is detected from the video, audio, or metadata sent from the observation system, and sent to the VR system as metadata. This makes it possible to achieve the advantageous effect of this implementation example using existing 360° cameras.

Whether a process is performed by GPU 954 or CPU 965 may differ from this example, and the bus configuration may also differ from this example, but even in such cases, there is no difference in the functional configuration and operations that will be described below.

Regarding an integrated VR system, the present implementation example is almost the same as the conventional example, and small integrated VR system can be realized by realizing the functions of CPU 965 and GPU 954 as a single unit.

Returning to FIG. 33, next, another configuration of an implementation example will be described.

The implementation example illustrated in FIG. 33 illustrates not actual connections between the observation system in FIG. 34 and the VR system in FIG. 35 as functional blocks, but illustrate an integrated unit of the two systems, and the flow of data and control between the units.

In observation system 3351, VR capturing camera 804 in FIG. 34 corresponds to VR capturing unit 762 in FIG. 33. Similarly, the VR video processing unit corresponds to VR video processing unit 758; the VR video compression unit corresponds to VR compression unit 756; the microphone group, the microphone jack, the microphone amplifier, and the ADC correspond to audio input unit 763; the audio compression unit corresponds to audio compression unit 760; the input button corresponds to cue information input unit 3352, the motion and position detection unit, position and orientation detection and storage unit, the two position and orientation analysis units of the GPU and CPU correspond to position and orientation detection and storage unit 3353; the multiplexing unit corresponds to multiplexing unit 2652; the wireless communication element corresponds to communication unit 754; the demultiplexing unit corresponds to demultiplexing unit 755; the audio decoding unit corresponds to audio decoding unit 761; and the DAC, the amplifier, the headphone jack, and the loudspeaker correspond to audio output unit 764. The video system bus, the memory bus, the system bus, the I/O bus, the bus conversion, the RAM, the EEPROM, the SD card, the power supply switch, the power supply control element, the battery, the display element, the capture mode selection button, the zoom button, and the capture start/stop button are omitted from illustration because they are not directly related to the operations pertaining to the present invention.

In VR system 3301, communication element 716 in FIG. 35 is called the communication unit in FIG. 33. Similarly, the demultiplexing unit corresponds to demultiplexing unit 715; the audio decoding unit corresponds to audio decoding unit 713; the audio playback control unit corresponds to audio playback control unit 709; the DAC, the amplifier, the loudspeaker, and the headphone jack correspond to audio playback unit 705; the VR video decoding unit corresponds to VR video decoding unit 710; the graphics generation unit corresponds to graphics generation unit 712; the position/orientation/cue information determination units in the CPU and the GPU correspond to position/orientation/cue information determination unit 3302; the motion and position sensor and the movement and position detection unit correspond to the position detection unit and the rotation detection unit; the motion and position detection processing unit and the VR control unit correspond to VR control unit 707; the VR display control unit corresponds to VR display control unit 708; the video display processing unit, the display element, and the lens correspond to VR video display unit 704; the microphone, the microphone amplifier, and the ADC correspond to audio input unit 706; the audio compression unit corresponds to audio compression unit 714; and the multiplexing unit corresponds to multiplexing unit 717. The video system bus, the memory bus, the system bus, the I/O bus, the bus conversion, the RAM, the EEPROM, the nonvolatile memory, the power supply switch, the power supply control element, the battery, the volume button, the AV output, the AV input, and the USB are omitted from illustration because they are not directly related to the operations pertaining to the present invention or are described as a single system. The wireless communication element is necessary for communication with the controller, but is omitted in FIG. 33 because the controller is omitted.

One implementation example according to the present invention includes cue information input unit 3352. Cue information input unit 3352 inputs the timing of the start and end of the movement, the location or direction of the movement, or the location and direction of the destination (target) by means of a switch, tablet, or smartphone physically operated by the operator or guide of observation system 3351. In addition, cue data specifies the target to be moved to from multiple targets.

Alternatively, cue information input unit 3352 may obtain cue information from video obtained from VR video processing unit 758 or audio information obtained from the audio input unit, as indicated by the dashed lines.

The cue information obtained from cue information input unit 3352 is transmitted to position and orientation detection and storage unit 3353, processed together with the position and orientation of observation system 3351, in some cases the state is stored and formatted into suitable data, transmitted as metadata to multiplexing unit 2652, multiplexed along with video, audio, and graphics, and then transmitted to VR system 3301 by communication unit 754.

In VR system 3301, communication unit 716 receives the communication information from observation system 3351, and demultiplexing unit 715 demultiplexes the metadata and transmits it to position/orientation/cue determination unit 3302.

In position/orientation/cue determination unit 3302, the cue data is retrieved from the metadata, processed as specified, and sent to graphics generation unit 712 for displaying the cue information as a graphic, which is superimposed on the VR video in VR display unit 704, or transmitted VR control unit 707, appropriately processed with VR video along with the position and orientation status of VR system 3301 in VR display control unit 708 and displayed on VR display unit 704, or guide audio is generated by audio playback control unit 709 and playback audio is processed appropriately.

As a specific example, if the cue data indicates "move to target A," the position of target A may differ depending on the position of VR system, and when cue information is shown in a graphic, an arrow is displayed in the appropriate direction. More specifically, if target A is on the left side, an arrow pointing left is displayed; if the video is controlled, for example, only the left side is made clear; and if the video is controlled by voice, an announcement such as "please turn to the left" is played. In this way, the content of the cue data is compared with the position and orientation of VR system, and appropriate processing is performed.

FIG. 36 and FIG. 37 illustrates an example of the metadata structure according to an implementation example. Next, an example of metadata structure according to this implementation example will be given.

The metadata type is a default code or string that indicates that the metadata is the metadata according to the present invention. The version number is a number for when the metadata structure is changed. For example, major versions and minor versions are used, such as 0.81 (0081) during the evaluation phase, 0.92 (0092) during demonstration testing, and 1.0 (0100) during release. The concept is to guarantee compatibility across the same major version.

The function code, when 0, indicates that the information in the metadata is invalid; otherwise, it indicates the type of information in the metadata. For example, 0001 indicates that the format is to describe the position, movement direction, and speed of the reference position, camera, guide, and target. 0002 indicates graphics data, 0003 indicates information on the VR system, 0011 is 0001 with cue data sent from the observation system, 0021 comes with cue data and defines the target to be moved to, etc.

In addition, the metadata includes several other parameters related to the cue data, such as the type and size of the cue data. As illustrated in FIG. 37, for example, eight types of cue data—0 through 7—are available as parameters related to cue data, and a numerical value is entered to specify which of the cue data it is. This example also includes parameters for specifying targets, since a plurality of targets can be selectively specified. More specifically, each of the plurality of targets has a different numerical value, allowing the target to be specified and selected by numerical value. It is also possible to enter a parameter for simply specifying the direction as one of the parameters. Here, the direction can be specified in 1° increments.

The reference position is data for the position acting as a reference for the position data, and is predefined as a whole system, including units such as X (distance from east to west), Y (distance from north to south), Z (distance in height), or expressed in terms of latitude/longitude and altitude. A reference position of 0 indicates that the position at reset of the whole system is used as the reference. Whether the position of the camera and the position of the guide are absolute coordinates or relative to a reference position is determined in advance.

The movement direction and speed indicate the movement status of the observation system or guide, and if cue data is available, how it will move in the future.

The target count indicates the tourism destination to be visited in the case of VR tourism. A target count of 0 indicates no target.

The verification code is a code for verifying that the metadata data is not incorrect during transmission, and is, for example, a CRC.

The order of items, contents of items, and values of each metadata item may be different from this configuration example but have the same functionality.

FIG. 38 illustrates another example of the metadata structure according to an implementation example. In this example, target state metadata is shown for the example in FIG. 36.

Figure 39:
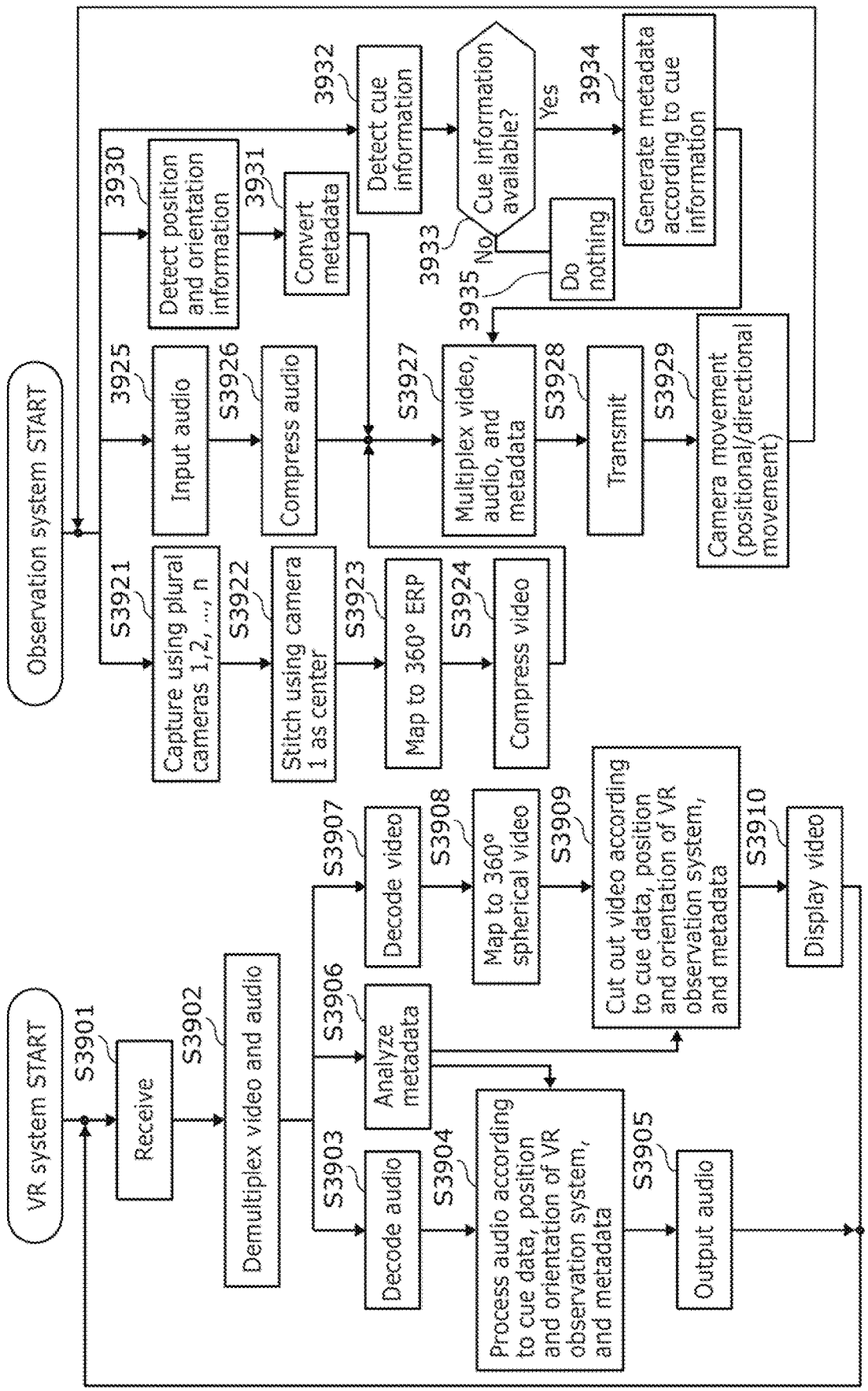
FIG. 39 illustrates one example of the flow of operations performed by the video display system according to an implementation example.

FIG. 39 illustrates one example of the flow of operations performed by the video display system according to an implementation example. Next, operations according to the implementation example of the present invention will be described.

In the observation system, input made via an input button or the like in the cue information input step by the cue information input unit is taken as cue information (S3932), and the position and orientation detection and storage unit checks for valid cue information (S3933). If there is valid cue information (Yes in S3933), the input cue information is generated into metadata by the position and orientation detection and storage unit (S3934), the cue information is then multiplexed with video, audio, and graphics information by the multiplexing unit (S3927), and transmitted to the VR system by the communication unit (S3928). If there is no valid cue information (No in S3933), no processing is performed (S3935).

Alternatively, cue information is extracted from the input audio information, VR video audio input, and VR video input from the capturing unit by the cue input unit (S3930), converted into metadata by the position and orientation detection and storage unit (S3931), multiplexed with video, audio, and graphics information by the multiplexing unit (S2927) and transmitted to the VR system by the communication unit (S3928).

In the VR system, the metadata is demultiplexed by the demultiplexing unit from the information received by the communication unit (S3901, S3902), the metadata is analyzed by the position/orientation/cue determination unit in the metadata analysis step (S3906), and if cue information is available, it is sent to the graphics generation unit, the VR control unit, or the audio control unit in accordance with the cue information. The graphics generation unit generates graphics based on the cue information. Alternatively, the VR control unit controls the VR video based on cue information (S3907, S3908, S3909, S3910). In addition, audio information may be added or controlled by the audio control unit based on cue information (S3903, S3904, S3905). Which of the above processes is performed depends on the VR system or the overall system setup.

Steps not described above are omitted here since they can be referenced by way of similar steps in FIG. 13. More specifically, step S3921 corresponds to step S1321, step S3922 corresponds to step S1322, step S3923 corresponds to step S1323, step S3924 corresponds to step S1324, step S3925 corresponds to step S1325, and step S3926 corresponds to step S1326.

Figure 40:
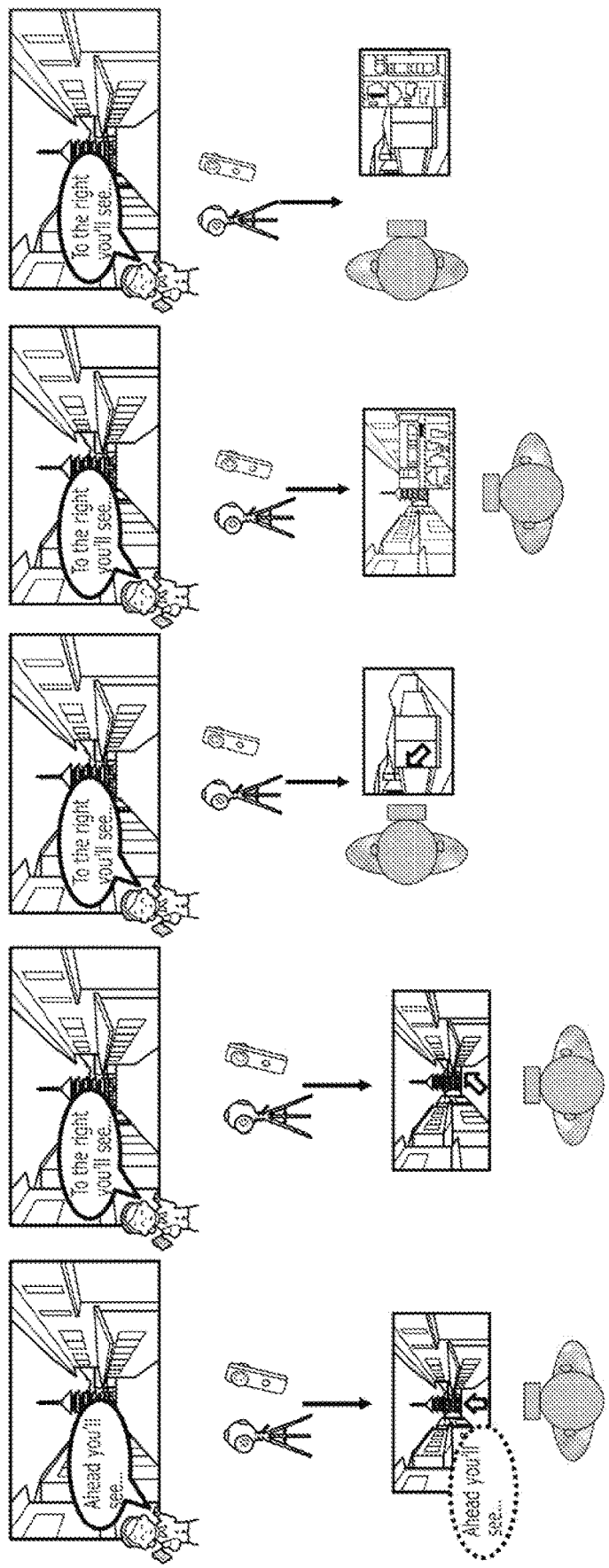
FIG. 40 illustrates the results of operations performed by the video display system according to one implementation example.

FIG. 40 illustrates the results of operations performed by the video display system according to one implementation example. The example in FIG. 40 illustrates a case where a graphics displaying arrows are superimposed. More specifically, if the cue data indicates "face right," depending on the location of the VR system, the target may be to the left of the user of the VR system, in which case, when cue information is shown in graphics, an arrow pointing to the left is displayed. If the observation system knows the predetermined position and direction of the target with a high degree of accuracy, the information is input and transmitted to the VR system as metadata, which compares it with the orientation of the user of the VR system, and if the target is in front of the user of the VR system within a predetermined margin of error, the arrow will indicate in front of the user of the VR system, if the target is left of the user by a predetermined margin of error or more, the arrow will indicate left of the user, and if the target is right of the user by a predetermined margin of error or more, the arrow will indicate right of the user. If the target is behind the user within a separately defined margin of error, a backward arrow is displayed.

In the position and orientation determination unit, the position and orientation of the observation system, guide, or target are received as metadata and transmitted to the graphics generation unit to be superimposed on the VR image in the VR display unit for display. The position and orientation determination unit receives the position and orientation of the observation system or the guide or a target object as metadata, transmits this information to the graphics generation unit for displaying it as a graphic, and superimposes it on the VR video in the VR display unit.

For example, the leftmost example in the figure shows an arrow pointing forward. Next, in the second example from the left, the arrow is pointing to the right. The third example from the left shows how the arrow points to the left when the user of the VR system is facing right, how the arrow points back when the user is facing left, and how the arrow points to the back and to the left when the user is facing back (the figure shows how the arrow points to the left shown when the user is facing right). When the user changes direction, the arrow changes direction along with them, as described above. Next, in the fourth example from the left, a map is displayed. In configurations in which a map is displayed, an arrow is shown pointing to the right, or a star symbol is used to indicate the destination. Next, in the rightmost example, a map is displayed. In cases in which a map is displayed, the arrow and the map are appropriately rotated according to the orientation as well.

Figure 41:
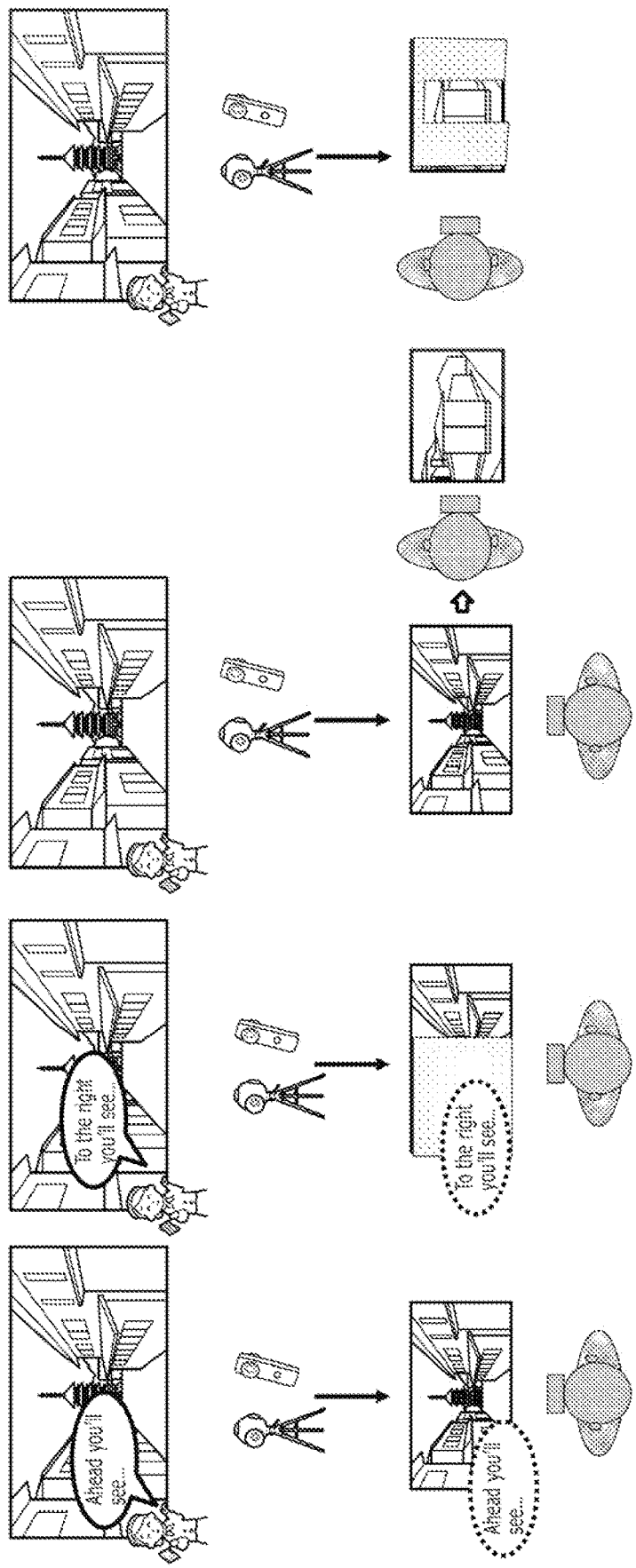
FIG. 41 illustrates the results of operations performed by the video display system according to one implementation example.

FIG. 41 illustrates the results of operations performed by the video display system according to one implementation example. The example in FIG. 41 illustrates a case in which the VR video is processed. More specifically, if the cue data indicates "turn to the right," depending on the position of the VR system, the target may be to the left or behind the user of the VR system, and when controlling the video, the position of the mask or the position where the resolution is changed, for example, will change. Note that orientation is determined in the same manner as the arrows.

For example, the leftmost example in the figure shows that if the target is in front, no special processing is performed and the video is displayed as it is. Next, in the second example from the left, the image other than the right hand side is masked to prompt the user to turn right. In the third example from the left, the resolution of the image other than the right hand side is reduced to prompt the user to turn right. The fourth example from the left shows how the image returns to the state before application of the mask (second example from the left) or resolution change (third example from the left) once the user turns to the right. In the rightmost example, when the user is facing right from the beginning, nothing in particular is additionally displayed, or processing is performed to mask or reduce the resolution of portions other than the center. When the user is facing left, only a little of the right side may be masked, and when the user is facing backward, the left side may be masked.

Figure 42:
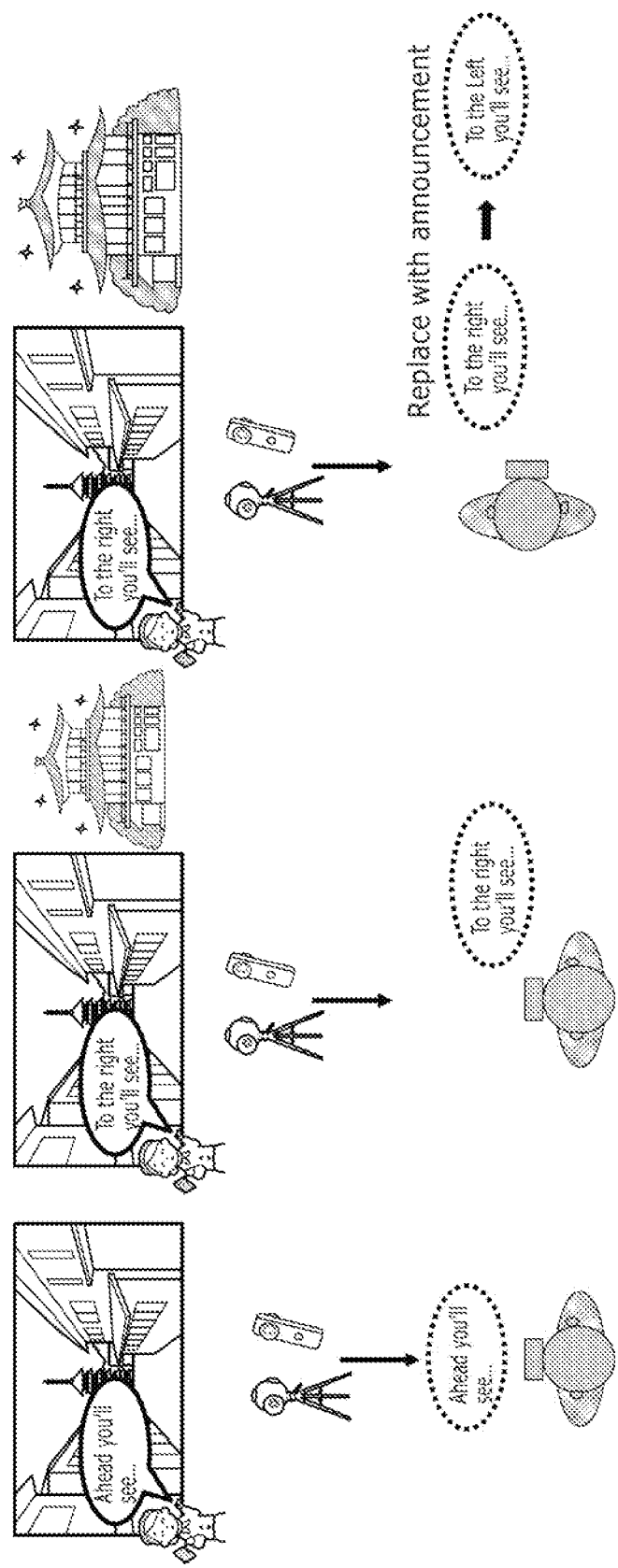
FIG. 42 illustrates the results of operations performed by the video display system according to one implementation example.

FIG. 42 illustrates the results of operations performed by the video display system according to one implementation example. The example in FIG. 42 illustrates a case where an audio guide is played. More specifically, if the cue data indicates "turn to the right," depending on the position of the VR system, the target may be to the left of the user of the VR system, and when controlled by voice, an announcement such as "please turn to the left" will be played. Note that orientation is determined in the same manner as the arrows.

For example, the leftmost example in the figure shows how audio is played so that the guide's voice is heard from the front when talking about a building located straight ahead. Next, the second example from the left shows how audio is played so that the guide's voice is heard from the right when talking about a building to the right, from the back when talking about a target behind, and from the left when the left when talking about a target to the left (in the figure, the example of the guide's voice being heard from the right when talking about a building to the right is shown). Next, in rightmost example, when the user of the VR system is facing right or back, the voice of the guide is heard from the left of the user of the VR system, since the right is actually to the left relative to the user. If there is confusion, replace "right" with "left" in the audio, or use arrows or other means in combination with graphics to indicate direction.

Figure 43:
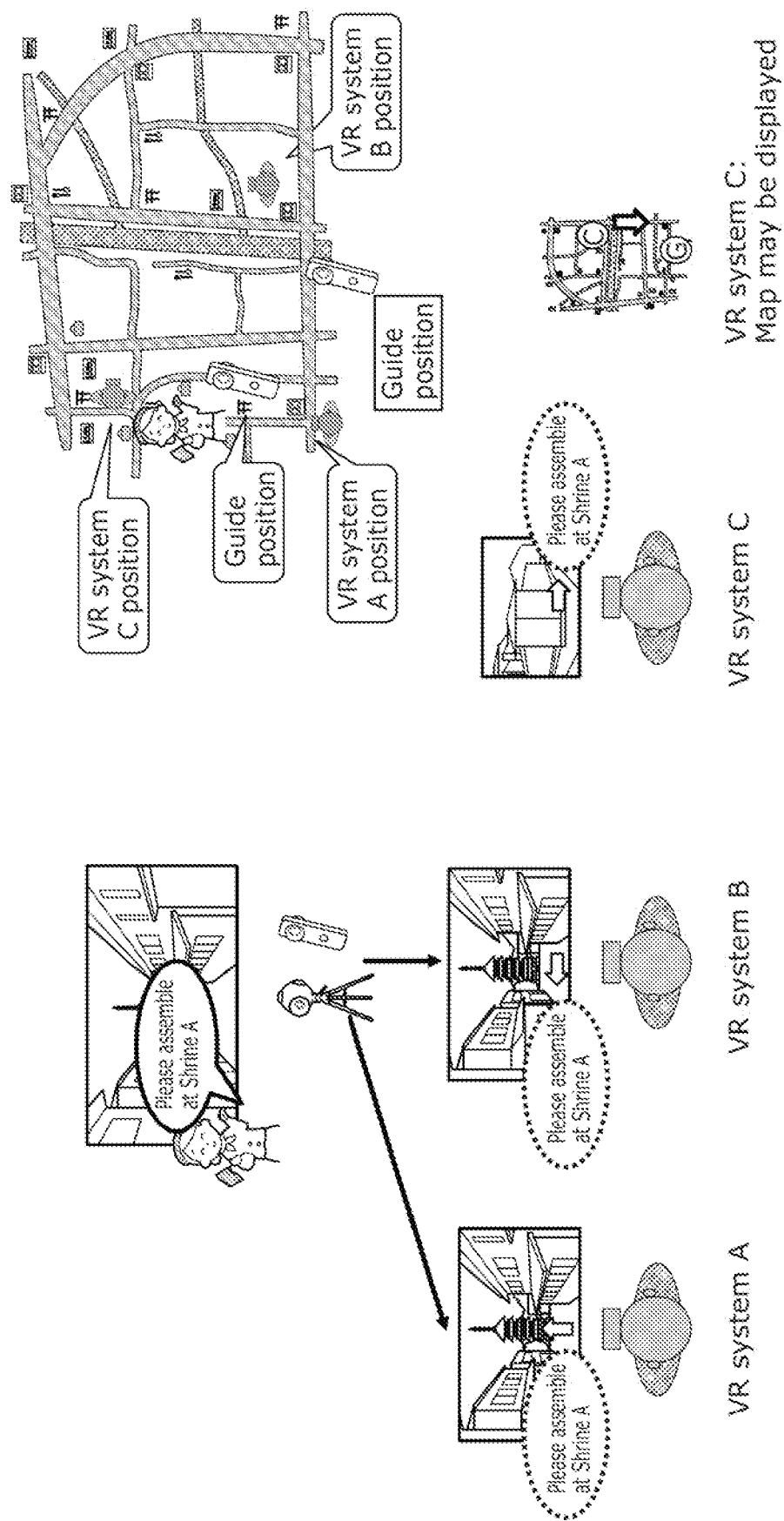
FIG. 43 illustrates the results of operations performed by the video display system according to one implementation example.

FIG. 43 illustrates the results of operations performed by the video display system according to one implementation example. The example in FIG. 43 illustrates a case in which a plurality of users are dispersed within the same image space. More specifically, if there are a plurality of VR system users and they are in different places in the VR space than where the guide is, the VR video that a VR system user sees is video that was captured beforehand. Alternatively, assume there are a plurality of observation systems. Here, when the guide sends cue data to assemble the participants at the guide's location by audio, a button, or showing the location on the map, each VR system user, depending on the position and orientation of the VR system user, the user may be notified using an arrow, VR image processing, audio, controller vibration, etc.

In the figure, VR system A is facing north and Shrine A is in the front, so the arrow points to the front; VR System B is facing north and Shrine A is to the left, so the arrow points to the left; VR System C is facing east and Shrine A is to the right, so the arrow points to the right. As shown as another example of the VR system C, a map may be displayed.

To move locations, a "warp" function may be used using a controller. The same function may be selected from a menu, such as "move to guide's location".

This function is also useful when a plurality of VR systems are dispersed in a large VR space, such as at a VR conference, a VR event, or a VR sporting event.

Figure 44:
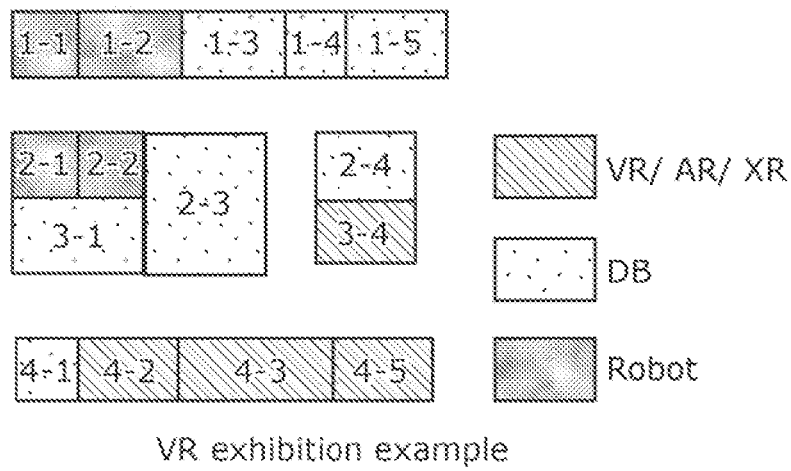
FIG. 44 illustrates one example of an application of the video display system according to one implementation example.

FIG. 44 illustrates one example of an application of the video display system according to one implementation example. As illustrated in FIG. 44, a video display system can be used as an example of a VR exhibition. For example, if the guide or organizer announces "meet at booth 2-3," participants across a plurality of VR systems can move from their respective locations.

Figure 45:
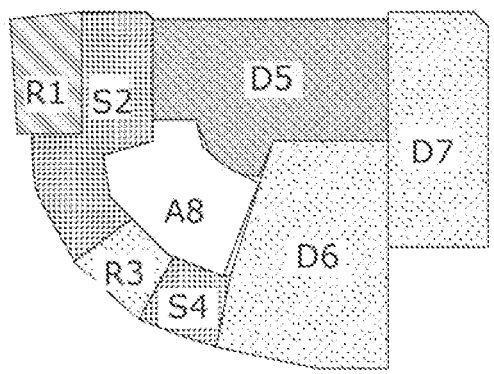
FIG. 45 illustrates one example of an application of the video display system according to one implementation example.

FIG. 45 illustrates one example of an application of the video display system according to one implementation example. As illustrated in FIG. 45, a video display system can be used as an example of a VR mall. For example, if the guide or organizer announces "meet at atrium A8," participants across a plurality of VR systems can move from their respective locations.

Thus, instead of sending VR images from an observation system, this can be applied to VR tourism in a VR space composed of CG, VR conferences (assembling from plural sessions to a general session), VR sports games (assembling from plural spectator locations to a main location), and VR events (assembling from plural different event locations to the main venue), etc.

In such cases, the functions and operations, etc., implemented in the observation system are realized in the VR system operated by the guide or organizer.

The same technique can be used for group travel to different venues in addition to assembling. In such cases, instead of the organizer or guide giving the cue, the group members should give the cue.

Figure 46:
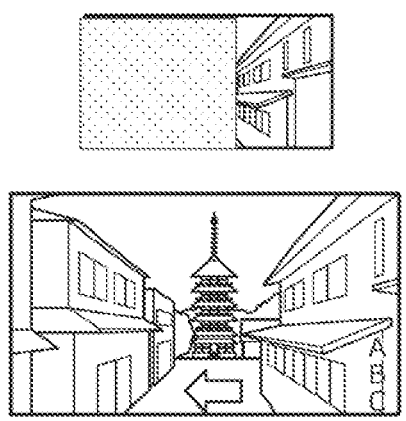
FIG. 46 is for illustrating another example of the moving method of the video display system according to one implementation example.

FIG. 46 is for illustrating another example of the moving method of the video display system according to one implementation example. As illustrated in FIG. 46, when a cue to move is given by a guide or organizer or the like, the method of initiating the move depends on the state of the VR screen that the VR system user is viewing. For example, when the movement direction is indicated using an arrow, using screen changes, or using audio, the controller's functions (for example, warp function) are used to move. This method is not a problem at short distances but is a hassle at long distances.

When an arrow is displayed, the arrow may be selectable to move to the target location. Similarly, when a map is displayed, any point on the map may be selectable to move to that point. Furthermore, letters corresponding to targets (A, B, C, etc.) may be displayed, and by selecting one of these letters, the user can move to the corresponding predefined point. When the screen is masked, a specified point may be moved to by selecting an unmasked area.

Figure 47:
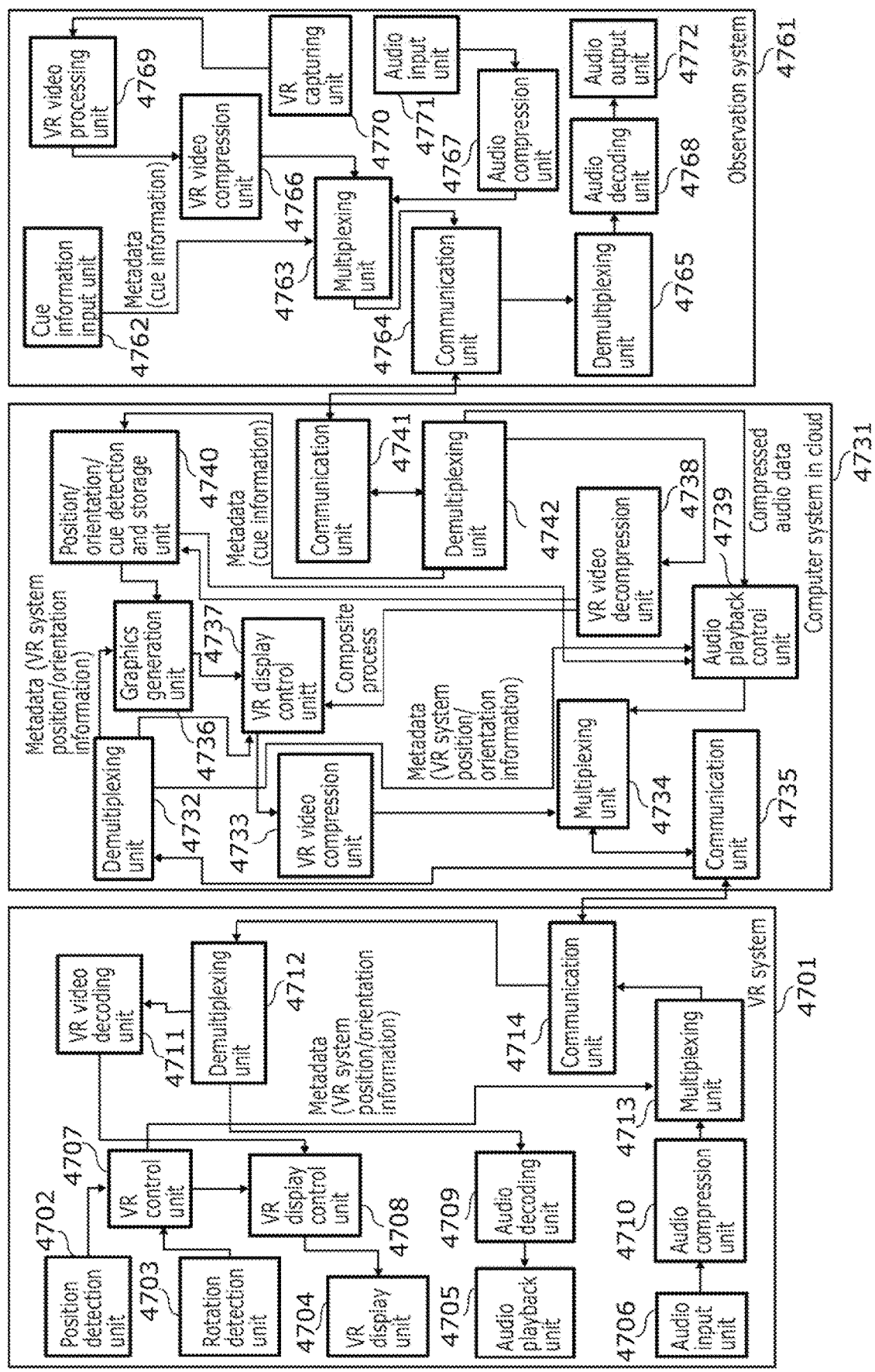
FIG. 47 is for illustrating an example of a configuration of the video display system according to an implementation example realized using the cloud.

FIG. 47 is for illustrating an example of a configuration of the video display system according to an implementation example realized using the cloud. In the configuration illustrated in FIG. 47, the cloud has the function of controlling graphics, VR video, sound, and controller vibration according to the position, orientation, and cue information of observation system 4761 and the position and orientation of the VR system and providing appropriate information to the user of the VR system, whereby even a VR system with a simple configuration can achieve the advantageous effects of the present invention.

In the configuration illustrated in FIG. 47, by having position/orientation/cue detection and storage unit 4740 in the cloud, the position and orientation of observation system 4761 can be read from metadata demultiplexed by demultiplexing unit 4742 from the data transmitted from the observation system in the cloud, and graphics such as arrows can be generated by graphics generation unit 4736 by reading the position and orientation of observation system 4761 from the VR video transmitted by observation system 4761. The position and orientation of the observation system and the position and orientation of the VR system are determined by VR control unit 4707, and VR display control unit 4708 composites VR video and graphics or processes VR video, and audio playback control unit 4739 changes the audio position or the content of the audio, thereby making it possible to output display and audio appropriate to the position and orientation of VR system 4701. Although not illustrated here, it is possible to inform the user of the VR system of the direction and position by controlling, such as vibrating, a controller of the VR system appropriately.

The functions included in the cloud are not limited to those illustrated in FIG. 47, and may be selected according to the configuration and functions of connected observation system or VR system so that the overall functions and operations are similar. As an example, if the observation system does not detect the position and orientation of the observation system, but the position and orientation of the observation system is detected on the cloud and sent as graphics superimposed on the video to the VR system, the VR system is restricted in regard to changing the graphics according to the position and orientation of the VR system, but the VR system requires no special functions. In a configuration where the VR system includes a position and orientation control unit and a graphics generation unit that correct graphics according to the position and orientation of the VR system, it is possible to alter the graphics according to the position and orientation of the VR system.

Note that configurations not described above are omitted here since they can be referenced by way of similar configurations in FIG. 33. Position detection unit 4702, rotation detection unit 4703, VR display unit 4704, audio playback unit 4705, audio input unit 4706, VR control unit 4707, VR display control unit 4708, audio decoding unit 4709, audio compression unit 4710, VR video decoding unit 4711, demultiplexing unit 4712, multiplexing unit 4713, and communication unit 4714 included in VR system 4701, as well as demultiplexing unit 4732, VR video compression unit 4733, multiplexing unit 4734, communication unit 4735, graphics generation unit 4736, VR display control unit 4737, VR video decompression unit 4738, audio playback control unit 4739, position/orientation/cue detection and storage unit 4740, communication unit 4741, and demultiplexing unit 4742 included in computer system 4731, as well as cue information input unit 4762, multiplexing unit 4763, communication unit 4764, demultiplexing unit 4765, VR video compression unit 4766, audio compression unit 4767, audio decoding unit 4768, VR video processing unit 4769, VR capturing unit 4770, audio input unit 4771, and audio output unit 4772 included in observation system 4761 respectively correspond one-to-one, many-to-one, one-to-many, or many-to-many to position detection unit 702, rotation detection unit 703, VR display unit 704, audio playback unit 705, audio input unit 706, VR control unit 707, VR display control unit 708, audio playback control unit 709, VR video decoding unit 710, graphics generation unit 712, audio decoding unit 713, audio compression unit 714, demultiplexing unit 715, communication unit 716, multiplexing unit 717, position/orientation/cue determination unit 3302, cue information input unit 3352, position and orientation detection and storage unit 3353, communication unit 754, demultiplexing unit 755, VR video compression unit 756, multiplexing unit 2652, VR video processing unit 758, graphics generation unit 759, audio compression unit 760, audio decoding unit 761, VR capturing unit 762, audio input unit 763, and audio output unit 764.

Figure 48:
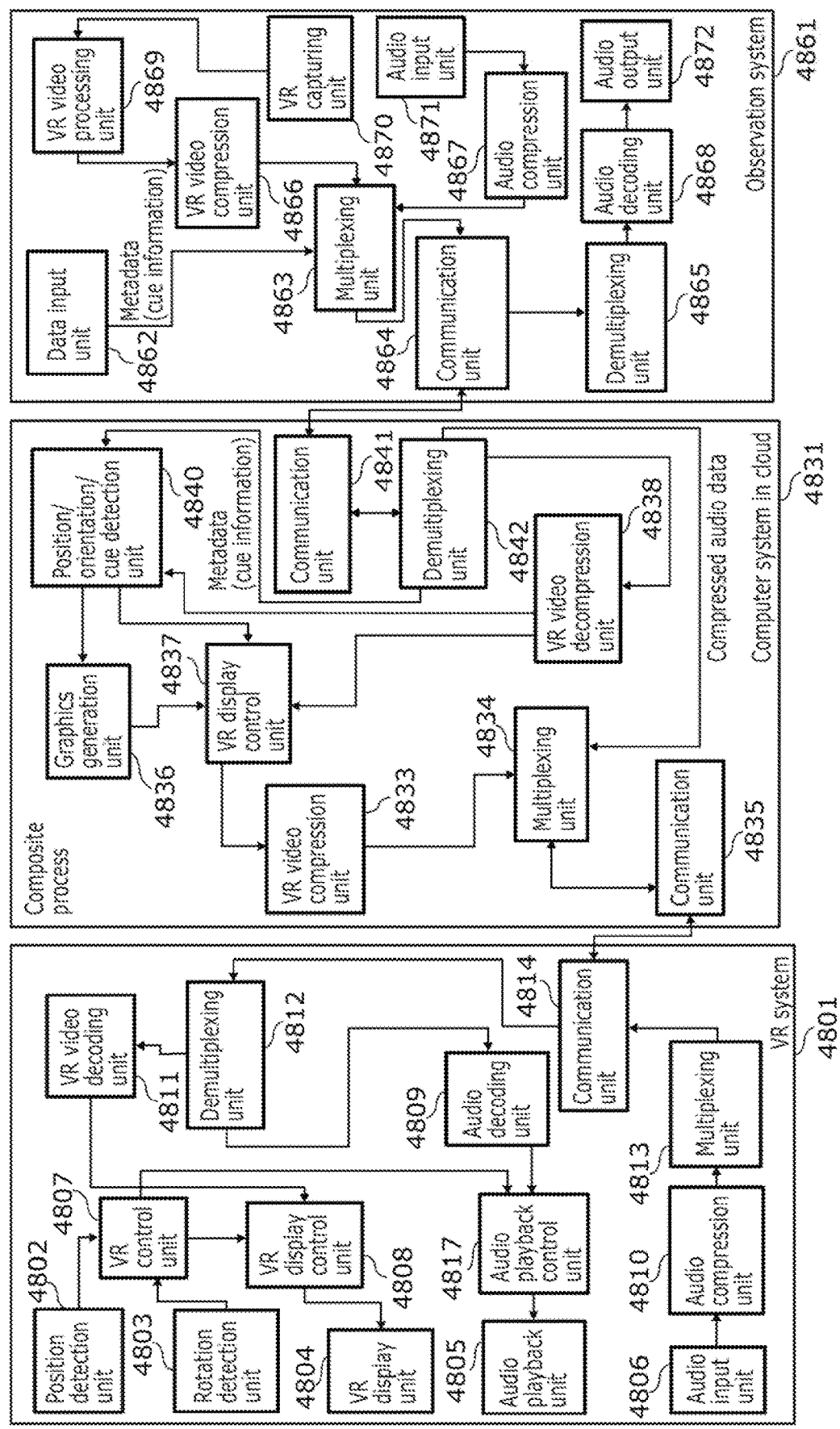
FIG. 48 is for illustrating an example of a configuration of the video display system according to an implementation example realized using the cloud.

FIG. 48 is for illustrating an example of a configuration of the video display system according to an implementation example realized using the cloud. As illustrated in FIG. 48, position/orientation/cue detection unit 4740 of the observation system may be realized by a computer system, which is, e.g., cloud-based, between observation system 4761 and VR system 4701. In such cases, the observation system does not send metadata indicating the direction, or the data input by the operator such as cue information is sent out as metadata. Via position/orientation/cue detection and storage unit 4840, which is in the cloud, the position, orientation, or movement of observation system 4861, guide, or target is detected from the video, audio, or metadata sent from observation system 4861, and sent to the VR system as metadata. This makes it possible to achieve the advantageous effect of this implementation example using existing 360° cameras.

Furthermore, position and orientation determination unit 4915 on the VR system side and the control of the VR video and audio thereby may be implemented by a computer system, such as a cloud-based computer system, between the VR system and the observation system. In such cases, the same process can be performed in one place, making it easy to provide the same advantageous effect to a plurality of VR systems at the same time, or to provide the advantageous effect of the present invention to existing systems. However, to apply the direction and position of the VR system, it is necessary to send the position and direction of the VR system from the VR system to the cloud side, and it is necessary to provide a processing unit for each VR system on the cloud side.

The configuration in FIG. 48 is an example of a case where the position and orientation of the VR system are not transmitted to the cloud side. In this case, it becomes difficult to display arrows or change the sound according to the position and orientation of the VR system, but the VR display control unit can, according to the output of the position/orientation/cue detection and storage unit, change the resolution of the VR video, mask the video, change the sound position, etc.

Note that configurations not described above are omitted here since they can be referenced by way of similar configurations in FIG. 33. Position detection unit 4802, rotation detection unit 4803, VR display unit 4804, audio playback unit 4805, audio input unit 4806, VR control unit 4807, VR display control unit 4808, audio decoding unit 4809, audio compression unit 4810, VR video decoding unit 4811, demultiplexing unit 4812, multiplexing unit 4813, communication unit 4814, and audio playback control unit 4817 included in VR system 4801, as well as VR video compression unit 4733, multiplexing unit 4834, communication unit 4835, graphics generation unit 4836, VR display control unit 4837, VR video decompression unit 4838, audio playback control unit 4839, position/orientation/cue detection and storage unit 4840, communication unit 4841, and demultiplexing unit 4842 included in computer system 4831, as well as cue information input unit 4862, multiplexing unit 4863, communication unit 4864, demultiplexing unit 4865, VR video compression unit 4866, audio compression unit 4867, audio decoding unit 4868, VR video processing unit 4869, VR capturing unit 4870, audio input unit 4871, and audio output unit 4872 included in observation system 4861 respectively correspond one-to-one, many-to-one, one-to-many, or many-to-many to position detection unit 702, rotation detection unit 703, VR display unit 704, audio playback unit 705, audio input unit 706, VR control unit 707, VR display control unit 708, audio playback control unit 709, VR video decoding unit 710, graphics generation unit 712, audio decoding unit 713, audio compression unit 714, demultiplexing unit 715, communication unit 716, multiplexing unit 717, position/orientation/cue determination unit 3302, cue information input unit 3352, position and orientation detection and storage unit 3353, communication unit 754, demultiplexing unit 755, VR video compression unit 756, multiplexing unit 2652, VR video processing unit 758, graphics generation unit 759, audio compression unit 760, audio decoding unit 761, VR capturing unit 762, audio input unit 763, and audio output unit 764.

Figure 49:
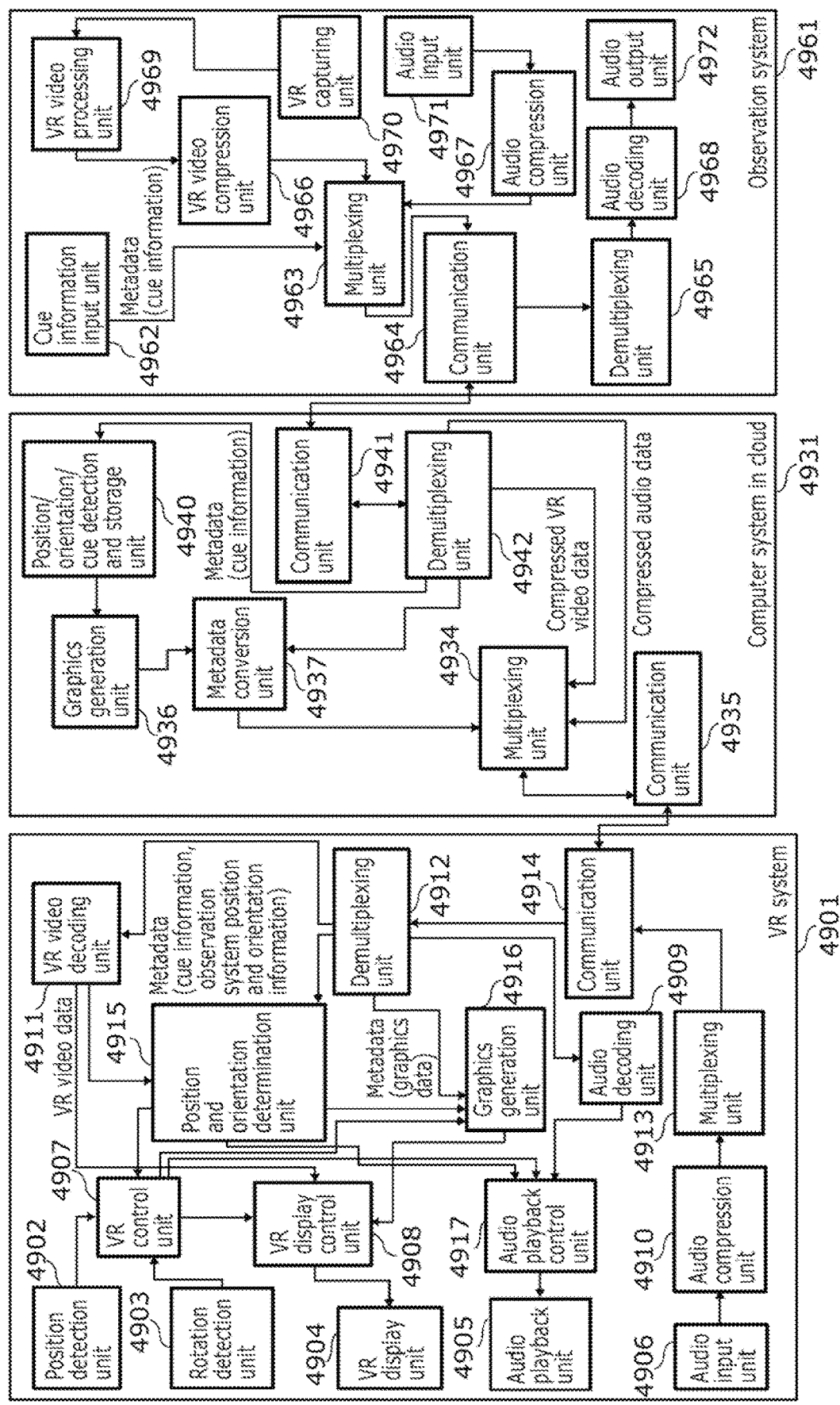
FIG. 49 is for illustrating an example of a configuration of the video display system according to an implementation example realized using the cloud.

FIG. 49 is for illustrating an example of a configuration of the video display system according to an implementation example realized using the cloud. In the configuration in FIG. 48, it was difficult to display arrows or change sound according to the position and orientation of the VR system, but in the configuration illustrated in FIG. 49, by including position and orientation determination units 4902 and 4903 in the VR system, the position and orientation of the observation system are retrieved from metadata demultiplexed by demultiplexing unit 4912, a video of, for example, arrows is generated by graphics generation unit 4916 based on the retrieved information, the generated video and arrows are converted by metadata conversion unit 4937 into metadata along with the position and orientation information transmitted from the observation system, multiplexed by the multiplexing unit, and transmitted to the VR system.

In the VR system, a graphic is generated from the metadata demultiplexed by the demultiplexing unit, the position and orientation of the observation system and the position and direction of the VR system obtained from the position detection unit and the rotation detection unit are determined by the VR control unit, and the VR display control unit appropriately composites VR video and graphics or processes VR video, and the audio playback control unit changes the audio position or the content of the audio, thereby making it possible to output display and audio appropriate to the position and orientation of the VR system. Although not illustrated here, it is possible to inform the user of the VR system of the direction and position by controlling, such as vibrating, a controller of the VR system appropriately.

The position and orientation information of the VR system detected by the position detection unit and rotation detection unit of the VR system is multiplexed with other information in the multiplexing unit as metadata, and is sent to the computer system in the cloud by the communication unit. This feature is included in most common VR systems.

Note that configurations not described above are omitted here since they can be referenced by way of similar configurations in FIG. 33. Position detection unit 4902, rotation detection unit 4903, VR display unit 4904, audio playback unit 4905, audio input unit 4906, VR control unit 4907, VR display control unit 4908, audio decoding unit 4909, audio compression unit 4910, VR video decoding unit 4911, demultiplexing unit 4912, multiplexing unit 4913, communication unit 4914, position and orientation determination unit 4915, graphics generation unit 4916, and audio playback control unit 4917 included in VR system 4901, as well as multiplexing unit 4934, communication unit 4935, graphics generation unit 4936, VR display control unit 4937, position/orientation/cue detection and storage unit 4940, communication unit 4941, and demultiplexing unit 4942 included in computer system 4931, as well as cue information input unit 4962, multiplexing unit 4963, communication unit 4964, demultiplexing unit 4965, VR video compression unit 4966, audio compression unit 4967, audio decoding unit 4968, VR video processing unit 4969, VR capturing unit 4970, audio input unit 4971, and audio output unit 4972 included in observation system 4961 respectively correspond one-to-one, many-to-one, one-to-many, or many-to-many to position detection unit 702, rotation detection unit 703, VR display unit 704, audio playback unit 705, audio input unit 706, VR control unit 707, VR display control unit 708, audio playback control unit 709, VR video decoding unit 710, graphics generation unit 712, audio decoding unit 713, audio compression unit 714, demultiplexing unit 715, communication unit 716, multiplexing unit 717, position/orientation/cue determination unit 3302, cue information input unit 3352, position and orientation detection and storage unit 3353, communication unit 754, demultiplexing unit 755, VR video compression unit 756, multiplexing unit 2652, VR video processing unit 758, graphics generation unit 759, audio compression unit 760, audio decoding unit 761, VR capturing unit 762, audio input unit 763, and audio output unit 764.

Other Embodiments

Although the above description is based on embodiments and the like, the present disclosure is not limited to the above embodiments.

Although the above embodiments and the like give examples of elements included in the video display system, the functions of the elements included in the video display system may be assigned to a plurality of units included in the video display system in any way.

Furthermore, in the above embodiments, each element may be realized by executing a software program suitable or the element. Each element may be realized as a result of a program execution unit of a CPU or processor or the like reading and executing a software program recorded on a recording medium such as a hard disk or semiconductor memory.

Each element may be realized by hardware. For example, each element may be a circuit (or integrated circuit). These circuits may be configured as a single circuit and, alternatively, may be individual circuits. Moreover, these circuits may be ordinary circuits and, alternatively, may be specialized circuits.

General or specific aspects of the present disclosure may be realized as a system, a device, a method, an integrated circuit, a computer program, a computer readable recording medium such as a CD-ROM, or any given combination thereof.

Various modifications of the embodiments as well as embodiments resulting from arbitrary combinations of elements of different embodiments that may be conceived by those skilled in the art are intended to be included within the scope of the present disclosure as long as these do not depart from the essence of the present disclosure.

INDUSTRIAL APPLICABILITY

The present disclosure is useful in applications where the appropriate video is displayed on a display device.

REFERENCE SIGNS LIST 11 position detection unit
13 rotation detection unit
15 VR display unit
17 audio playback unit
19, 71 audio input unit
21 VR control unit
23 VR display control unit
25 audio playback control unit
27, 63 audio compression unit
29 VR video decoding unit
31 position/orientation/cue determination unit
33 graphics generation unit
35, 65 audio decoding unit
37, 57 demultiplexing unit
39, 55 communication unit
41, 61 multiplexing unit
51 cue information input unit
53 position and orientation detection and storage unit
59 VR video compression unit
67 VR video processing unit
69 VR capturing unit
73 audio output unit
99 graphic
99a arrow
99b map
99c mask
99d low-resolution filter
100 display device
101 display unit
102 display state detection unit
150 network
200 server device
201 reception unit
202 differential calculation unit
203 presentation unit
204 video generation unit
300 observation device
300a, 300b capturing device
301 storage unit
302 input interface
303 position input unit
304 data obtainment unit
305 metadata obtainment unit
306 transmission unit
500 video display system

The invention claimed is:

1. A video display system for displaying a display video via a display device, the video display system comprising:
an observation device including:
an image capturing device configured to generate a wide-angle video; and
a first processor configured to:
obtain (i) data related to at least one of a position or a direction of a gazing target in the wide-angle video to be gazed at by a user of an occurrence of the display device and (ii) cue information for informing the user of a change in a state of the observation device,
compose metadata from the data and other information, and
transmit the wide-angle video together with the metadata; and
a VR device including:
a second processor configured to:
receive the wide-angle video, the data, and the cue information,
estimate at least one of a position or a direction of the display device in the wide-angle video,
calculate, based on a difference between (i) at least one of the position or the direction of the display device in the wide-angle video as estimated and (ii) at least one of the position or the direction of the gazing target in the metadata, at least one of a relative position or a relative direction of the gazing target, the relative position being relative to the position of the display device in the wide-angle video, the relative direction being relative to the direction of the display device in the wide-angle video,
present, to the user of the display device, (i) information on at least one of the relative position calculated or the relative direction calculated, and (ii) the change in the state that occurred in the observation system device according to the cue information,
generate, from the wide-angle video received, the display video including a portion corresponding to a viewing area corresponding to (i) information on at least one of the position or the direction of the display device in the wide-angle video as estimated from the wide-angle video, and (ii) the change in the state that occurred in the observation device according to the cue information; and the display device that displays the display video.

2. The video display system according to claim 1, wherein the image capturing device comprises at least one of a camera that captures a video or an image generation processor configured to generate an image by calculation, and the wide-angle video is the video captured by the camera or the image generated by the image generation processor.

3. The video display system according to claim 1, wherein the second processor is configured to:
generate and output a graphic indicating information that is based on the cue information and at least one of the relative position calculated or the relative direction calculated, and
superimpose the graphic onto the portion to present at least one of the relative position or the relative direction.

4. The video display system according to claim 3, wherein the first processor is configured to receive an input of data related to the direction of the gazing target,
the second processor is configured to estimate the direction of the display device in the wide-angle video, and
the graphic displays an arrow indicating the relative direction on the display video.

5. The video display system according to claim 3, wherein the first processor is configured to receive an input of data related to the direction of the gazing target,
the second processor is configured to estimate the direction of the display device in the wide-angle video, and
the graphic displays, as a mask, an image for covering at least part of the display video other than a part corresponding to the relative direction.

6. The video display system according to claim 3, wherein the first processor is configured to receive an input of data related to the position of the gazing target,
the second processor is configured to estimate the position of the display device in the wide-angle video, and
the graphic displays a map indicating the relative position on the display video.

7. The video display system according to claim 1, further comprising:
an input interface for inputting the data, wherein
the first processor is configured to obtain the data input via the input interface.

8. The video display system according to claim 3, further comprising:
an input interface for specifying a timing of at least one of a start or an end of movement by the user in the wide-angle video, wherein
the first processor is configured to obtain the timing of at least one of the start or the end of the movement that has been input via the input interface.

9. The video display system according to claim 7, wherein images included in the wide-angle video are images output by the observation device configured to capture a real space, and
the input interface includes:
an indication marker that is held by an operator of the input interface in the real space and indicates at least one of the position or the direction of the gazing target according to the movement of the indication marker; and
a third processor configured to receive at least one of the position or the direction of the gazing target indicated by the indication marker by analyzing an image including the indication marker output by the observation device.

10. The video display system according to claim 1, further comprising:
an information processing device that is connected to the observation device and the VR device over a network.

11. The video display system according to claim 10, wherein
the information processing device includes:
a fourth processor configured to:
receive, as the metadata from the observation device, the wide-angle video, the data, and the cue information,
generate information for presenting, to the user of the display device, information in accordance with the cue information and at least one of the position or the direction of the gazing target in the metadata,
generate the display video from the wide-angle video received by adding the information to a portion of the wide-angle video that corresponds to a viewing area corresponding to information on at least one of the position or the direction of the display device in the wide-angle video, and
transmit:
the wide-angle video;
a portion of the wide-angle video that corresponds to a viewing area corresponding to information on at least one of the relative position or the relative direction; and
the metadata.

12. The video display system according to claim 10, wherein
the information processing device includes:
a fourth processor configured to:
receive, as the metadata from the observation device, the wide-angle video, the data, and the cue information,
generate information for presenting, to the user of the display device, information in accordance with the cue information and at least one of the position or the direction of the gazing target in the metadata,
generate the metadata from the information, and
transmit, to the VR device:
the metadata; and
the wide-angle video.

13. The video display system according to claim 10, wherein
the information processing device includes:
a fourth processor configured to:
receive, as the metadata from the observation device, the wide-angle video, the data, and the cue information, and receive, from the display device, data related to an orientation of the display device,
calculate a relative movement direction based on the cue information and a difference between the orientation of the display device and movement information related to movement of the image capturing device, the relative movement direction being a movement direction of the image capturing device relative to the orientation of the display device,
generate and output a graphic that indicates the relative movement direction calculated and presents, to the user of the display device, information in accordance with the cue information and the relative movement direction by being superimposed on a portion of the wide-angle video that corresponds to a viewing area corresponding to the orientation of the display device estimated,
generate the display video by correcting the graphic based on data related to the orientation of the display device and superimposing the graphic corrected on the wide-angle video, and
transmit the display video.

14. The video display system according to claim 10, wherein
the information processing device is provided in a cloud connected to a wide-area network, and is connected to the observation device and the VR device over the wide-area network.

15. The video display system according to claim 1, wherein
the cue information is information indicating that a movement direction of the observation device or at least one of the position or the direction of the gazing target to be gazed at by the user of the display device changes.

16. An information processing device used in a video display system for displaying a display video on a display device, the display video being at least part of a wide-angle video, the information processing device comprising:
a first processor configured to:
receive metadata that is based on input data related to at least one of a position or a direction of a gazing target to be gazed at by a user of the display device in the wide-angle video,
calculate and output at least one of a relative position or a relative direction of the gazing target, based on a difference pertaining to at least one of the position or the direction of the gazing target in the metadata, the relative position being relative to a position of the display device in the wide-angle video, the relative direction being relative to a direction of the display device in the wide-angle video,
output information on at least one of the relative position calculated or the relative direction calculated,
obtain cue information for informing the user of a change in a state of an observation device, and
present, to the user of the display device, the information along with the change in the state that occurred in the observation device according to the cue information.

17. The information processing device according to claim 16, wherein the first processor is further configured to:
generate and output a graphic that indicates at least one of the relative position or the relative direction calculated and presents, to the user of the display device, at least one of the relative position or the relative direction by being superimposed on a portion of the wide-angle video that corresponds to a viewing area corresponding to at least one of the position or the direction of the display device in the wide-angle video as estimated.

18. An information processing method for displaying a display video on a display device, the display video being at least part of a wide-angle video, the method comprising:
receiving metadata based on input data related to at least one of a position or a direction of a gazing target to be gazed at by a user of the display device in the wide-angle video;
calculating and outputting, based on a difference between (i) at least one of a position or a direction of the display device in the wide-angle video as estimated and (ii) at least one of the position or the direction of the gazing target in the metadata, at least one of a relative position or a relative direction of the gazing target relative to an orientation of the display device;
outputting information on at least one of the relative position calculated or the relative direction calculated;
obtaining cue information for informing the user of a change in a state of an observation device; and
presenting, to the user of the display device, the information along with a change in a state that occurred in an observation device according to cue information.

19. A non-transitory computer-readable recording medium having recorded thereon a computer program for causing a computer to execute the information processing method according to claim 18.

* * * * *